United States Patent
Ueshima

(10) Patent No.: US 7,322,889 B2
(45) Date of Patent: Jan. 29, 2008

(54) GAME FOR MOVING AN OBJECT ON A SCREEN IN RESPONSE TO MOVEMENT OF AN OPERATION ARTICLE

(75) Inventor: Hiromu Ueshima, Shiga (JP)

(73) Assignee: SSD Company Limited, Kusatsu, Shiga (JP)

( * ) Notice: Subject to any disclaimer, the term of this patent is extended or adjusted under 35 U.S.C. 154(b) by 230 days.

(21) Appl. No.: 10/972,284

(22) Filed: Oct. 22, 2004

(65) Prior Publication Data

US 2005/0124413 A1    Jun. 9, 2005

(30) Foreign Application Priority Data

Oct. 23, 2003    (JP)    ............. P. 2003-362637

(51) Int. Cl.
*A63F 13/00*    (2006.01)
(52) U.S. Cl. ...................................... 463/34
(58) Field of Classification Search .............. 463/15, 463/30, 31, 34, 36, 37; 345/158
See application file for complete search history.

(56) References Cited

U.S. PATENT DOCUMENTS

| | | | | |
|---|---|---|---|---|
| 5,515,079 A | * | 5/1996 | Hauck | ............. 345/157 |
| 5,652,630 A | * | 7/1997 | Bertram et al. | ............. 348/734 |
| 5,982,352 A | * | 11/1999 | Pryor | ............. 345/156 |
| 6,070,205 A | | 5/2000 | Kato et al. | |
| 7,098,891 B1 | * | 8/2006 | Pryor | ............. 345/158 |
| 2002/0119819 A1 | * | 8/2002 | Kunzle et al. | ............. 463/30 |
| 2004/0063480 A1 | * | 4/2004 | Wang | ............. 463/8 |

FOREIGN PATENT DOCUMENTS

JP    10-307790    11/1998
JP    2002-263370    9/2002

OTHER PUBLICATIONS

Patent Abstracts of Japan, Publication No. 2002-263370, Publication Date Sep. 17, 2002, 2 pages.
Patent Abstracts of Japan, Publication No. 10-307790, Publication Date Nov. 17, 1998, 2 pages.
Non Final Office Action issued in U.S. Appl. No. 10/980,988, dated Sep. 6, 2006, (6 pages).

* cited by examiner

*Primary Examiner*—Kim Nguyen
(74) *Attorney, Agent, or Firm*—Osha • Liang LLP

(57) ABSTRACT

Since a cursor displayed on a screen of a television monitor moves in conjunction with a motion of an operation article operated by a player, intuitive operation can be possible so that the player can play a game easily. A mermaid displayed on the screen follows the cursor when the player moves the cursor by operating the operation article. In this way, the player operates the mermaid indirectly and avoids obstacle objects and obstacle images.

12 Claims, 37 Drawing Sheets

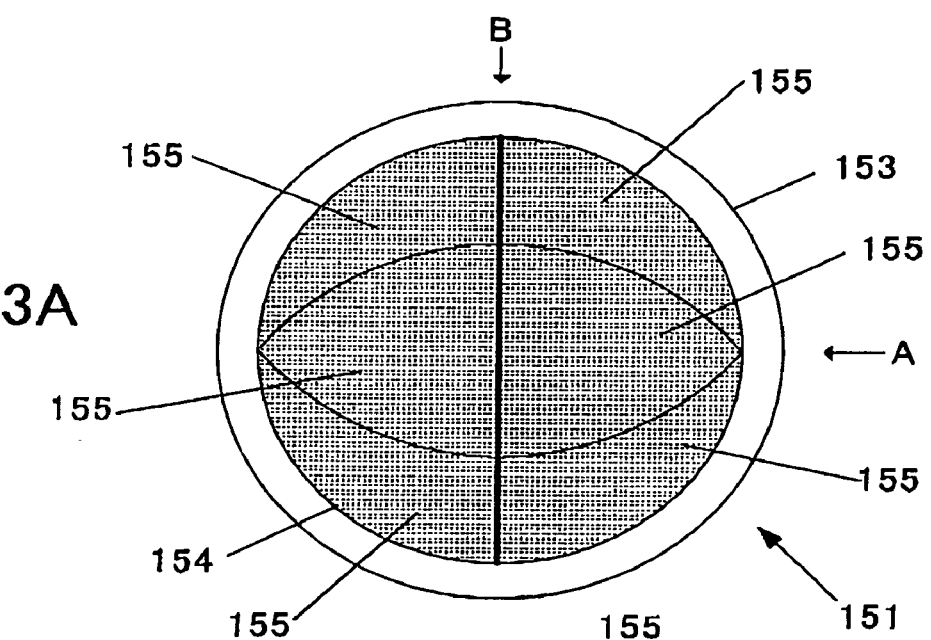
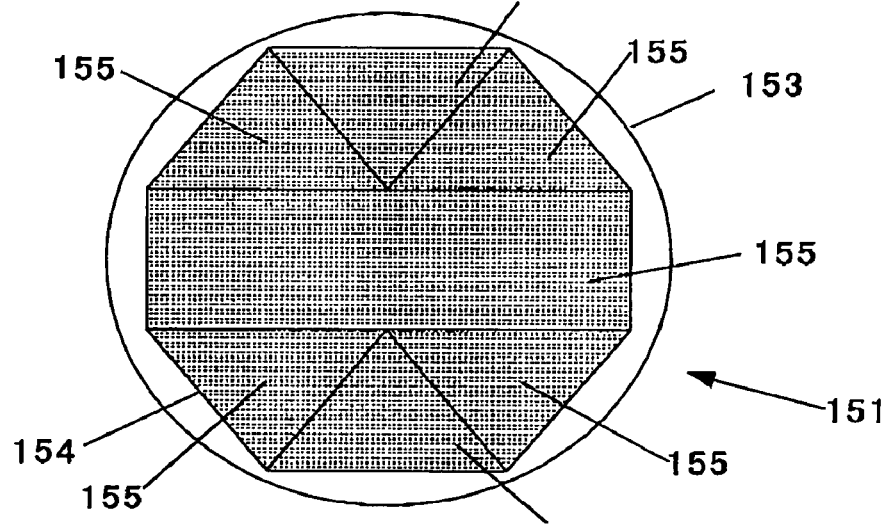
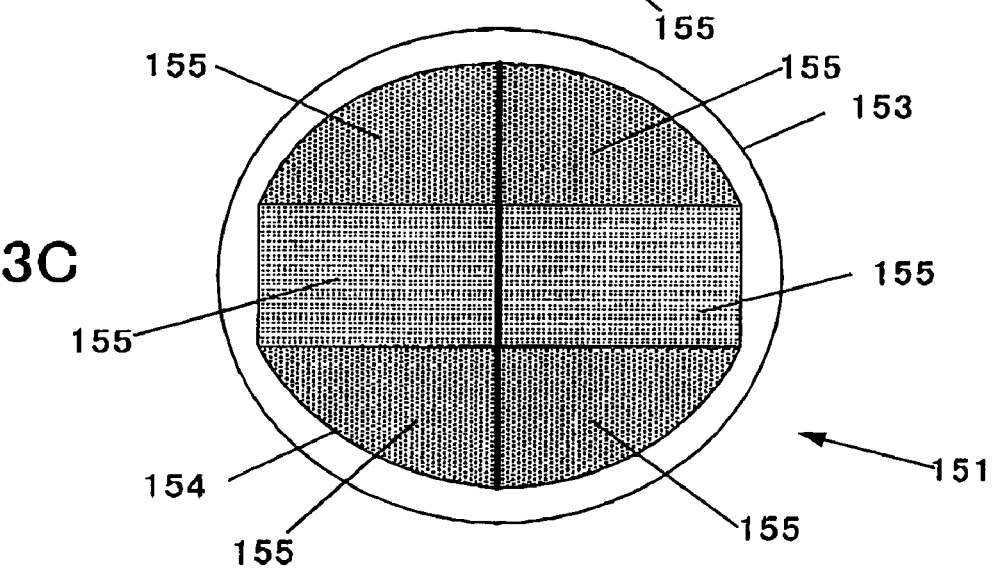

Fig. 22A

| Angle Flag | Angle |
|---|---|
| 0 0 | Reset |
| 0 1 | Horizontal(180 degree) |
| 1 0 | Vertical(90 degree) |
| 1 1 | Obliquely(45 degree) |

Fig. 22B

| X-direction Flag | Sign |
|---|---|
| 0 0 | Reset |
| 0 1 | Positive |
| 1 0 | Negative |

| Y-direction Flag | Sign |
|---|---|
| 0 0 | Reset |
| 0 1 | Positive |
| 1 0 | Negative |

Fig. 22C

| Angle Flag | X-direction Flag | Y-direction Flag | Movement Direction Information |
|---|---|---|---|
| 0 1 | 0 1 |  | A0(Horizontal, Positive) |
| 0 1 | 1 0 |  | A1(Horizontal, Negative) |
| 1 0 |  | 0 1 | A2(Vertical, Positive) |
| 1 0 |  | 1 0 | A3(Vertical, Negative) |
| 1 1 | 0 1 | 0 1 | A4(Obliquely, Upper Right) |
| 1 1 | 0 1 | 1 0 | A5(Obliquely, Lower Right) |
| 1 1 | 1 0 | 0 1 | A6(Obliquely, Upper Left) |
| 1 1 | 1 0 | 1 0 | A7(Obliquely, Lower Left) |

| Movement Direction Information | Storage Location Information of Animation Table |
|---|---|
| A0 | address 0 |
| A1 | address 1 |
| . | . |
| . | . |
| . | . |
| A7 | address 7 |

Fig. 25

| Storage Location of Animation | Segment | Duration | Next Segment | Object Size | Color Palette | Depth | Sprite Size |
|---|---|---|---|---|---|---|---|
| ad0 | 1 | 1 | next | a0 Pixels × b0 Pixels | P0 | D0 | A0 Pixels × B0 Pixels |
|  | ... | ... | ... |  |  |  |  |
|  | 15 | 1 | top |  |  |  |  |
| ad1 | 1 | 1 | next | a0 Pixels × b0 Pixels | P0 | D0 | A0 Pixels × B0 Pixels |
|  | ... | ... | ... |  |  |  |  |
|  | 15 | 1 | top |  |  |  |  |
| ... |  |  |  | ... | ... | ... | ... | address 0: ad0 rows; address 1: ad1 rows

GAME FOR MOVING AN OBJECT ON A SCREEN IN RESPONSE TO MOVEMENT OF AN OPERATION ARTICLE

This application claims foreign priority based on Japanese Patent application No. 2003-362637, filed Oct. 23, 2003, the contents of which is incorporated herein by reference in its entirety.

BACKGROUND OF THE INVENTION

1. Field of the Invention

The present invention is related to a game apparatus and related arts thereof for playing by operating an operation article to move an object displayed on a screen.

2. Description of the Related Art

The following maze game apparatus is described in Patent publication (Jpn. unexamined patent publication No. 2002-263370). A player operates an input device (key board, mouse etc.) to move an object displayed on a screen for proceeding through a maze. In this case, a pathway of the maze is changed every predetermined period. As a result, the player can enjoy the maze game without growing weary.

In case of this conventional maze game apparatus, since the object is operated by an ordinary input device such as a mouse used for a personal computer, the operation is merely extension of operation of the personal computer. In addition, because the input device is used for the personal computer, it is hard to say it is suitable for this kind of game from the point of view of operationality. Furthermore, sometimes it is difficult for people who do not get used to use a personal computer if a game is performed on the personal computer.

So far, the following game played in real space has been available. For example, a pathway is formed by arranging two metal wires vertically. A player inserts a bar provided with metal to the pathway from the side, and moves the bar along the pathway trying not to touch the metal wires. When the metal part of the bar touches either of metal wires, since an electric current flows through the metal wires, it results in giving off sparks, and then the game is over.

Conventionally, the computer game operable to perform the game originally played in the real space has been available. In other words, a player operates an input device (a controller for game apparatus etc.) to move an object displayed on a screen for proceeding through a maze. Then, when the object touches wails of the maze, the game is over. For example, there is the TV game (Product name: Denryu Iraira-bou (registered trademark) Returns) released by Zaurus Corporation on 19 Mar. 1998.

In case of the conventional game apparatus, since the object is operated by a multipurpose controller for an game apparatus, the player operates direction keys and an analog stick to move the object. In other words, the player does not actually move the controller itself but pushes the provided direction keys or operates the analog stick to move the object. Some people find it difficult to operate this kind of controller efficiently.

SUMMARY OF INVENTION

It is an object of the present invention to provide a game apparatus which allows intuitive operation of an object displayed on a screen and can be played with easy operation.

In accordance with the first aspect of the present invention, a game apparatus comprises: a stroboscope operable to direct light onto an operation article at predetermined intervals; an imaging device operable to image said operation article with and without light emitted from said stroboscope and generate a lighted image signal and a non-lighted image signal; a differential signal generating unit operable to generate a differential signal between said lighted image signal and said non-lighted image signal; a state information calculating unit operable to calculate state information of said operation article on the basis of said differential signal; a coupled object control unit operable to control display of a coupled object which moves as said operation article moves in accordance with said state information of said operation article; and a restrictive image control unit operable to control a restrictive image which limits movement of said coupled object.

In accordance with this configuration, the coupled object moves in conjunction with the motion of the operation article. As a result, the game apparatus allows intuitive operation of the coupled object displayed on a screen and can be played with easy operation.

In accordance with the second aspect of the present invention, a game apparatus comprises: a stroboscope operable to direct light onto a operation article at predetermined intervals; an imaging device operable to image said operation article with and without light emitted from said stroboscope and generate a lighted image signal and a non-lighted image signal; a differential signal generating unit operable to generate a differential signal between the lighted image signal and the non-lighted image signal; a state information calculating unit operable to calculate state information of said operation article; a cursor control unit operable to control display of a cursor indicating location of said operation article on a screen and a following object control unit operable to control display of a following object which follows said cursor on the basis of coordinate information of said cursor.

In accordance with this configuration, since the cursor represents location of the operation article on the screen, the motion of the cursor needs to be synchronized or almost synchronized with the motion of the operation article. Therefore, the cursor control is bound by the motion of the operation article. On the other hand, since the following object follows the motion of the cursor, it is possible to set arbitrary in what manner the following object follows the cursor. Therefore, it is possible to give variety to the motion of the following object and also give more impressive optical effect.

In addition, since the cursor is controlled on the basis of the state information of the operation article, the cursor moves in synchronization with the motion of the operation article. Therefore, intuitive operation of the cursor becomes possible so that the player can play the game with easy operation.

This game apparatus further comprises a restrictive image control unit operable to control a restrictive image which limits movement of the following object.

In accordance with this configuration, the player has to move the following object and avoid the restrictive image by operating the cursor using the operation article. In this way, the game becomes more exciting so that the player can enjoy the game more.

The above game apparatus according to the first and second aspect of the present invention further comprises a game managing unit operable to manage information indicating whether a player can continue a game and ends the game in accordance with said information.

In accordance with this configuration, since the player can not play the game without any restriction, the player has to play the game with a sense of tension so that the game becomes more exciting.

In the above game apparatus according to the first and second aspect of the present invention, said restrictive image control unit comprises a background image control unit operable to control background scroll and wherein said background image includes said restrictive image.

In accordance with this configuration, since controlling the background image scroll and controlling the obstacle image are similar meaning, the restrictive image display control becomes easier.

In the above game apparatus according to the first and second aspect of the present invention, said restrictive image control unit comprises a restrictive object control unit operable to control a restrictive object which consists of a single sprite or a plurality of sprites as said restrictive image.

In accordance with this configuration, it is possible to perform more detailed display control of the restrictive image so that the flexibility of designing game contents is improved.

In the above game apparatus according to the first and second aspect of the present invention, said restrictive image is an image constructing a maze.

In accordance with this configuration, as mentioned above, since tho coupled object or the cursor moves in conjunction with the motion of the operation article, more intuitive operation becomes possible and the player can play the maze game with ease.

In the above game apparatus according to the first and second aspect of the present invention, when said coupled object touches or thrusts into an area which said restrictive image is displayed, a game is over.

In accordance with this configuration, since it is possible to operate the coupled object or the cursor by operating the operation article, the player can enjoy feeling as if the player operated the operation article to avoid obstacles existing in actual space even though the restrictive image and the coupled object or the restrictive image and the cursor actually exist on the screen. In addition, it is possible to reduce the cost and necessary space to play the game as compared to a game apparatus for dodging obstacles in real space.

In the above game apparatus according to the first and second aspect of the present invention, said state information of said operation article derived by said state information calculating unit includes any one of speed information, movement direction information, movement distance information, velocity vector information, acceleration information, motion path information, area information and location information, or a combination thereof.

In accordance with this configuration, since it is possible to control the coupled object or the cursor by using various information of the operation article, the flexibility of designing game contents is improved.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 3A is a top view of the reflecting ball of FIG. 2.

FIG. 3B is a side view from the direction of an arrow A of FIG. 3A.

FIG. 3C is a side view from the direction of an arrow B of FIG. 3A.

FIG. 22A is a view showing a relation between a value of the angle flag and the angle.

FIG. 22B is a view showing a relation between a value of the direction flag and a sign indicating the direction.

FIG. 22C is a view showing a relation among the angle flag, the direction flag and the movement direction information.

FIG. 25 is a view showing an example of the animation table designated by the storage location information of FIG. 24 for animating the mermaid.

DESCRIPTION OF THE PREFERRED EMBODIMENTS

In what follows, an embodiment of the present invention will be explained in conjunction with the accompanying drawings. Similar elements are given similar references throughout the respective drawings.

Figure 1:
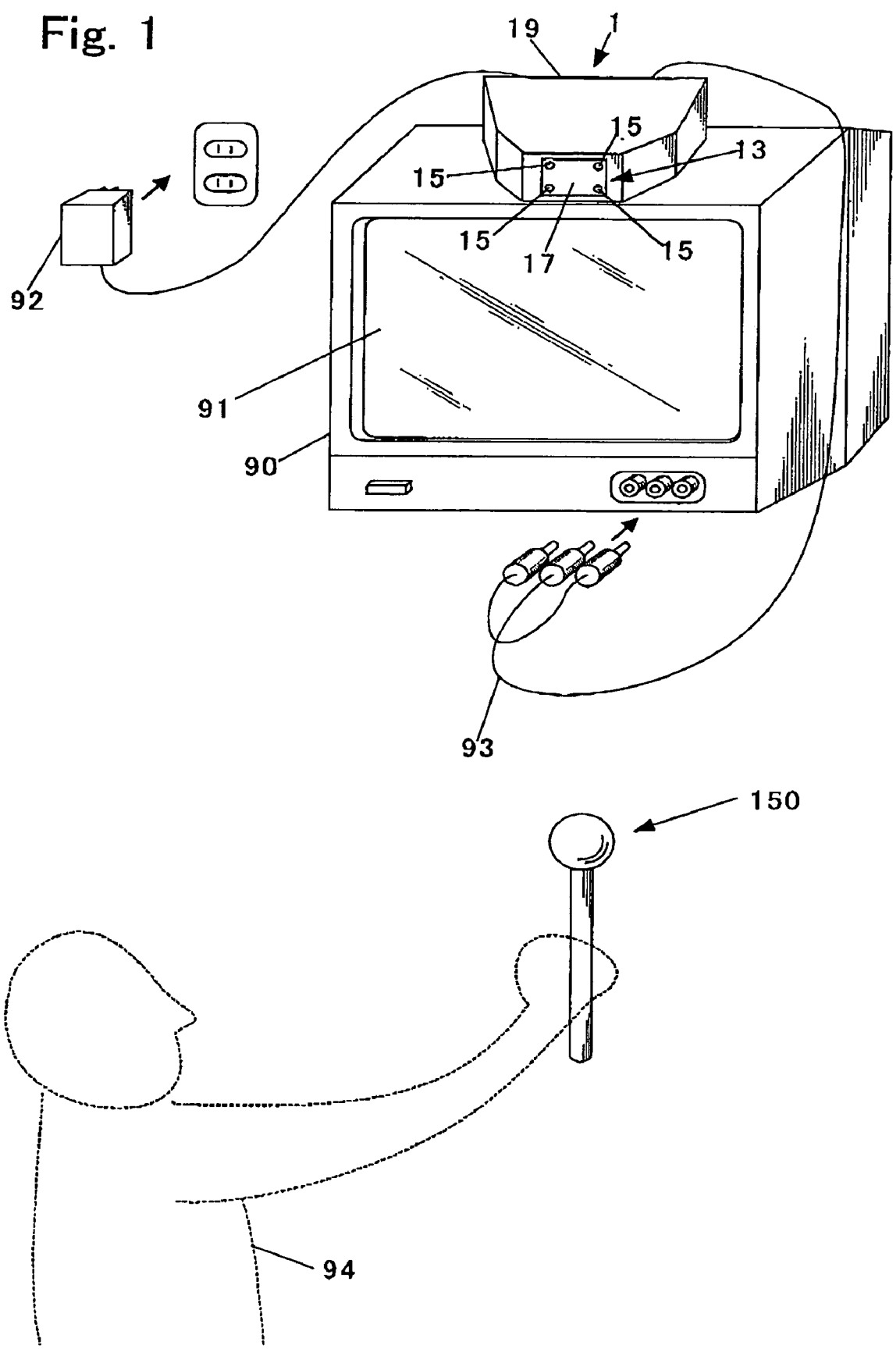
FIG. 1 is a view showing the overall configuration of a game system in accordance with the embodiment of the present invention.

FIG. 1 is a view showing the overall configuration of a game system in accordance with the embodiment of the present invention. As illustrated in FIG. 1, this game system includes a game apparatus 1, an operation article 150, and a television monitor 90.

An imaging unit 13 is installed in a housing 19 of the game apparatus 1. The imaging unit 13 has four infrared-emitting diodes 15 and an infrared filter 17. Light emitting portions of the infrared-emitting diodes 15 are exposed from the infrared filter 17.

An AC adapter 92 supplies the game apparatus 1 with direct current power voltage. However, instead of using the AC adaptor 92, the game apparatus 1 can be supplied with the direct current power voltage from batteries (not shown). A screen 91 is provided on the front surface of the television monitor 90. The television monitor 90 and the game apparatus 1 are connected by an AV cable 93. For example, the game apparatus 1 is set up on the television monitor 90 as illustrated in FIG. 1.

When a player 94 turns on a power switch (not shown) provided on back of the game apparatus 1, a game screen is displayed on the screen 91. The player 94 operates the operation article 150 to move a cursor and a following object (hereinafter described) on the game screen, and proceeds with a game. Meanwhile, operating the operation article 150 does not mean pushing switches or operating analog sticks but moving the operation article 150 itself.

Each of the infrared-emitting diodes 15 intermittently emits infrared-light. The infrared-light as emitted by the infrared-emitting diodes 15 is reflected by reflecting sheets (hereinafter described) provided on the operation article 150, and then the return light is input to a imaging device (hereinafter referred) placed behind the infrared filter 17. In this way, the operation article 150 is imaged intermittently. Therefore, the game apparatus 1 can acquire intermittent image signals of the operation article 150 moved by the player 94. The game apparatus 1 analyzes the image signals, and reflects the result to game process. The reflecting sheet used in this embodiment is, for example, a retroreflective sheet.

Figure 2:
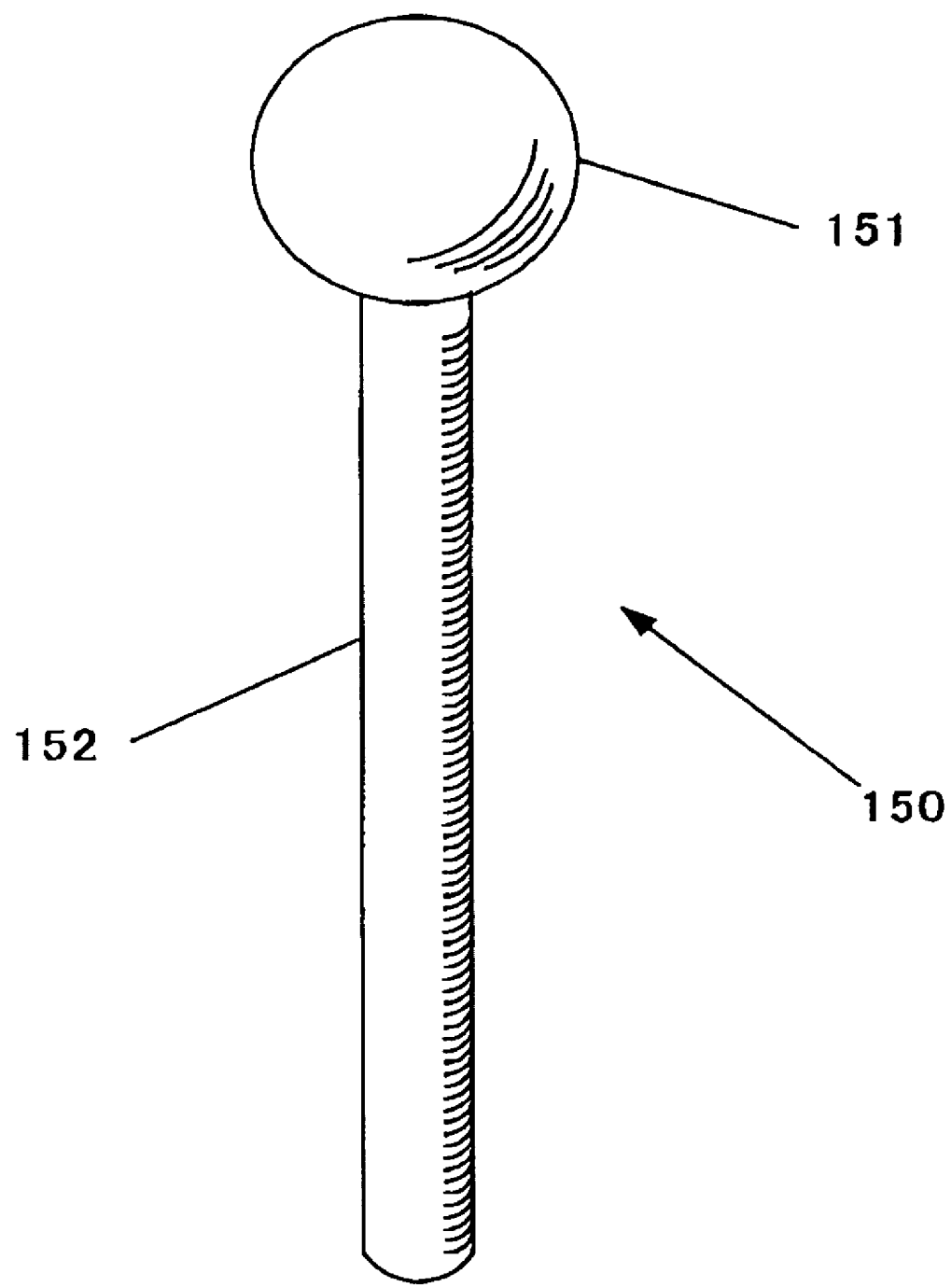
FIG. 2 is a perspective view of the operation article of FIG. 1.

FIG. 2 is a perspective view of the operation article 150 of FIG. 1. As illustrated in FIG. 2, the operation article is provided with a reflecting ball 151 fixed on the top of a stick 152. The reflecting ball 151 reflects the infrared-light emitted by infrared emitting diodes 15. The reflecting ball 151 will be described in detail.

FIG. 3A is a top view of the reflecting ball 151 of FIG. 2. FIG. 3B is a side view from the direction of an arrow A of FIG. 3A. FIG. 3C is a side view from the direction of an arrow B of FIG. 3A.

As illustrated in FIG. 3A to 3C, the reflecting ball 151 consists of a transparent (including translucent, colored transparent and colorless transparent) outer spherical shell 153 and an inner spherical shell 154, wherein the inner spherical shell 154 is secured inside of the outer spherical shell 153. Reflecting sheets 155 are provided on the surface of the inner spherical shell 154. These reflecting sheets 155 reflect the infrared-light coming from infrared-emitting diodes 15.

Figure 4:
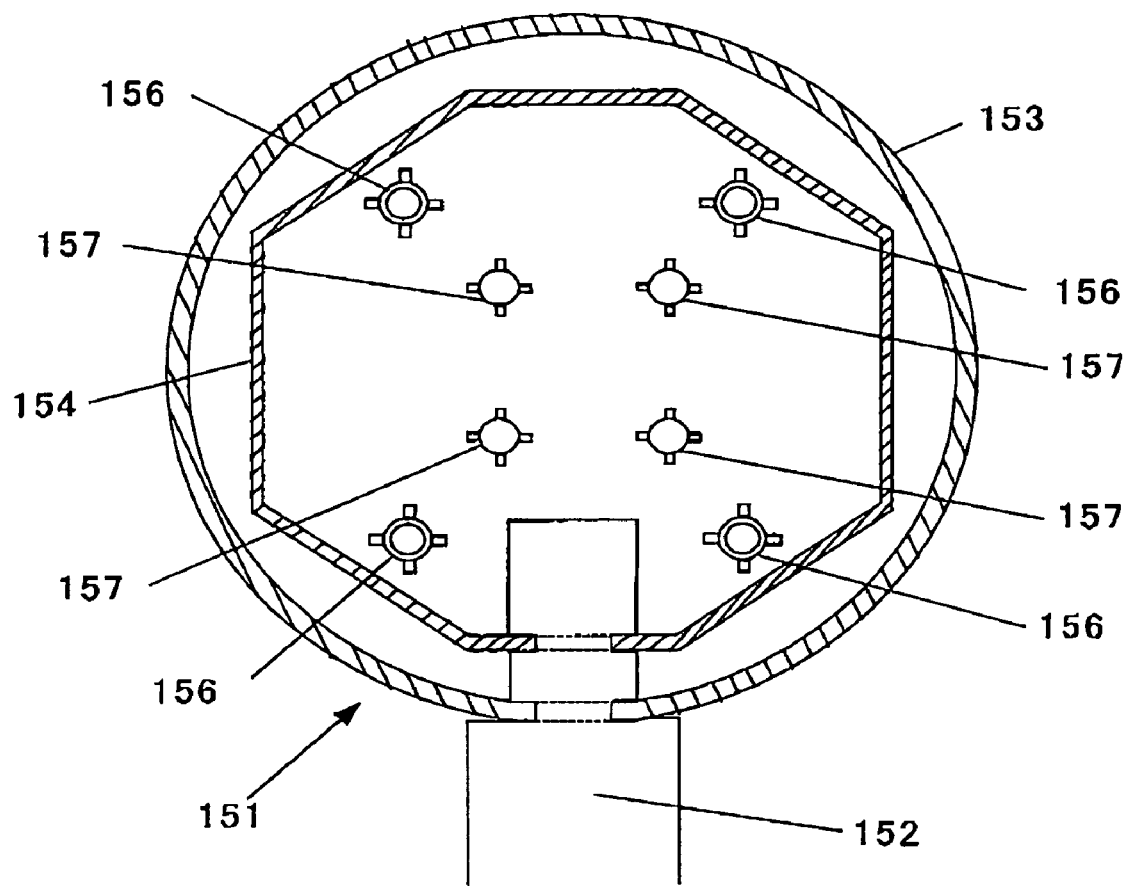
FIG. 4 is a vertical cross-sectional view of the reflecting ball of FIG. 2.

FIG. 4 is a vertical cross-sectional view of the reflecting ball 151 of FIG. 2. As illustrated in FIG. 4, the outer spherical shell 153 is formed by two outer semispherical shells fixed together by bosses 156 and screws (not shown). The inner spherical shell 154 is formed by two inner semispherical shells fixed together by bosses 157 inside of the outer spherical shell 153. Meanwhile, the stick 152 is set in and fixed with the reflecting ball 151. More specifically, the stick 152 is nipped between two outer semispherical shells constructing the outer spherical shell 153 and also nipped between two inner semispherical shells constructing the inner spherical shell 154, then the outer semispherical shells are fixed by the bosses 156 and the screws, and then the inner semispherical shells are fixed by the bosses 157.

Figure 5:
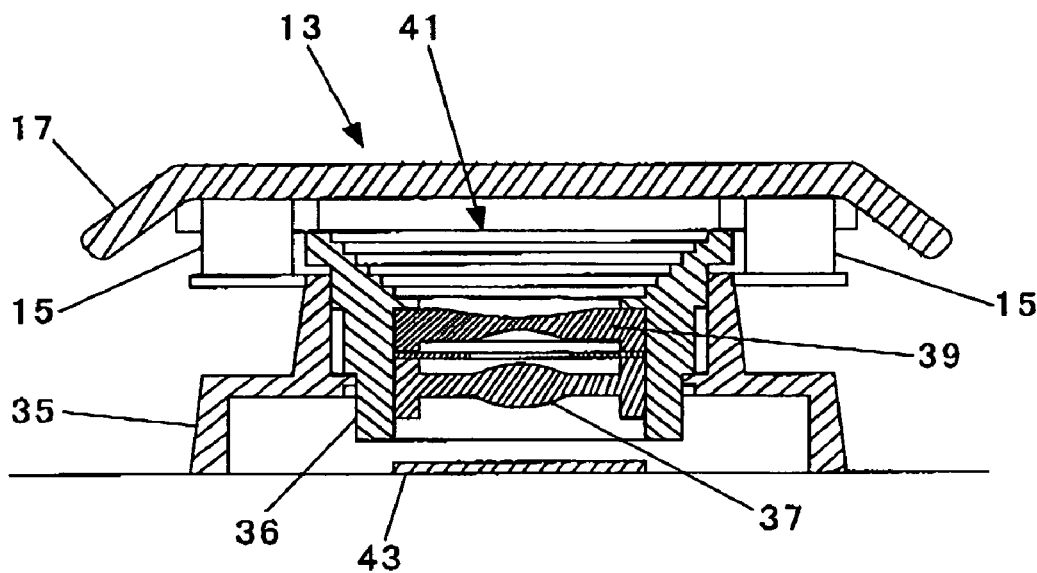
FIG. 5 is a cross-sectional view of an example of the imaging unit of FIG. 1.

FIG. 5 is a cross-sectional view of an example of the imaging unit 13 of FIG. 1. As shown in FIG. 5, this imaging unit 13 includes a unit base 35 which is, for example, formed of plastic, and a supporting cylindrical part 36 is attached inside of the unit base 35. In addition, an inverted-cone-shaped (or trumpet-shaped) aperture 41 is formed in the upper side of the supporting cylindrical part 36. An optical system including a concave lens 39 and converging lens 37 is attached inside of the supporting cylindrical part 36 so that it is located under the inverted-cone-shaped aperture 41. For example, the concave lens 39 and the converging lens 37 are formed of lucent plastic. An image sensor 43 as an imaging device is firmly fixed under the converging lens 37. Therefore the image sensor 43 can pick up an image in response to incident light passing through the concave lends 39 and the converging lends 37 from the aperture 41.

The image sensor 43 is a low-resolution CMOS image sensor (for example, 32 pixels×32 pixels, gray scale). However, this image sensor 43 can be replaced by a higher resolution image sensor or other device such as CCD. In what follows, it is assumed that the image sensor 43 consists of 32 pixels×32 pixels. Furthermore, the unit base 35 has several (4 in this embodiment) infrared-emitting diodes 15 which flash upwardly. The upside of the imaging unit 13 is lighted by infrared-light from these infrared-emitting diodes 15. Meanwhile, the infrared filter 17 (which transmits only infrared-light) is arranged in a manner to bring it cover the aperture 41. Moreover, as explained later, the infrared-emitting diodes 15 repeat flash and un-flash alternately so that they can serve as a stroboscope. The term "stroboscope" is a generic term, which indicates an apparatus that intermittently irradiates light to a moving object. The above-mentioned image sensor 43 can, therefore, image an article that moves within a scope of the imaging unit 13, or the operation article 150 in this embodiment. Referring to after-mentioned FIG. 8, the stroboscope consists of the infrared-emitting diodes 15, a LED drive circuit 75 and a high speed processor 200.

The imaging unit 13 is installed in the housing 19 and its light receiving surface is inclined prescribed angle (for example, 90 degrees) from horizontal-plane. In addition, the scope of the image sensor 43 is a range of 60 degrees, which depends on the concave lens 39 and the converging lends 37.

Figure 6:
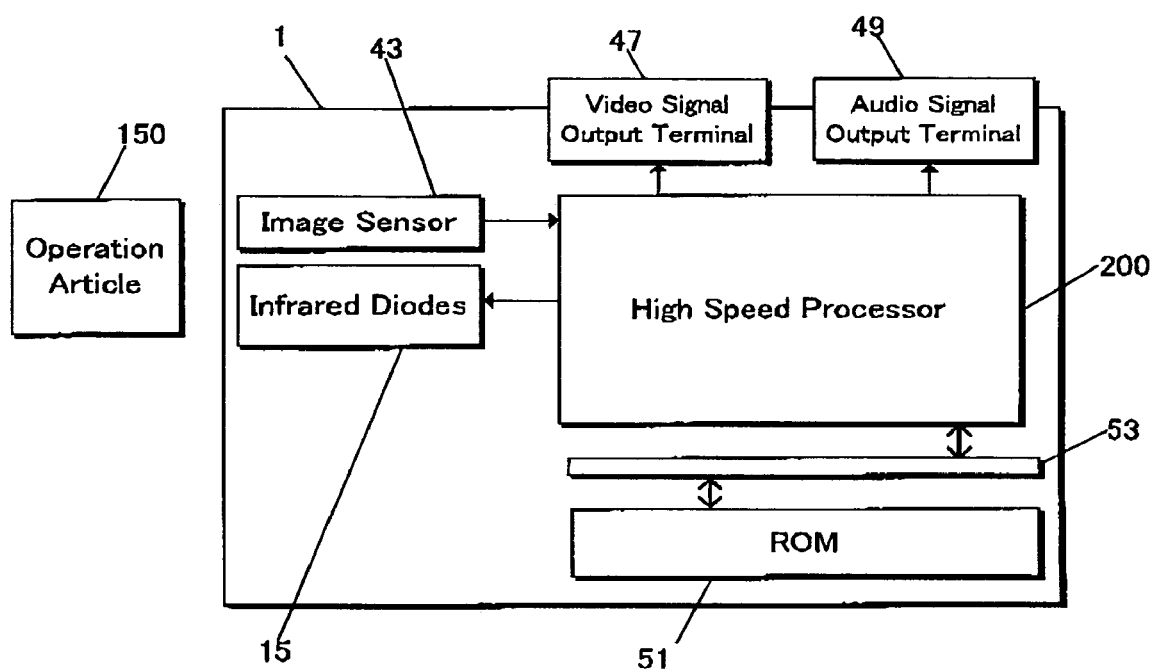
FIG. 6 is a view showing the electrical structure of the game apparatus of FIG. 1.

FIG. 6 is a view showing the electrical structure of the game apparatus 1 of FIG. 1. As shown in FIG. 6, the game apparatus 1 include the image sensor 43, the infrared-emitting diodes 15, a video signal output terminal 47, an audio signal output terminal 49, the high speed processor 200, a ROM (read only memory) 51 and a bus 53.

The high speed processor 200 is connected with the bus 53. Furthermore, the bus 53 is connected with the ROM 51. Therefore, the high speed processor 200 can access the ROM 51 via the bus 53 so that the high speed processor 200 can read a control program stored in the ROM 51 and execute the control program. In addition, the high speed processor 200 reads image data and sound data stored in the ROM 51 and processes them. Then, the high speed processor 200 generates a video signal and an audio signal, and outputs them to the video output terminal 47 and the sound output terminal 49.

The operation article 150 is exposed to infrared-light coming from the infrared-emitting diodes 15 and reflects the infrared-light by the reflecting sheets 155. The return light from reflecting sheets 155 is detected by the image sensor 43, and then the image sensor 43 outputs an analog image signal of the reflecting sheets 155. The analog image signal from the image sensor 43 is converted into a digital image signal by an A/D converter (hereinafter referred) built in the high speed processor 200. The same process is also executed when the infrared-emitting diodes 15 do not flash. Then the high speed processor 200 analyzes these digital image signals and reflects the result to game processing.

Figure 7:
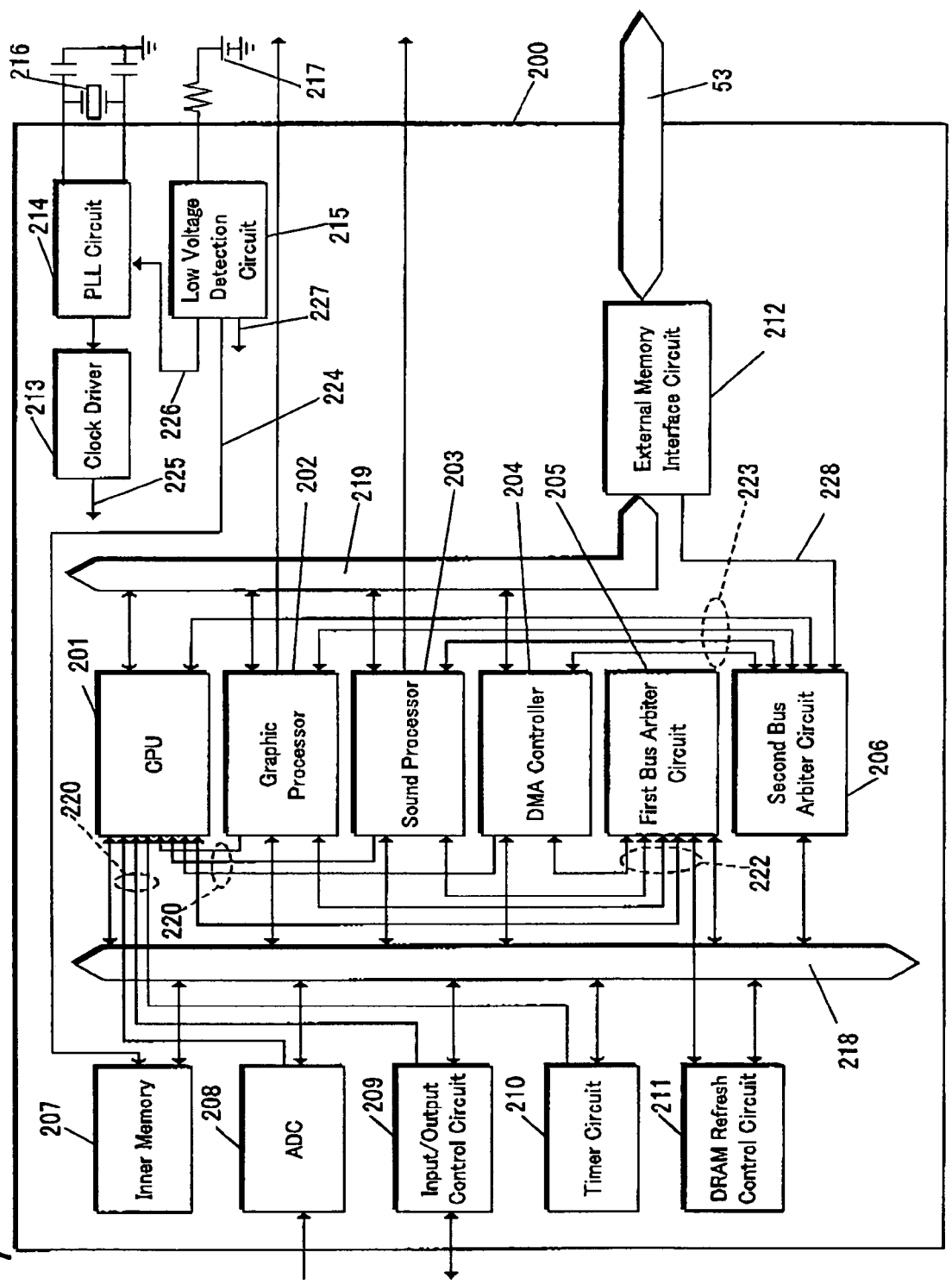
FIG. 7 is a block diagram of the high speed processor of FIG.

FIG. 7 is a block diagram of the high speed processor 200 of FIG. 6. As shown in FIG. 7, this high speed processor 200 includes a CPU (central processing unit) 201, a graphic processor 202, a sound processor 203, a DMA (direct memory access) controller 204, a first bus arbitrator circuit 205, a second bus arbitrator circuit 206, an inner memory 207, an A/D converter (ADC: analog to digital converter) 208, an I/O (input and output) control circuit 209, a timer circuit 210, a DRAM (dynamic random access memory) refresh control circuit 211, an external memory interface circuit 212, a clock driver 213, a PLL (phase-locked loop) circuit 214, a low voltage detector circuit 215, a first bus 218 and a second bus 219. The CPU 201 performs various operations and controls the overall system in accordance with a program stored in the memory (the inner memory 207, or the ROM 51). In addition, the CPU 201 is a bus master of the first bus 218 and the second bus 219, and able to access resources connected with the each bus.

The graphic processor 202 is a bus master of the first bus 218 and the second bus 219. The graphic processor 202 generates a video signal on the basis of the data stored in the inner memory 207 or ROM 51, and then output the video signal to the video signal output terminal 47. The graphic processor 202 is controlled by the CPU 201 via the first bus 218. In addition, the graphic processor 202 has the functionality of generating an interrupt request signal 220 to the CPU 201.

The sound processor 203 is a bus master of the first bus 218 and second bus address bus 219. The sound processor generates an audio signal on the basis of the data stored in the inner memory 207 or ROM 51, and then output the audio signal to the audio signal output terminal 49. The sound processor 203 is controlled by the CPU 201 trough the first bus 218. In addition, the sound processor 203 has the functionality of generating an interrupt request signal 220 to the CPU 201.

The DMA controller 204 controls data transfer from the ROM 51 to the inner memory 207. Also, the DMA controller 204 has the functionality of outputting, to the CPU 201, an interrupt request signal 220 indicative of the completion of the data transfer. The DMA controller 204 is a bus master of the first bus 218 and second bus 219. In addition, the DMA controller 204 is controlled by the CPU 201 via the first bus 218.

The inner memory 207 may be implemented with appropriate one of a mask ROM, an SRAM (static random access memory) and a DRAM in accordance with the system requirements. If data in SRAM has to be kept by a battery, a battery 217 is provided. In the case where a DRAM is used, the so called refresh cycle is periodically performed to maintain the data contained therein. The first bus arbitrator circuit 205 accepts a first bus request signal from each bus master of the first bus 218, and performs arbitration, and then issues a first bus grant signal to each bus master. Each bus master is allowed to access the first bus after receiving the first bus grant signal. In FIG. 7, the first bus request signal and the first bus grant signal are referred as first bus arbitration signals 222.

The second bus arbitrator circuit 206 accepts a second bus request signal from each bus master of the second bus 219, and performs out arbitration, and then, issues a second bus grant signal to each bus master. Each bus master is allowed to access the second bus after receiving the second bus grant signal. In FIG. 7, the second bus request signal and the second bus grant signal are referred as second bus arbitrator signals 223.

The input/output control circuit 209 serves to perform input and output operations of input/output signals to enable the communication with external input/output device(s) and/or external semiconductor device (s). The read and write operations of input/output signals are performed by the CPU 201 through the first bus 218. Moreover, the Input/output control circuit 209 has the functionality of generating an interrupt request signal 220 to the CPU 201.

A LED control signal "LEDC" which controls the infrared-emitting diodes 15 is output from this I/O control circuit 209.

The timer circuit 210 has the functionality of generating an interrupt request signal 220 to the CPU 201 at time intervals as preset. The setting of the timer circuit 210 such as the time interval is performed by the CPU 201 through the first bus 218.

The ADC 208 converts an analog input signal into a digital signal. The digital signal is read by the CPU 201 via the first bus 218. Moreover, the ADC 208 has the functionality of generating an interrupt request signal 220 to the CPU 201.

This ADC 208 receives analog pixel data from the image sensor 43 and converts the analog pixel data into digital pixel data.

The PLL circuit 214 generates a high frequency clock signal by multiplication of the sinusoidal signal as obtained from a quartz oscillator 216.

The clock driver 213 amplifies the high frequency clock signal as received from the PLL circuit 214 to sufficient signal level to provide the clock signal to each function block.

The low voltage detector circuit 215 monitors the power voltage "Vcc" of a system, and issues the reset signal 226 of the PLL circuit 214 and the reset signal 227 of entire system when the power voltage falls below a certain voltage. In addition, in the case where the inner memory 207 comprises an SRAM and needs to maintain data by the power supply from the battery 217, the low voltage detector 215 has the functionality of issueing a battery back-up control signal 224 when the power voltage "Vcc" falls below the certain voltage.

The external memory interface circuit 212 has the functionality of connecting the second bus 219 to the external bus 53 and issuing a bus cycle completion signal 228 of the second bus 219 to control the length of the bus cycle of the second bus.

The DRAM refresh cycle control circuit 211 periodically and unconditionally gets the ownership of the first bus 218 to perform the refresh cycle of the DRAM at certain intervals. Needless to say, the DRAM refresh cycle control circuit 211 is provided in case where the inner memory 207 includes a DRAM.

Hereafter, with reference to FIG. 8 to FIG. 10, a configuration for inputting the pixel data from the image sensor 43 to the high speed processor 200 will be explained in detail.

Figure 8:
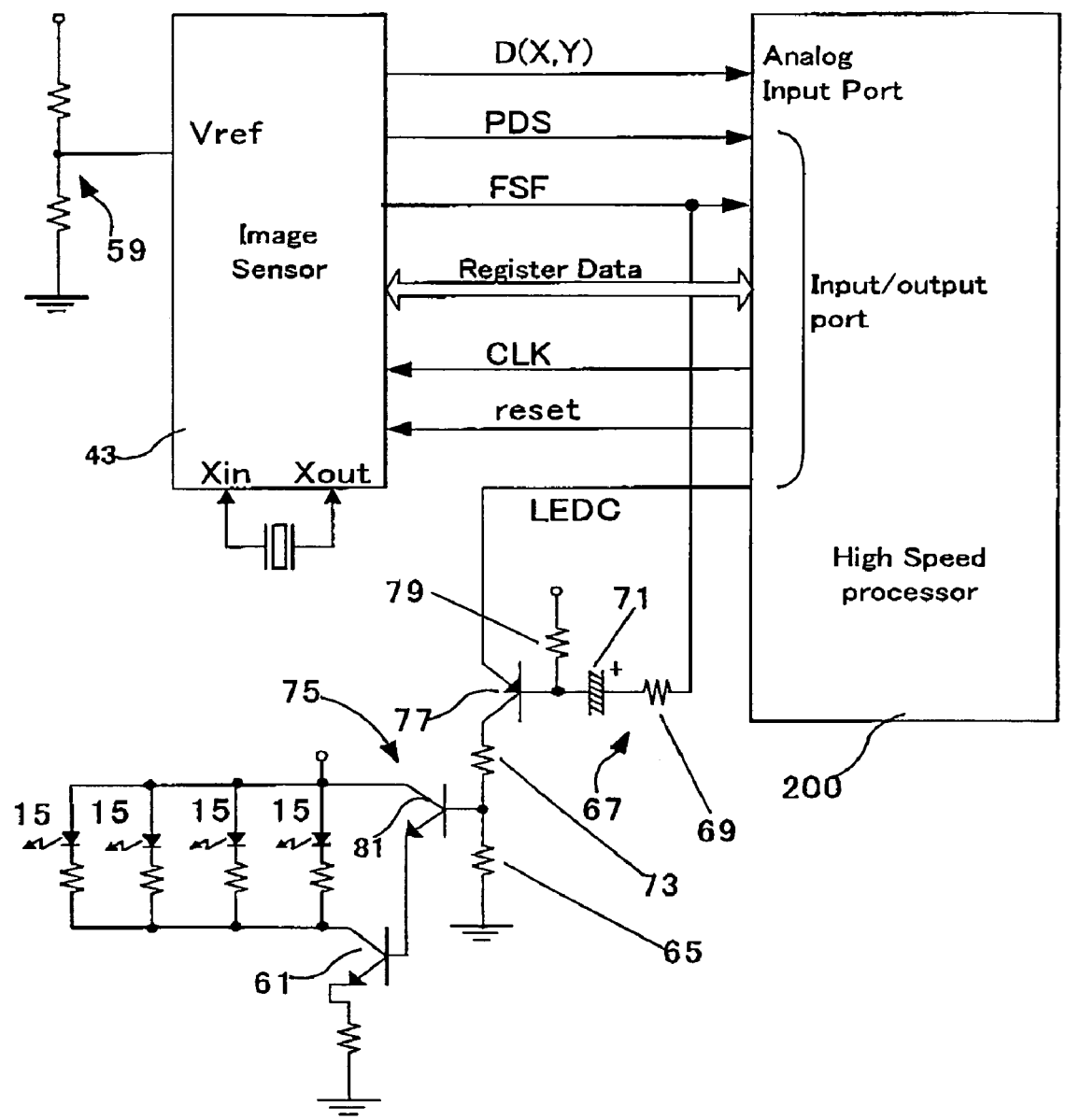
FIG. 8 is a circuit diagram showing the configuration for inputting the pixel data from the image sensor to the high speed processor of FIG. 6, and a LED driver circuit.

FIG. 8 is a circuit diagram showing the configuration for inputting the pixel data from the image sensor 43 to the high speed processor 200 of FIG. 6, and a LED driver circuit. FIG. 9 is a timing chart illustrating the process for inputting the pixel data from the image sensor 43 to the high speed processor 200. FIG. 10 is an enlarged view of a portion of the timing chart shown in FIG. 9.

As shown in FIG. 8, pixel data D (X, Y) is input to the analog input port of the high speed processor 200 since the image sensor 43 outputs the pixel data D (X, Y) as an analog signal. The analog input port is connected with the ADC 208 in this high speed processor 200. Therefore, the high speed processor 200 obtains the pixel data converted into digital data.

The middle point of above-mentioned analog pixel data D (X, Y) is determined on the basis of reference voltage applied to a reference voltage terminal "Vref" of the image sensor 43. Therefore, a reference voltage generating circuit 59 comprising a voltage dividing circuit is provided, and this circuit 59 constantly applies the reference voltage to the reference voltage terminal "Verf".

Each digital signal to control the image sensor 43 is input to the Input/output ports of the high speed processor 200, and also output from the Input/output ports. Each input/output port is a digital port operable to control input and output operation, and connected with the input/output control circuit 209 of the high speed processor 200.

More specifically, a reset signal "reset" to reset the image sensor 43 is output from the input/output port of the high speed processor 200, and transmitted to the image sensor 43. A pixel data strobe signal "PDS" and a frame status flag signal "FSF" are output from the image sensor 43 to the input/output ports of the high speed processor 200.

Figure 9:
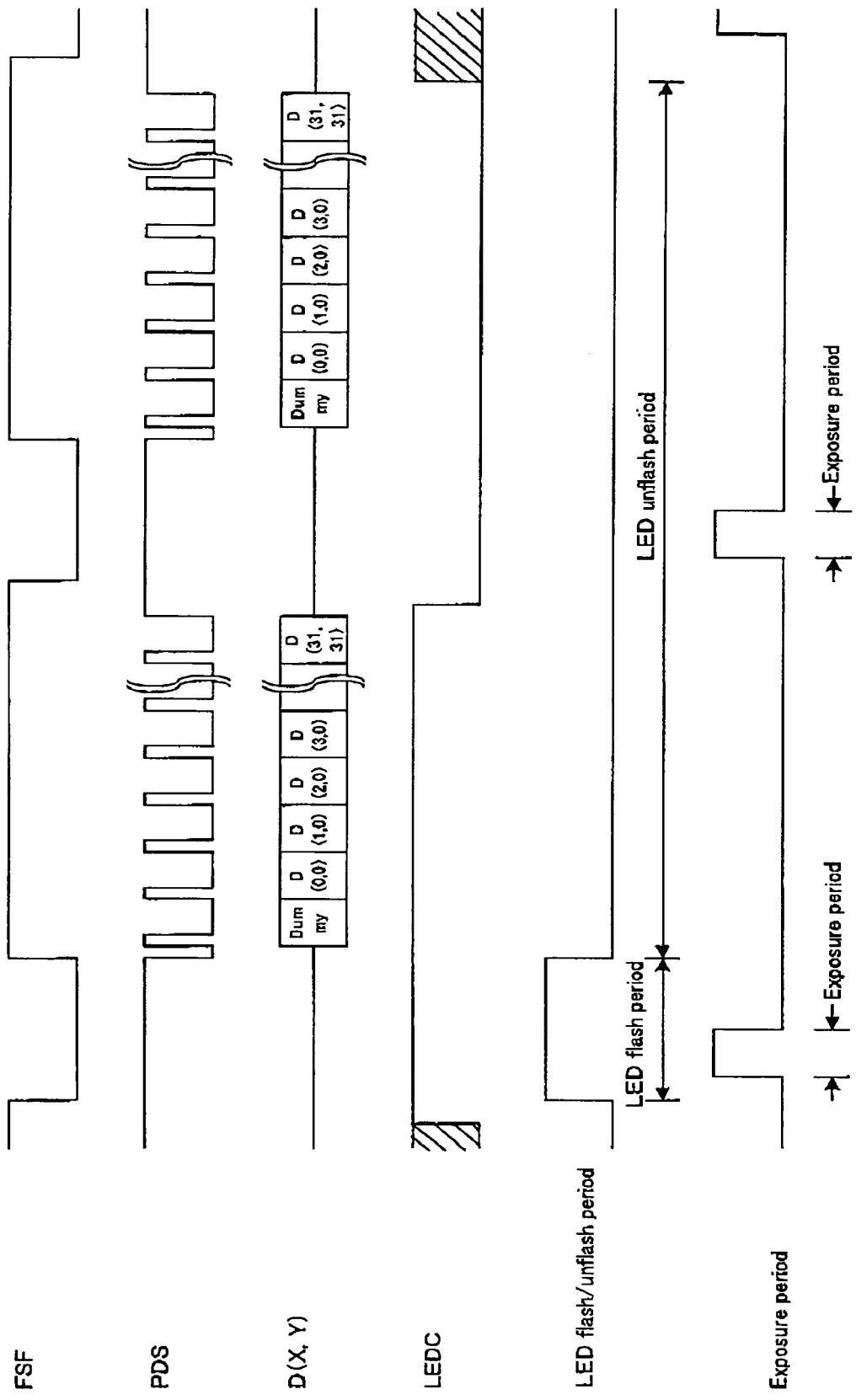
FIG. 9 is a timing chart illustrating the process for inputting the pixel data from the image sensor to the high speed processor.

As shown in FIG. 9, the pixel data strobe signal "PDS" is a strobe signal to read above-mentioned each pixel data D (X, Y) from the image sensor 43. The frame status flag signal "FSF" indicates a state of the image sensor 43, and as shown in FIG. 9, it determines an exposure period of the image sensor 43. In other words, a low-level period of the frame status flag signal "FSF" as illustrated in FIG. 9 shows the exposure period, and a high-level period shows an unexposure period.

In addition, the high speed processor 200 outputs a command (or a command and data) as register data to be set to a control register (not shown) of the image sensor 43 via the input/output ports. Furthermore, the high speed processor 200 outputs a register setting clock "CLK" which repeats a low-level period and a high-level period alternately. The register data and the register setting clock "CLK" are sent to the image sensor 43. As shown in FIG. 8, the four infrared-emitting diodes 15 are connected in parallel. As hereinbefore referred, these infrared-emitting diodes 15 are arranged so as to encompass the image sensor 43 and emit infrared-light to the direction same as a viewpoint direction of the image sensor 43 to irradiate the operation article 150 with the infrared-light.

These infrared-emitting diodes 15 are turned on or turned off by the LED driver circuit 75. The LED driver circuit 75 receives the above-mentioned frame status flag signal "FSF", and then, the signal "FSF" is applied to a base terminal of a PNP transistor 77 via a differentiation circuit 67 consisting of a resistor 69 and a capacitor 71. In addition, the base terminal of the PNP transistor 77 is connected with a pull-up resistor 79, and is normally pulled up to high level. When the frame status flag signal "FSF" becomes low level, the low-level signal "FSF" is input to the base terminal via the differentiation circuit 67. Therefore, the PNP transistor 77 is-turned on only when the level of the flag signal "FSF" is low.

An emitter terminal of the PNP transistor 77 is grounded via resistors 73 and 65. The connecting point of the emitter resistances 73 and 65 is connected with a base terminal of a NPN transistor 81. A collector terminal of this NPN transistor 81 is connected to anodes of the infrared-emitting diodes 15 in common. An emitter terminal of the NPN transistor 81 is connected to a base terminal of a NPN transistor 61 directly. Moreover, a collector terminal of the NPN transistor 61 is connected to cathodes of the infrared-emitting diodes 15 in common. An emitter terminal of the NPN transistor 61 is grounded.

This LED driver circuit 75 turns on the infrared-emitting diodes 15 only when the LED control signal "LEDC" which is output from the input/output port of the high speed processor 200 is active (high-level) and also the level of the frame status flag signal "FSF" from the image sensor 43 is low.

As shown in FIG. 9, the PNP transistor 77 is turned on while the level of the frame status flag signal "FSF" is low (there is actually a time-lag caused by a time constant of the differentiation circuit 67). Therefore, when the LED control signal "LEDC" illustrated in FIG. 9 is set to a high level by the high speed processor 200, the electric potential at the base terminal of the NPN transistor 81 becomes a high level. As a result, this transistor 81 is turned on. Then, when the transistor 81 is turned on, the transistor 61 is also turned on. Therefore, a current passes through each infrared-emitting diodes 15 and the transistor 61 from a power supply (described as a small circle in FIG. 8), and consequently the infrared-emitting diodes 15 flash as described in FIG. 9.

The LED driver circuit 75 turns on the infrared-emitting diodes 15 only while the LED control signal "LEDC" illustrated in FIG. 9 is active, and also the level of the frame status flag signal "FSF" is low. This means that the infrared-emitting diodes 15 flash only during the exposure period of the image sensor 43 (see FIG. 9).

Therefore, it is possible to restrain unnecessary power consumption. Besides, if the flag signal "FSF" retains its low-level because of overrun of the image sensor 43, the transistor 77 will be turned off after a predefined period and also the infrared-emitting diodes 15 will be turned off after the predefined period because the frame status flag signal "FSF" is coupled by the capacitor 71.

As described above, it is possible to set and change the exposure period of the image sensor 43 arbitrarily and freely by controlling the flame status signal "FSF".

In addition, it is possible to set and change a light emitting cycle (or the flash period and the unflash period) of the infrared-emitting diodes 15 (or the stroboscope) arbitrarily and freely by controlling the frame status flag signal "FSF" and/or the LED control signal "LEDC".

As already mentioned, when the operation article 150 is irradiated the infrared-light from the infrared-emitting diodes 15, the image sensor 43 is exposed to the return light from the operation article 150. Accordingly, in response to it, the above-mentioned pixel data D (X, Y) is output from the image sensor 43. More specifically, as shown FIG. 9, when the level of the frame status flag signal "FSF" is high (the unflash period of the infrared-emitting diodes 15), the image sensor 43 outputs the analog pixel data D (X, Y) in synchronization with the pixel data strobe "PDS".

The high speed processor 200 obtains the digital pixel data from the ADC 208 while monitoring the frame status flag signal "FSF" and the pixel data strobe "PDS".

Figure 10:
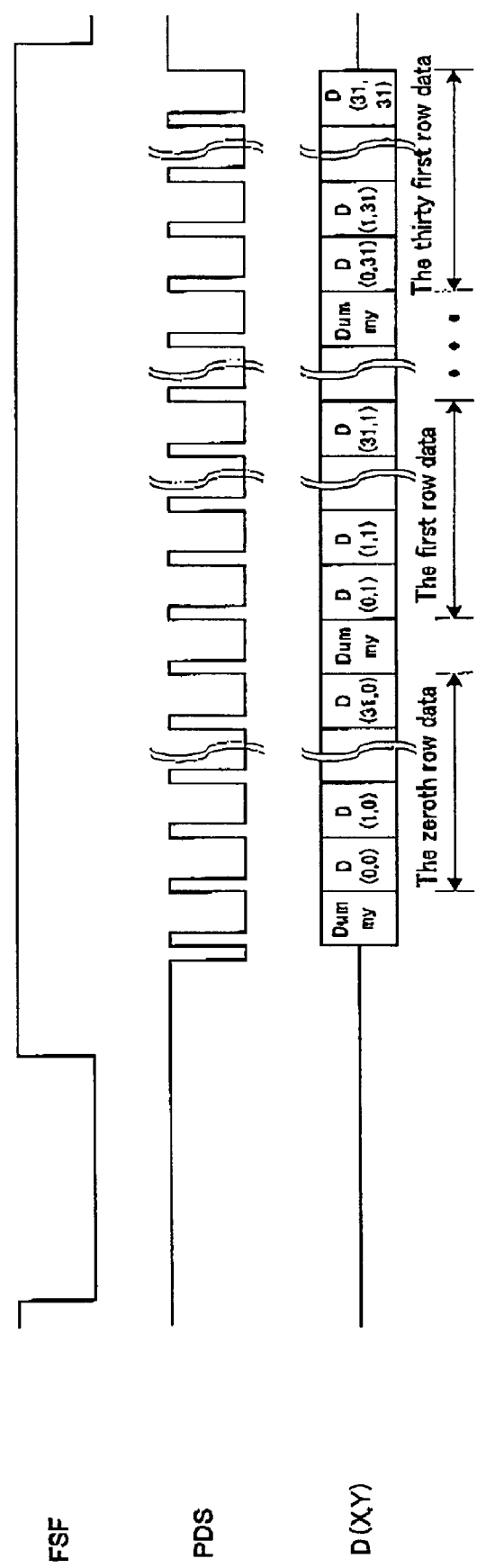
FIG. 10 is an enlarged view of a portion of the timing chart shown in FIG. 9.

As shown in FIG. 10, the pixel data D (X, Y) is output sequentially in order of row, for example, the zeroth row, the first row, . . . and the thirty first row. As hereinafter referred, the first one pixel of each row is dummy data.

Figure 11:
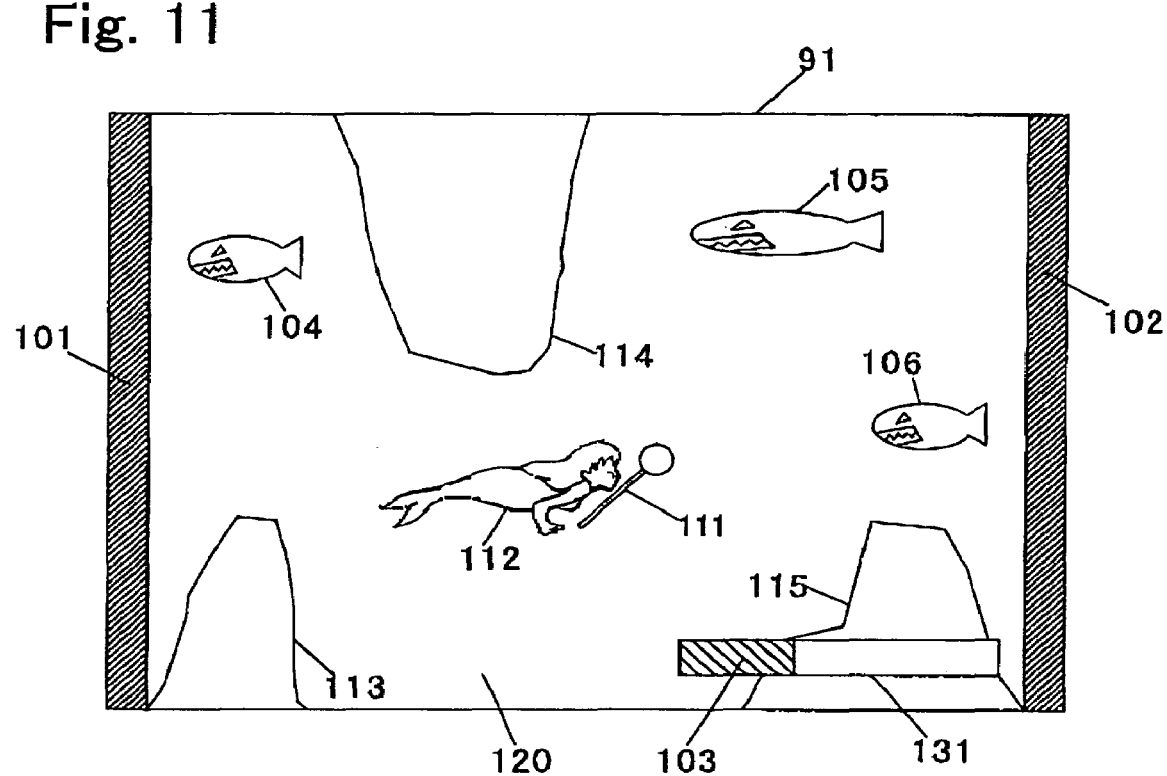
FIG. 11 is a view showing an example of the game screen in the first stage displayed on the screen of the television monitor.

In what follows, contents of the game served by the game apparatus 1 will be explained with reference to examples. FIG. 11 is a view showing an example of the game screen in the first stage displayed on the screen 91 of the television monitor 90. As illustrated in FIG. 11, the game screen includes a background 120, a cursor 111, a following object 112, obstacle objects 104 to 160, a power gauge 131, and masks 101 and 102. The background 120 includes obstacle images 113 to 115. The power gauge 131 includes a bar 103. Meanwhile, since the following object 112 is a mermaid-shaped figure, it may be called merely "mermaid 112". The obstacle objects 104 to 106 and after-mentioned obstacle objects might be sometimes collectively referred to as the obstacle object(s) "P". The obstacle images 113 to 115 and after mentioned obstacle images might be sometimes collectively referred to as the obstacle image(s) "Q".

The power gauge 131 shows the power of the mermaid 112. At the beginning, the bar 103 is the longest, which means the power is full. The bar 103 is getting shorter as time passes (getting less power), and when the bar 103 reaches "0" (running out of power), the game is over. The bar 103 is getting shorter from the longest to "0" at a constant speed as a general rule. In other words, the mermaid 112 is losing its power at the constant speed as the general rule.

The background 120 is scrolled to the left direction. Needless to say, the obstacle images 113 to 115 which are parts of the background 120 are also scrolled to the left direction. On the other hand, each of the obstacle objects 104 to 105 is formed by a single or several sprite(s). The obstacle objects appear from the right side on the screen 91 (the side of the mask 102), and then move to the left side on the screen 91 (the side of the mask 101) and vanish. The sprite(s) will be explained later.

The cursor 111 indicates a location of the operation article 150 on the screen 91, and moves on the screen 91 in conjunction with movement of the operation article 150. Therefore, operating the operation article 150 is same as operating the cursor 111 for the player 94. The mermaid 112 follows the motion of the cursor 111 (indirectly the motion of the operation article 150). The player 94 moves the mermaid 112 by the operation article 150 trying to avoid the obstacle objects 104 to 106 and the obstacle images 113 to 115 to reach goal before running out of the power (before the length of the bar 103 becomes "0").

If the mermaid 112 clashes the obstacle objects 104 to 106 or the obstacle images 113 to 115, the bar 103 of the power gauge 131 becomes shorter for a predetermined length independently of the before-mentioned constant speed, which means the power of the mermaid decreases drastically. It is possible to set not to decrease the power of mermaid 112 drastically when the mermaid 112 encounters another clash after predetermined period from the clash with the obstacle objects 104 to 106 or the obstacle images 113 to 115.

Figure 12:
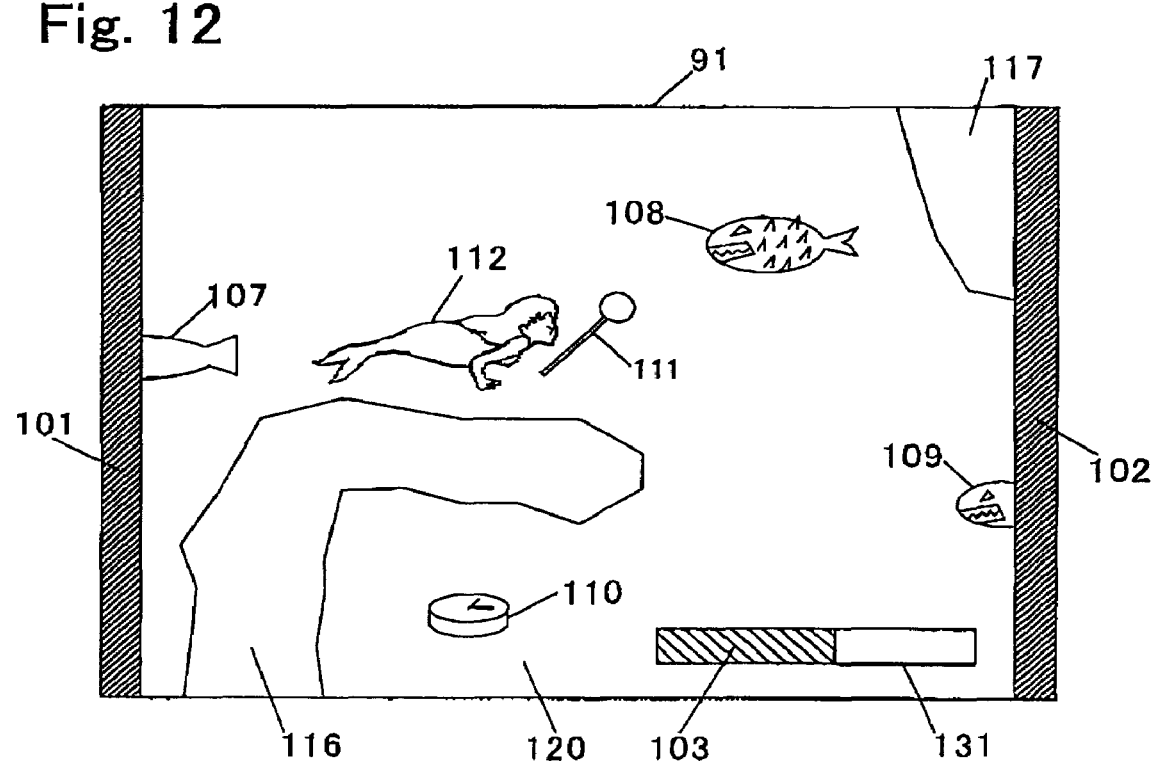
FIG. 12 is a view showing another example of the game screen in the first stage displayed on the screen of the television monitor.

FIG. 12 is a view showing another example of the game screen in the first stage displayed on the screen 91 of the television monitor 90. As illustrated in FIG. 12, this game screen contains a background 120, the cursor 111, the mermaid 112, obstacle objects 107 to 109, the power gauge 131, an item 110, and masks 101 and 102. The background 120 includes obstacle images 116 and 117.

If the player 94 operates the mermaid 112 by the operation article 150 to move to a predefined area including the item 110, the bar 103 of the power gauge 131 becomes longer for a predetermined length. In other words, in this case, since the power of the mermaid 112 increases, it is advantageous for the player 94. The obstacle objects 107 to 109 and the obstacle images 116 and 117 are respectively similar to the obstacle objects 104 to 106 and the obstacle images 113 to 115.

Figure 13:
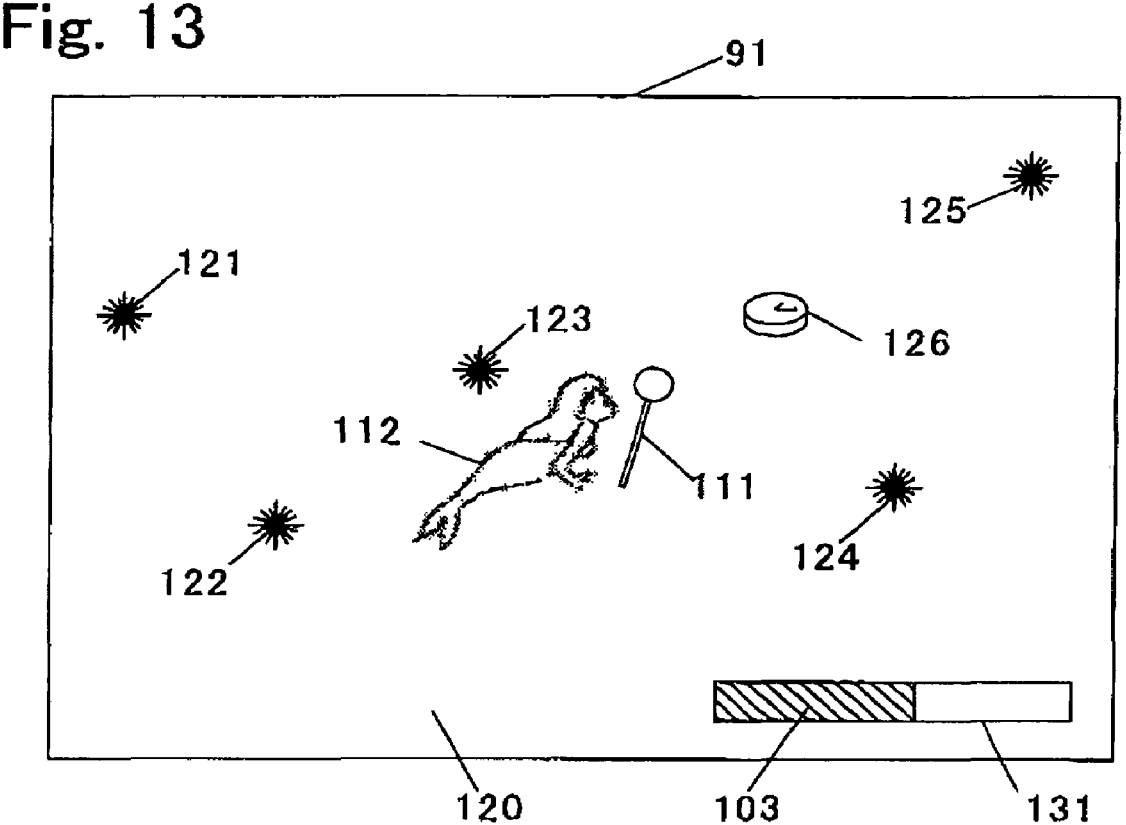
FIG. 13 is a view showing an example of the game screen in the second stage displayed on the screen of the television monitor of FIG. 1.

FIG. 13 is a view showing an example of the game screen in the second stage displayed on the screen 91 of the television monitor 90 of FIG. 1. As illustrated in FIG. 13, this game screen includes a background 120, the cursor 111, the mermaid 112, obstacle objects 121 to 125, the power gauge 131, and an item 126.

Each of the obstacle objects 121 to 125 and the item 126 are formed by a single or several sprite(s). The objects and the item appear from the top of the screen 91, and descend, and then vanish into the bottom of the screen 91. The background 120 is not scrolled in the second stage.

The player 94 operates the mermaid 112 by the operation article 150 to avoid the obstacle objects 121 to 125. When the mermaid 112 clashes with one of the obstacle objects 121 to 125, the bar 103 of the power gauge 131 becomes shorter for a certain length. In other words, the power of the mermaid 112 decreases. The item 126 is similar to the item 110 shown in FIG. 12.

Generally, series of images are provided for animation. Series of images of the mermaid 112 are provided for animating the mermaid 112. In addition, series of images of the obstacle object are also provided for animating the obstacle object "P". In this specification, each image for animating is called "segment".

As mentioned above, the mermaid 112, the obstacle objects 104 to 109 and 121 to 125, the items 110 and 126, and the power gauge 131 are formed respectively by a single or several sprite(s). One sprite comprises a set of pixel of which shape is oblong. Incidentally, the sprite can be arranged at any arbitrary position on the screen 91. The mermaid 112, the obstacle objects 104 to 109 and 121 to 125, the item 110 and 126, and the power gauge 131 are sometimes collectively called an object(s) (or an object image(s)).

Figure 14:
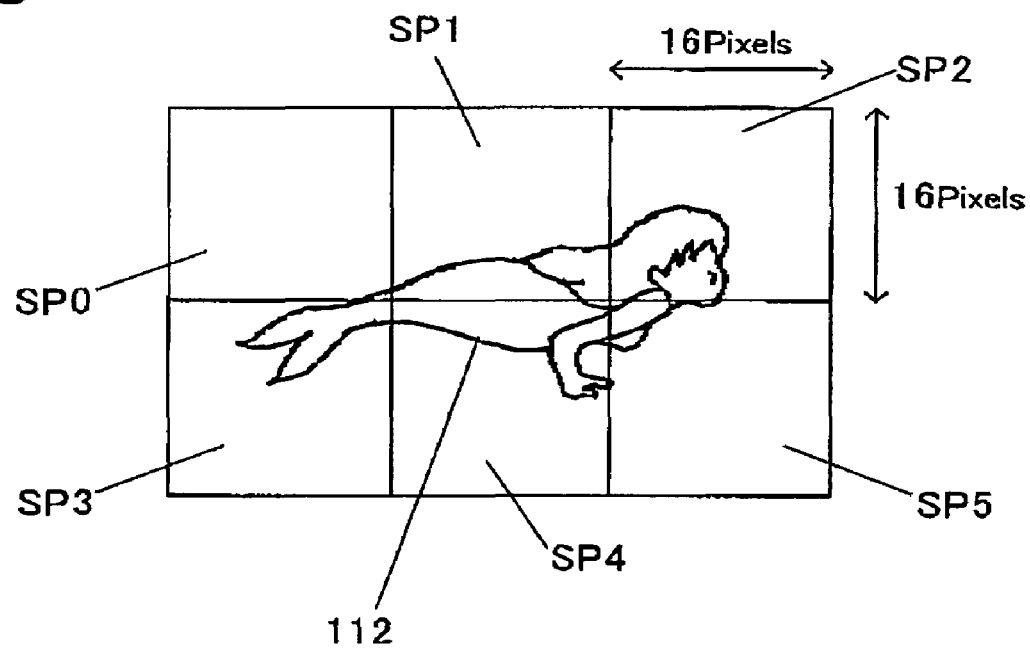
FIG. 14 is a view for explaining sprites constructing an object displayed on the screen.

FIG. 14 is a view for explaining sprites constructing an object displayed on the screen 91. For example, as illustrated in FIG. 14, the mermaid 112 shown in FIG. 11 is composed of six sprites sp0 to sp5. For example, each sprite SP0 to SP5 consists of 16 (width)×16 (height) pixels. For example, when the mermaid 112 is arranged on the screen 91, a coordinate where the center of the upper left sprite sp0 is arranged is designated. Coordinates where each center of sprites SP1 to SP5 should be arranged are calculated on the basis of the designated coordinate and the size of each sprite SP0 to SP5.

Next, the scrolling of the background 120 will be explained. First, a background screen will be explained.

Figure 15:
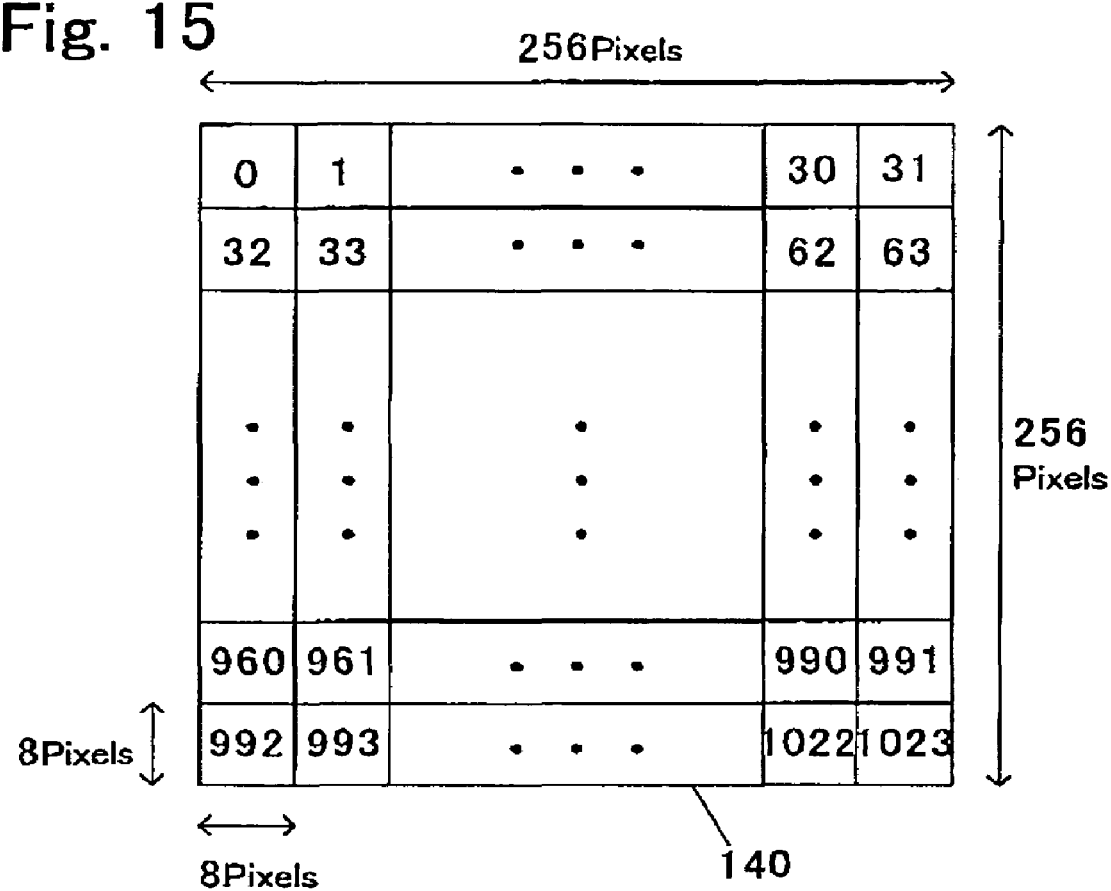
FIG. 15 is a view for explaining the background screen displayed on the screen of the television monitor of FIG. 1.

FIG. 15 is a view for explaining the background screen displayed on the screen 91 of the television monitor 90 of FIG. 1. For example, as illustrated in FIG. 15, the background screen 140 is formed by 32×32 blocks "0" to "1023". For example, each block "0" to "1023" is a square element consisting of 8×8 pixels. Array PA[0] to PA[1023] and array CA[0] to CA [1023] corresponding to the blocks "0" to "1023" are provided. The blocks "0" to "1023" are sometimes collectively called "block(s)", the array PA[0] to PA[1023] are sometimes collectively called "array PA", and the array CA[0] to CA [1023] are sometimes collectively called "array CA".

Storage location information of pixel pattern data (or data designating a pixel pattern) of each block is assigned to corresponding array PA. The pixel pattern data consists of color information of each pixel constructing the block. Incidentally, color palette information (or information designating a color palette) and a depth value of each block are assigned to corresponding array CA. The color palette consists of a certain number of color information items. The depth value indicates a depth position of a pixel, and if a plurality of pixels overlap each other, only the pixel having the largest depth value is displayed.

Figure 16A:
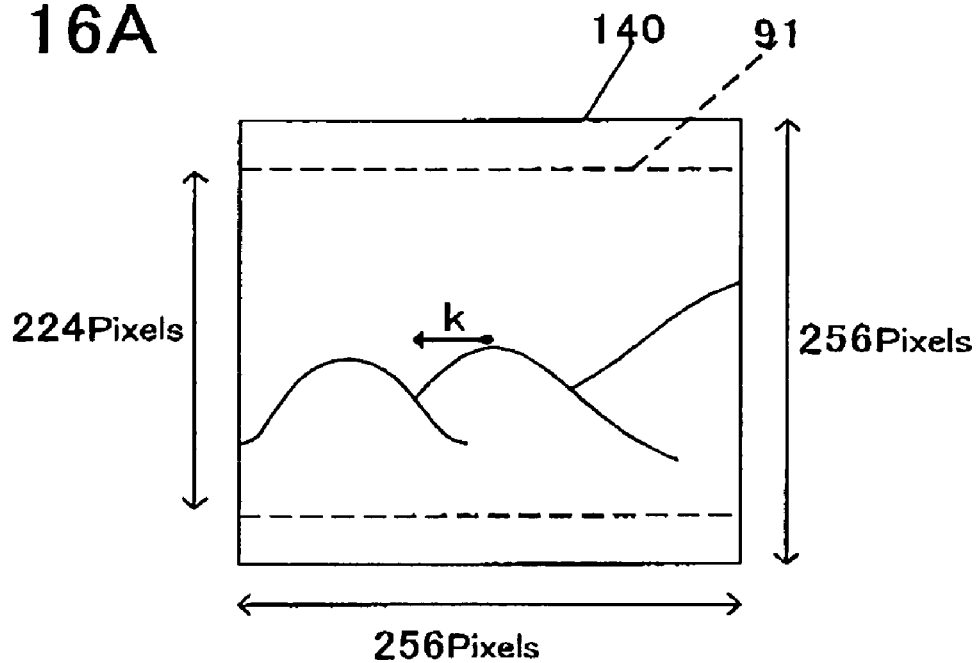
FIG. 16A is a view for explaining the background screen before scrolled.
Figure 16B:
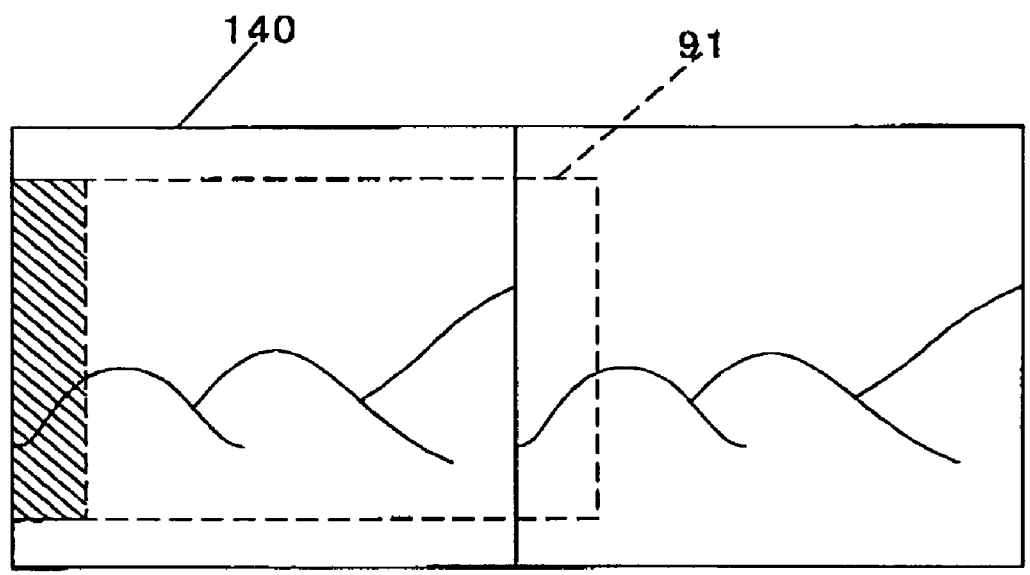
FIG. 16B is a view for explaining the background screen after scrolled.

FIG. 16A is a view for explaining the background screen 140 before scrolled. FIG. 16B is a view for explaining the background screen 140 after scrolled. As illustrated in FIG. 16A, since the size of the screen 91 is 256 pixels (width )×224 pixels(height), the area of 256 pixels×224 pixels of the background screen 140 is displayed on the screen 91. It is assumed that the background screen 140 is scrolled leftwards so as to move the center of the background screen 140 for k pixels. As a result, since the width of the background screen 140 is same as the width of the screen 91 of the television monitor 91, as shown in FIG. 16B, a part (a shaded area) of the background screen 140 which has moved outside of the screen 91 is displayed on the right side of the screen 91. In other words, in case where the background screen 140 is scrolled horizontally, it is considered conceptually that the plurality of same background screens 140 are lined up sideways.

For example, it is assumed that the part (the shaded area) of the background screen 140 which has moved outside of the screen 91 consists of the blocks "64", "96", . . . , "896", "928". The image designated by the array PA[64], PA[96], . . . , PA[896], PA[928] and CA[64], CA[96], . . . , CA[896], CA[928] corresponding to those blocks is displayed on the right side of the screen 91. Therefore, in order that the background successively appears by scrolling the background screen 140 to the left, data assigned to the arrays PA and CA corresponding to the blocks in the part (shaded area) of the background screen 140 which has moved outside of the screen 91 needs to be updated. As a result, the image indicated by the updated arrays PA and CA is displayed on the right side of the screen 91.

In order to display the background successively and smoothly, data stored in relevant arrays PA and CA needs to be updated before a part corresponding to the relevant arrays PA and CA is displayed on the right side of the screen 91. Since the data stored in the relevant arrays PA and CA needs to be updated when the part corresponding to the relevant arrays PA and CA is still being displayed on the left side of the screen 91, display becomes discontinuous on the left side of the screen 91. However, as shown in FIG. 11 and FIG. 12, this shortcoming can be avoided by adding the mask 101 on the left side of the screen 91. Incidentally, in this embodiment, the background screen 140 is not scrolled to the right. However, the mask 102 is also provided on the right side for balance.

In this way, the background 120 is scrolled by scrolling the background screen 140.

Figure 17:
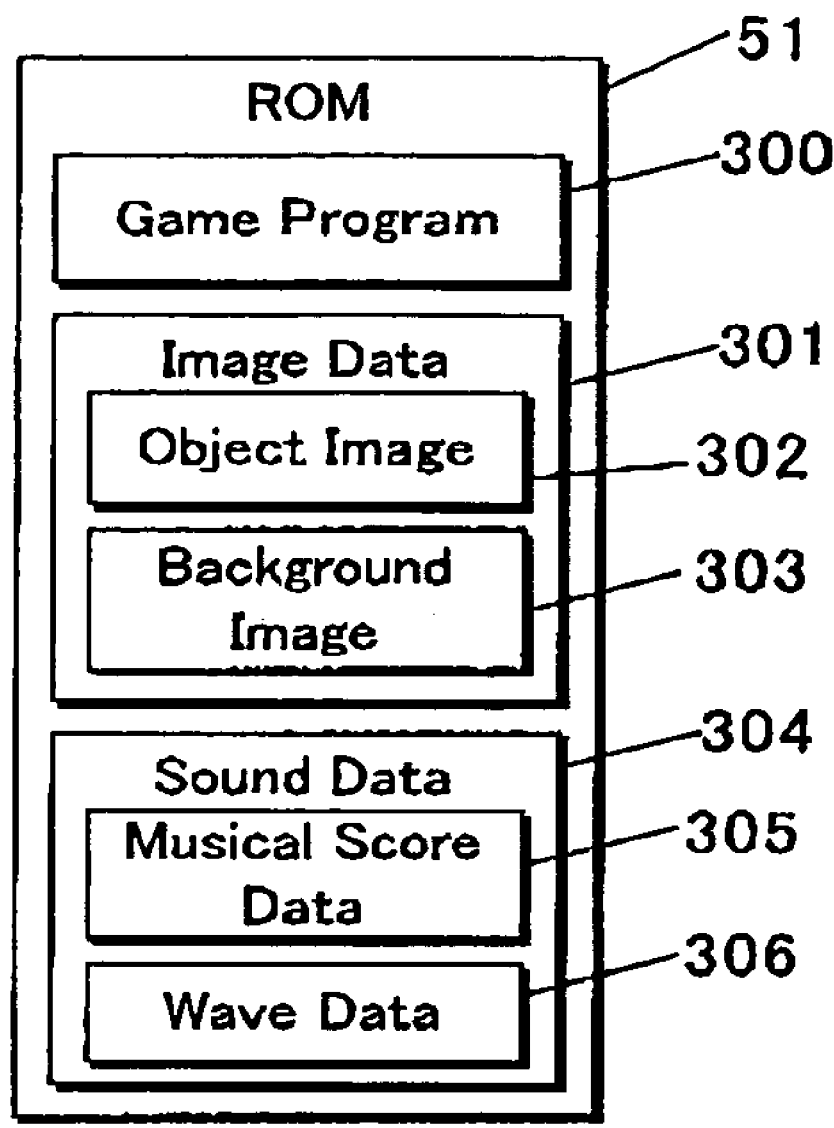
FIG. 17 is a schematic representation of a program and data stored in ROM of FIG. 6.

FIG. 17 is a schematic representation of a program and data stored in ROM 51 of FIG. 6. As illustrated in FIG. 17, the ROM 51 stores a game program 300, image data 301, and sound data 304. The image data 302 includes object image data (including the mermaid 112, the obstacle objects 104 to 109 and 121 to 125, the items 110 and 126, and power gauge 131) and background image data 303. The sound data 304 includes musical score data 305 and wave data (or sound source data) 306. The high speed processor 200 executes the game program 300 stored in the ROM 51 and uses the image data 301 and the sound data 304.

Next, main process which the high speed processor 200 executes will be explained.

[Pixel Data Aggregation Acquiring Process]

The CPU 201 obtains the digital pixel data converted from the analog pixel data D (X, Y) output from the image sensor 43, and then assigns it to an array P[X][Y]. The CPU 201 assigns conclusively all digital pixel data to array P[X][Y]. Horizontal direction of the image sensor 43 is defined as X-axis, and vertical direction of the image sensor 43 is defined as Y-axis.

[Differential Data Calculating Process]

The CPU 201 calculates a difference between pixel data P [X][Y] with and without light emitted from the infrared-emitting diodes 15, and then assigns it to an array Dif[X][Y]. The CPU 201 assigns conclusively all differences to the array Dif[X][Y]. Next, effects from calculating the difference will be explained with reference to drawings. In this embodiment, the pixel data indicates luminance. Therefore, the difference (or differential data) also indicates luminance.

Figure 18A:
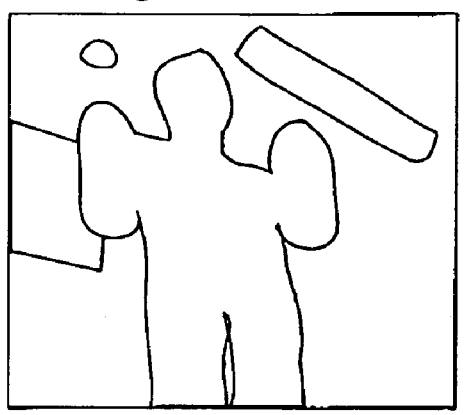
FIG. 18A is a view showing an example of an image which is imaged by a general image sensor and is not applied any special process.
Figure 18B:
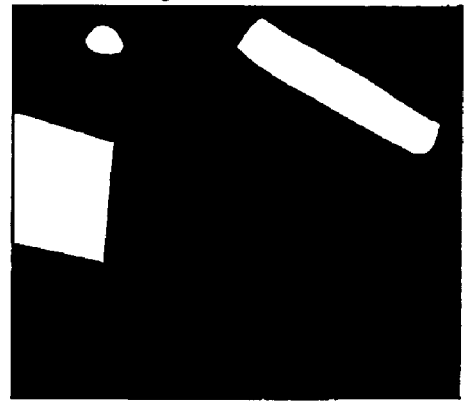
FIG. 18B is a view showing an example of an image based on a result of level-discriminating the image of FIG. 18A with a predetermined threshold value.
Figure 18C:
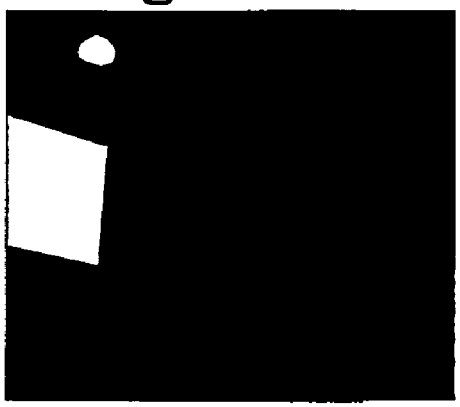
FIG. 18C is a view showing an example of an image based on a result of level-discriminating an image which is obtained through the infrared filter while the infrared-emitting diodes emit infrared light.
Figure 18D:
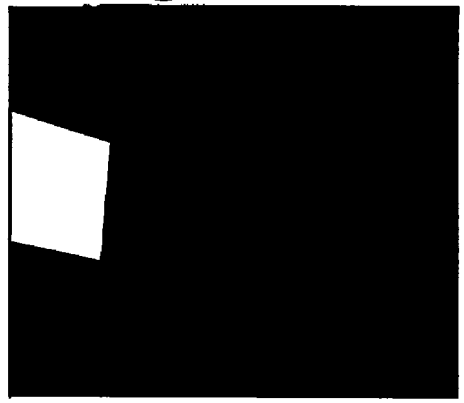
FIG. 18D is a view showing an example of an image based on a result of level-discriminating an image which is obtained through the infrared filter while the infrared-emitting diodes do not emit the infrared light.
Figure 18E:
FIG. 18E is a view showing an example of an image based on a difference between the image with light emitted and the image without light emitted from the infrared-emitting diodes.

FIG. 18A is a view showing an example of an image which is imaged by a general image sensor and is not applied any special process. FIG. 18B is a view showing an example of an image when the image of FIG. 18A is level-discriminated with a predetermined threshold value. FIG. 18C is a view showing an example of an image when an image which is obtained through the infrared filter 17 while the infrared-emitting diodes 15 emit infrared light is level-discriminated with a predetermined threshold. FIG. 18D is a view showing an example of an image when an image which is obtained through the infrared filter 17 while the infrared-emitting diodes 15 do not emit the infrared light is level-discriminated with the predetermined threshold. FIG. 18E is a view showing an example of an image based on a difference between the image with light emitted (shown in FIG. 18C) and the image without light emitted (shown in FIG. 18D) from the infrared-emitting diodes 15.

The image shown in FIG. 18A should be displayed in gray scale, but it is omitted to do so for convenience. In the FIG. 18A to FIG. 18E, the reflecting sheets 155 of the operation article 150 are imaged by the image sensor 43. As illustrated in FIG. 18A, when the general image sensor (corresponding to the image sensor 43 of FIG. 5) captures the operation article 150 by means of a stroboscope under a general light source in a general condition room, the general image sensor captures not only the operation article 150 but also all other things in the room and light sources such as a fluorescent lamp, an incandescent lamp (not shown), and sunlight (a window). As illustrated in FIG. 18B, it is possible to cut out an image(s) having lower luminance than predetermined luminance by level-discrimination. However, the image shown in FIG. 18B still includes high luminance images such as the light sources.

As shown in FIG. 5, by using the infrared filter 17, only the infrared-light falls on the image sensor 43. As a result, as shown in FIG. 18C, it is possible to cut out the fluorescent lamp which has little infrared-light. However, the image shown in FIG. 18C still includes the sunlight (the window) and the incandescent lamp (not shown). Because of this, the CPU 201 calculates the difference between the image (shown in FIG. 18C) with light emitted and the image (shown in FIG. 18D) without light emitted from the infrared-emitting diodes 15. As a result of the calculation, the image as shown in FIG. 18E is acquired. Comparing to the image of FIG. 18A, it is obvious that the image shown in FIG. 18E based on the differential data calculating process includes only the image of the operation article 150.

Because of above-mentioned reasons, the CPU 201 acquires the differential data between the pixel data with and without light emitted from the infrared-emitting diodes 15.

[Target Point Extracting Process]

The CPU 201 calculates a coordinate of a target point of the operation article 150 on the basis of the differential data Dif[X][Y]. This will be explained in detail.

Figure 19:
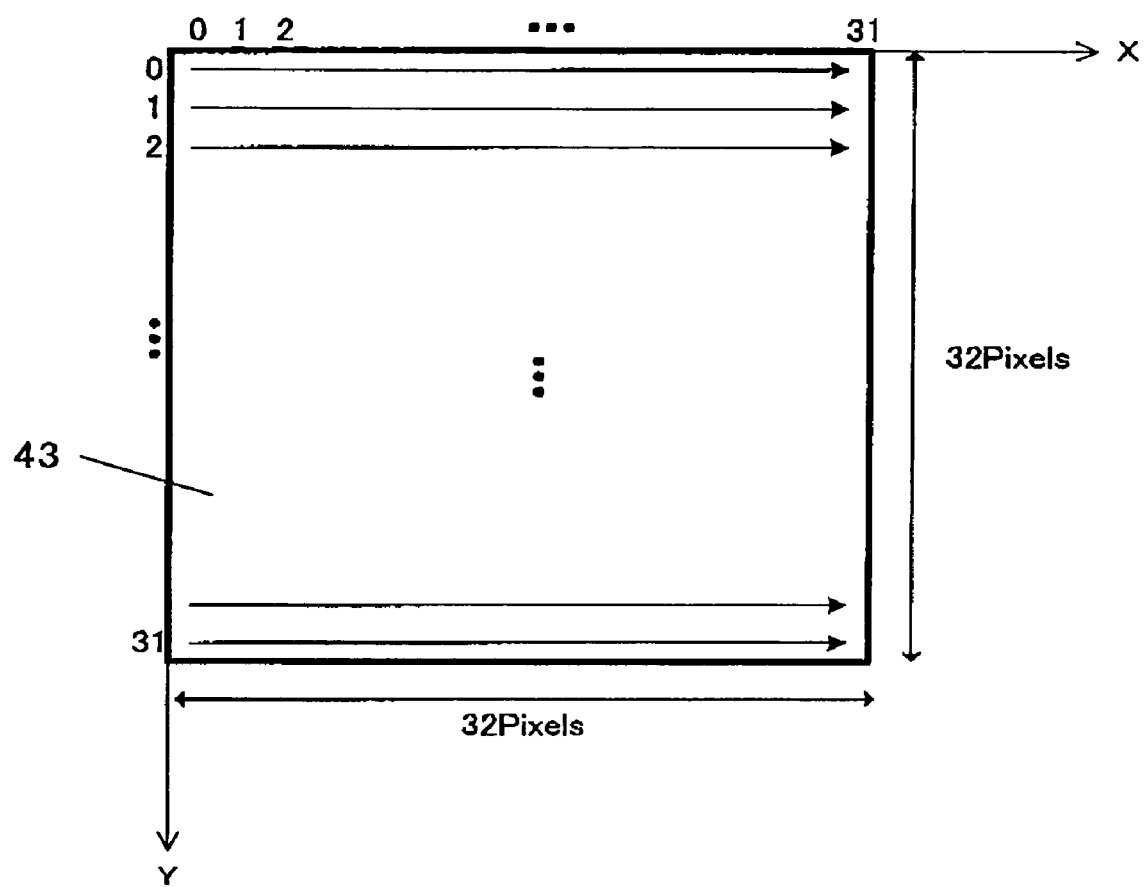
FIG. 19 is a view for explaining coordinate calculation of the target point of the operation article.

FIG. 19 is a view for explaining coordinate calculation of the target point of the operation article 150. The image sensor 43 of FIG. 19 consists of 32 pixels×32 pixels.

As illustrated in FIG. 19, the CPU 201 scans the differential data for 32 pixels in the direction of X-axis (horizontal direction), and then the CPU 201 increments the Y-coordinate. In this way, the CPU 201 scans the differential data for 32×32 pixels while updating the Y-coordinate.

In this case, the CPU 201 searches the differential data having the maximum luminance value, and then compares the maximum luminance value to a predefined threshold value "Th". If the maximum luminance value is larger than the predefined threshold value "Th", the CPU 201 calculates the coordinate of the target point of the operation article 150 on the basis of the pixel having the maximum luminance value. This will be explained in detail.

Figure 20A:
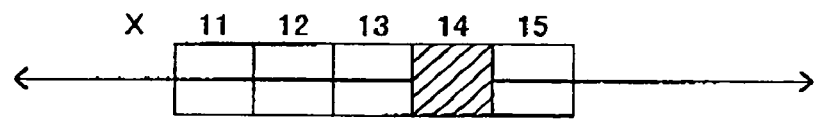
FIG. 20A is a view for explaining scanning process in X-axial direction when the CPU calculates the coordinate of the target point of the operation article on the basis of the pixel having the maximum luminance value.
Figure 20B:
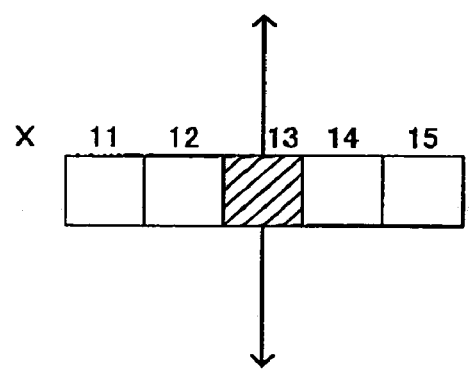
FIG. 20B is a view for explaining the beginning of the scanning process in Y-axial direction when the CPU calculates the coordinate of the target point of the operation article on the basis of the pixel having the maximum luminance value.
Figure 20C:
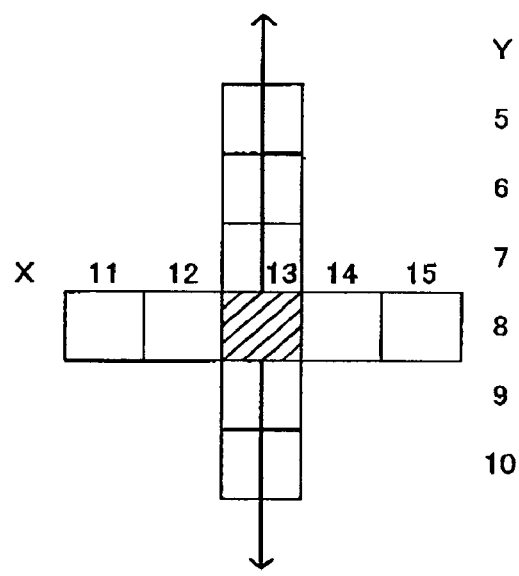
FIG. 20C is a view for explaining the scanning process in Y-axial direction when the CPU calculates the coordinate of the target point of the operation article on the basis of the pixel having the maximum luminance value.
Figure 20D:
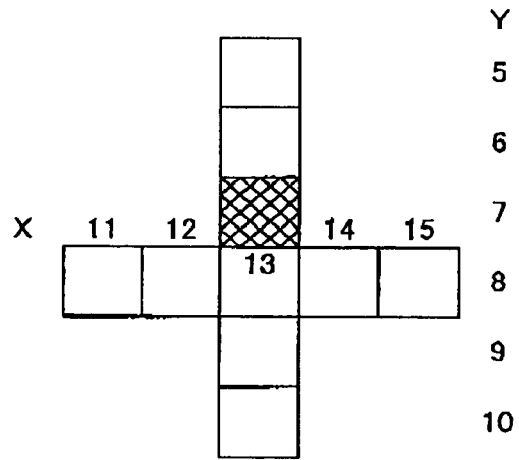
FIG. 20D is a view for explaining the result when the CPU calculates the coordinate of the target point of the operation article on the basis of the pixel having the maximum luminance value.

FIG. 20A is a view for explaining scanning process in X-axial direction when the CPU 201 calculates the coordinate of the target point of the operation article 150 on the basis of the pixel having the maximum luminance value. FIG. 20B is a view for explaining the beginning of the scanning process in Y-axial direction when the CPU 201 calculates the coordinate of the target point of the operation article 150 on the basis of the pixel having the maximum luminance value. FIG. 20C is a view for explaining the scanning process in Y-axial direction when the CPU 201 calculates the coordinate of the target point of the operation article 150 on the basis of the pixel having the maximum luminance value. FIG. 20D is a view for explaining the result when the CPU 201 calculates the coordinate of the target point of the operation article 150 on the basis of the pixel having the maximum luminance value.

As illustrated in FIG. 20A, the CPU 201 detects a pixel having a luminance value which is larger than the predetermined threshold value "Th" by scanning the differential data in X-axial direction on the basis of the pixel having the maximum luminance value. In this example of FIG. 20A, the pixels from X=11 to X=15 exceed the threshold value "Th".

Next, as illustrated in FIG. 20B, the CPU 201 derives a center pixel of the pixels from X=11 to 15. The X-coordinate of the center pixel is Xc=13.

Next, as illustrated in FIG. 20C, the CPU 201 detects a pixel having a luminance value which is larger than the predetermined threshold value "Th" by scanning the differential data in Y-axial direction on the basis of the X-coordinate(=13) derived in FIG. 20B. In this example of FIG. 20C, the pixels from Y=5 to Y=10 exceed the threshold value "Th".

Next, as illustrated in FIG. 20D, the CPU 201 derives a center pixel of the pixels from Y=5 to Y=10. The Y-coordinate of the center pixel is Yc=7.

The CPU 201 assigns the coordinate Xc(=13) of the target point to PX[M], and the coordinate Yc(=7) to PY[M]. Then, the CPU 201 calculates a moving average (AX, AY) of the target point (Xc, Yc). In addition, the CPU 201 converts the moving average (AX, AY) of the target point on the image sensor 43 into a coordinate (xc, yc) on the screen 91. Then, the CPU 201 assigns the coordinate xc to an array Ax[M], and the coordinate yc to an array Ay[M]. The CPU 201 executes the aforesaid process to acquire the coordinate (Ax[M], Ay[M]) of the target point every time a video frame is updated. For example, an origin of coordinates on the screen 91 is a center of the screen 91.

The CPU 201, for example, calculates the moving average for (n+1) video frames using following formulas. "n" is a natural number (for example, "3").

$$AX=(PX[M]+PX[M-1]+ \ldots +PX[M-n])/(n+1) \quad (1)$$

$$AY=(PY[M]+PY[M-1]+ \ldots +PY[M-n])/(n+1) \quad (2)$$

Incidentally, the "M" is an integral number, and it is incremented every time the video frame is updated.

[Background Control Process]

At the first stage of the game (refer to FIG. 11 and FIG. 12), the CPU 201 changes the center location of the background screen 140 at predetermined speed (refer to FIG. 16A and FIG. 16B), and registers a coordinate of the center location after changed. In this case, the CPU 201 updates data stored in the relevant array PA and the array CA. In this way, the CPU 201 performs the scroll control of the background 120. Incidentally, at the second stage of the game (refer to FIG. 13), the CPU 201 changes a part of or whole background 120 by updating data stored in the array PA and the array CA in accordance with the game program 300.

[Automatic Object Control Process]

The CPU 201 calculates and registers coordinates of the obstacle objects "P" and the items 110 and 126. For example, the CPU 201 performs coordinate calculation so that the obstacle objects "P" and the items 110 and 126 move at predetermined speed, and then registers the result (stores in the inner memory 207). In addition, the CPU 201 registers storage location information of an animation table for the obstacle objects "P" and the items 110 and 126 to be displayed. This animation table is similar to an after-mentioned animation table for the mermaid 112.

[Cursor Control Process]

The CPU 201 registers the coordinate (Ax[M], Ay[M]) of the target point of the operation article 150 as a coordinate of the cursor 111 to be displayed in the next video frame (stores in the inner memory 207). Moreover, the CPU 201 registers storage location information of an animation table for the cursor 111. This animation table is similar to the after-mentioned animation table for the mermaid 112.

[Following Object Control Process]

The CPU 201 makes the mermaid 112 follow the cursor 111. In this case, the CPU 201 makes the mermaid 112 move at the first accelerated velocity. The first accelerated velocity is set to a larger value if a distance between the cursor 111 and the mermaid 112 is long, and if the distance is short, the first accelerated velocity is set to a smaller value. Incidentally, a direction of the first accelerated velocity is positive direction. The positive direction indicates a direction of movement of the mermaid 112. In addition, the CPU 201 makes the mermaid 112 move at the second accelerated velocity. The second accelerated velocity is set a larger value if a velocity of the mermaid 112 is large, and if the velocity of the mermaid 112 is small, the accelerated velocity is set a smaller value. Incidentally, a direction of the second accelerated velocity is negative direction. The negative direction indicates an opposite direction of movement of the mermaid 112. In this way, it is possible to display the mermaid 112 as if the mermaid 112 were moving in the water. This point will be explained in detail with reference to examples.

Figure 21:
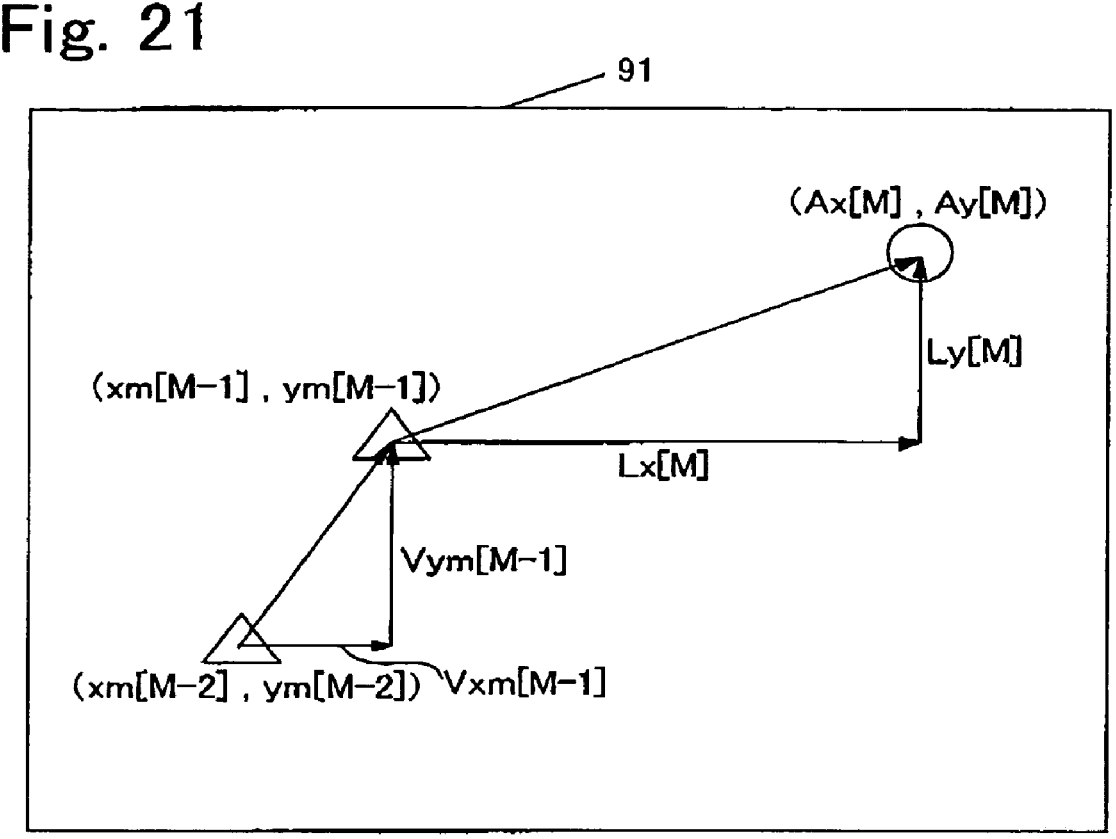
FIG. 21 is a view for explaining the following object control process performed by the CPU.

FIG. 21 is a view for explaining the following object control process performed by the CPU 201. For example, the CPU 201 calculates a current coordinate (xm[M], ym[M]) of the mermaid 112 using following formulas.

$$xm[M]=xm[M-1]+Vxm[M-1]\times(1-k)+Bx[M] \quad (3)$$

$$ym[M]=ym[M-1]+Vym[M-1]\times(1-k)+By[M] \quad (4)$$

$$Vxm[M-1]=xm[M-1]-xm[M-2] \quad (5)$$

$$Vym[M-1]=ym[M-1]-ym[M-2] \quad (6)$$

$$Bx[M]=Lx[M]\times B0 \quad (7)$$

$$By[M]=Ly[M]\times B0 \quad (8)$$

$$Lx[M]=Ax[M]-xm[M-1] \quad (9)$$

$$Ly[M]=Ay[M]-ym[M-1] \quad (10)$$

As illustrated in FIG. 21, the formula (3) to formula (10) use the previous coordinate (xm[M−1], ym[M−1]) of the mermaid 112, the previous velocity vector (Vxm[M−1], Vym[M−1]) of the mermaid 112, the current acceleration vector (Bx[M], By[M]) of the mermaid 112, the coordinate (xm[M−2], ym[M−2]) which is the coordinate before the previous coordinate of the mermaid 112, the constant number k (k<1) indicating a resistance of water, and the constant number B0 for adjusting the accelerated velocity of the mermaid 112. When the resistance of water is needed to be high, it is possible to set a large value to the constant number k, and when the resistance of water is needed to be low, it is possible to set a small value to the constant number k. In addition, the acceleration value (Bx[M], By[M]) of the mermaid 112 is proportional to the distance (Lx[M], Ly[M]) between a current location of the cursor 111 and a previous location of the mermaid 112. It is possible to set an arbitrary value to the constant number k and the constant number 50. For example, it is possible to determine from one's own experiences.

Moreover, the CPU 201 calculates a current velocity vector (Vxm[M], Vym[M]) of the mermaid 112 using following formulas.

$$Vxm[M]=xm[M]-xm[M-1] \quad (11)$$

$$Vym[M]=ym[M]-ym[M-1] \quad (12)$$

Furthermore, the CPU 201 calculates an x-direction movement distance "mx" and a y-direction movement distance "my" of the mermaid 112. The x-direction movement distance "mx" is an absolute value of the x component Vxm[M], and the y-direction movement distance "my" is an absolute value of an y component Vym[M].

The CPU 201 controls not only a location of the mermaid 112 in above-mentioned way, but also controls animation of the mermaid 112. This will be explained in detail.

The CPU 201 determines which is larger between the x-direction movement distance "mx" of the mermaid 112 and a predetermined value "xr". Additionally, the CPU 201 determines which is larger between the y-direction movement distance "my" of the mermaid 112 and a predetermined value "yr". As a result, when CPU 201 determines that the x-direction movement distance "mx" is larger than the predetermined value "xr" and also the y-direction movement distance "my" is smaller than the predetermined value "yr", the CPU 201 sets an angle flag to a corresponding value so as to move the mermaid 112 horizontally.

Contrary, when the CPU 201 determines that the x-direction movement distance "mx" is smaller than the predetermined value "xr" and also the y-direction movement distance "my" is larger than the predetermined value "yr", the CPU 201 sets the angle flag to a corresponding value so as to move the mermaid 112 vertically. Moreover, when the CPU 201 determines that the x-direction movement distance "mx" is larger than the predetermined value "xr" and the y-direction movement distance "my" is also larger than the predetermined value "yr", the CPU 201 sets the angle flag to a corresponding value so as to move the mermaid 112 obliquely.

Additionally, the CPU 201 refers to the sign of the velocity vector (Vxm(M), Vym[M]) of the mermaid 112, and sets corresponding values to an x-direction flag and a y-direction flag. The x-direction flag and the y-direction flag might be sometimes collectively referred to as a direction flag(s).

Then, the CPU 201 determines movement direction information of the mermaid 112 in accordance with values of the angle flag, the x-direction flag and the y-direction flag. The movement direction information of the mermaid 112 indicates a direction of a movement of the mermaid 112. The CPU 201 determines a direction of the mermaid 112 with reference to the movement direction information. This will be explained in detail.

FIG. 22A is a view showing a relation between a value of the angle flag and the angle. FIG. 22B is a view showing a relation between a value of the direction flag and a sign indicating the direction. FIG. 22C is a view showing a relation among the angle flag, the direction flag and the movement direction information. As mentioned above, the CPU 201 judges the magnitude among the movement distances "mx" and "my" and the predetermined values "xr" and "yr". Then, as shown in FIG. 22A, the CPU 201 sets the angle flag.

In addition, the CPU 201 refers to the sign of the velocity vector (Vxm[M], Vym[M]) of the mermaid 112. Then, as shown in FIG. 22B, the CPU 201 sets the x-direction flag and y-direction flag.

Moreover, as illustrated in FIG. 22C, the CPU 201 determines the movement direction information of the mermaid 112 in accordance with values of the angle flag, the x-direction flag, and the y-direction flag.

Figures 23, 24:
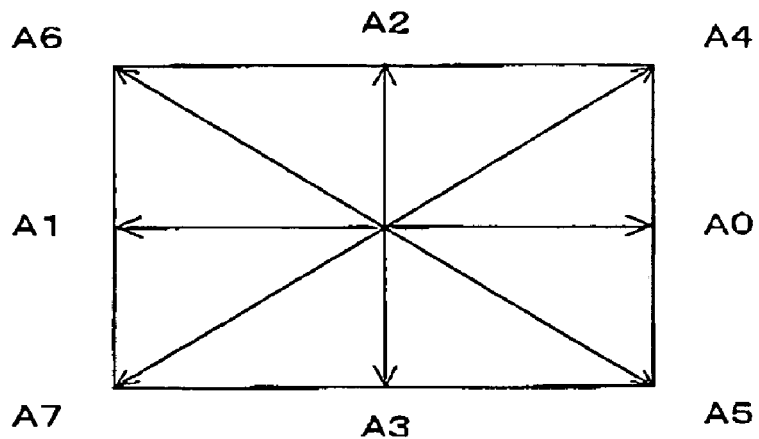
FIG. 23 is a view showing a relation between the movement direction information of FIG. 22C and a direction of the mermaid.
FIG. 24 is a view showing a relation between the movement direction information A0 to A7 and the storage location information of the animation table.

FIG. 23 is a view showing a relation between the movement direction information of FIG. 22C and a movement direction of the mermaid 112. As illustrated in FIG. 22 and FIG. 23, the movement direction information A0 indicates to move the mermaid 112 horizontally in positive direction (rightward) of x-axis. The movement direction information A1 indicates to move the mermaid 112 horizontally in negative direction (leftward) of x-axis. The movement direction information A2 indicates to move the mermaid 112 vertically in positive direction (upward) of y-axis. The movement direction information A3 indicates to move the mermaid 112 vertically in negative direction (downward) of y-axis. The movement direction information A4 indicates to move the mermaid 112 obliquely to upper right. The movement direction information A5 indicates to move the mermaid 112 obliquely to lower right. The movement direction information A6 indicates to move the mermaid 112 obliquely to upper left. The movement direction information A7 indicates to move the mermaid 112 obliquely to lower left.

The CPU 201 registers storage location information of the animation table associated with thus acquired movement direction information A0 to A7 (mermaid animation registration). The animation table includes various information to animate the mermaid 112.

FIG. 24 is a view showing a relation between the movement direction information A0 to A7 and the storage location information of the animation table. As illustrated in FIG. 24, for example, the movement direction information A0 is associated with the storage location information "address0" of the animation table. The storage location information of the animation table is start address information of an area storing the animation table.

FIG. 25 is a view showing an example of the animation table designated by the storage location information of FIG. 24 for animating the mermaid 112. As illustrated in FIG. 25, the animation table is a table wherein storage location information of animation image data, segment number, duration information, next segment information, object size information(or segment size information) color palette information, depth value, and sprite size information are associated with each other.

Animation consists of a plurality of segment which are arranged in time series. Therefore, the animation image data consists of segment image data set. Each segment image data consists of object data which expresses the mermaid 112. Each object data expresses different types of mermaid 112.

In addition, the object data is pixel pattern data. The pixel pattern data and the depth value are related to the sprites constructing the object (or the mermaid 112). Meanwhile, they are similar to the ones of the block of FIG. 15. The segment number is a number assigned to each segment. The duration information indicates how many frames the same segment (or the same object) should be successively displayed. The next segment information designates the number of the segment (or the object) which should be displayed next after the current object is displayed according to the duration information. For example, the next segment information "next" indicates that the segment of the number "2" must be displayed after displaying the segment of the number "1" during one frame (the duration information). In addition, for example, the next segment information "top" indicates that the segment of the initial number "1" must be displayed after displaying the segment of the number "15" during one frame (the duration information).

The animation table of FIG. 25 is used for animating the mermaid 112. Therefore, for example, since the movement direction information A0 of FIG. 24 indicates to move the mermaid 112 horizontally in positive direction, the storage location information "ad0" which is contained in the animation table indicated by the storage location information "address0" corresponding to the movement direction information A0 designates the storage location of the animation image data expressing the mermaid 112 which is heading horizontally in positive direction.

In this way, the CPU 201 registers the storage location information "address0" to "address7" of the animation table corresponding to the movement direction information A0 to A7 of the mermaid 112. In addition, the movement direction information A0 to A7 are based on the coordinate (Ax[M], Ay[M]) of the target point of the operation article 150 (refer to the formulas (9) and (10)). As a result, an animation of the mermaid 112 which is heading movement direction of the operation article 150 (the cursor 111) is performed.

In addition, the CPU 201 judges whether or not the mermaid 112 clashes the obstacle objects "P" or the obstacle images "Q". When the mermaid 112 clashes either of them, the CPU 201 restricts the motion of the mermaid 112, and turns a clash flag on. This will be explained in detail.

Figure 26:
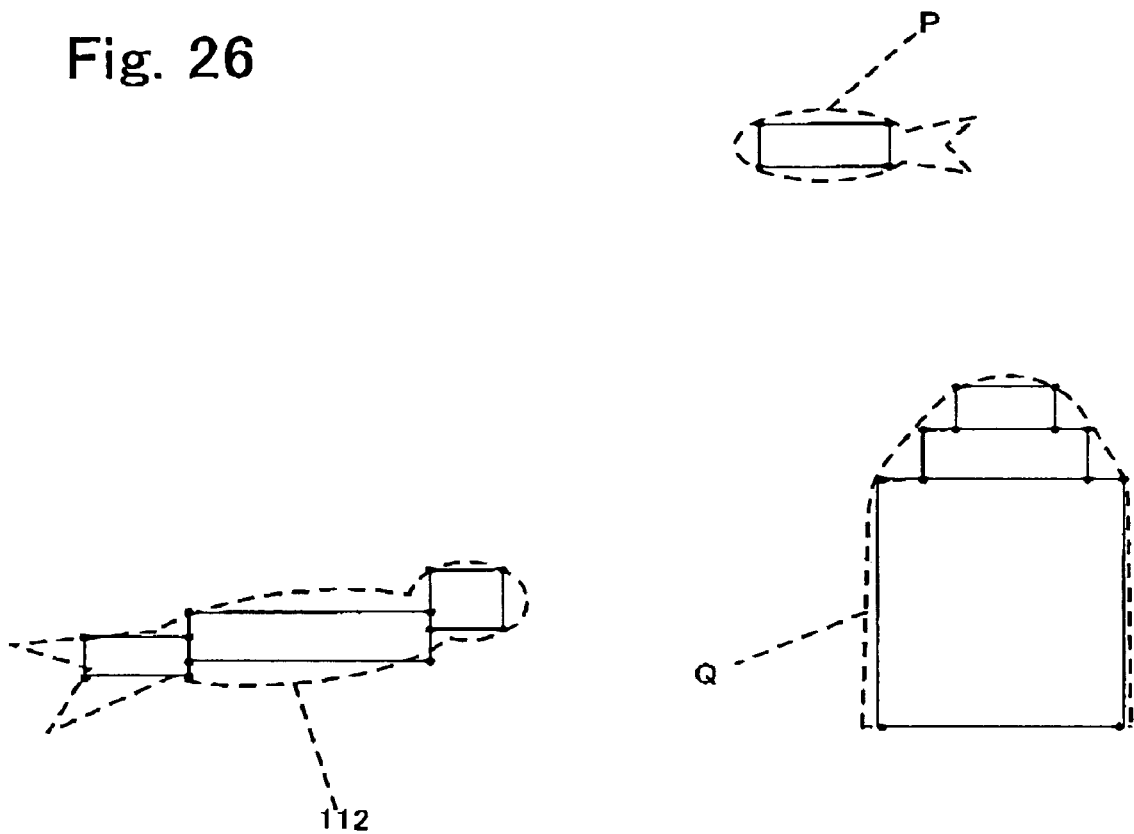
FIG. 26 is a view for explaining the clash judging process performed by the CPU.

FIG. 26 is a view for explaining the clash judging process performed by the CPU 201. As illustrated in FIG. 26, the mermaid 112, the obstacle object "P", and the obstacle image "Q" are simplified by using a single rectangle or several rectangles. Then, the CPU 201 judges whether or not the mermaid 112 clashes any of all obstacle objects "P" and obstacle images "Q" displayed on the screen. The rectangle constructing the mermaid 112 is called "mermaid rectangle" and the rectangle constructing the obstacle object "P" or the obstacle image "Q" is called "obstacle rectangle" The clash judgment will be described in detail.

The CPU 201 determines whether or not the mermaid rectangle and the obstacle rectangle overlap each other using each vertex coordinate of the mermaid rectangle and each vertex coordinate of each obstacle rectangle. When the mermaid rectangle overlaps any of the obstacle rectangles, the CPU 201 determines that the mermaid 112 clashes the obstacle object "P" having the overlapping obstacle rectangle, or the obstacle image "Q" having the overlapping obstacle rectangle, and turns the clash flag on.

Figure 27:
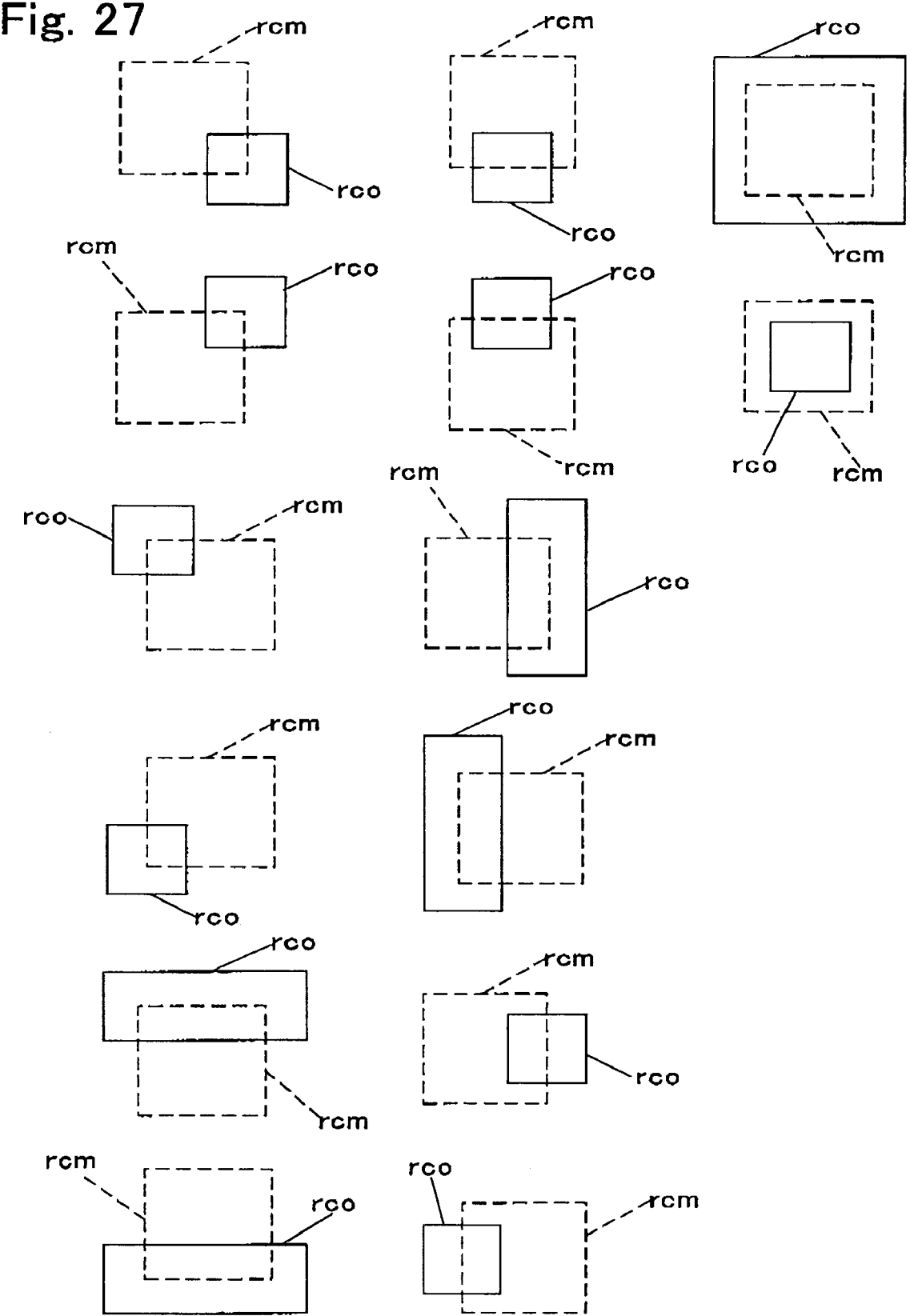
FIG. 27 is a view for explaining overlapping patterns judged by the following object control process performed by the CPU.

FIG. 27 is a view for explaining overlapping patterns judged by the following object control process performed by the CPU 201. As illustrated in FIG. 27, there are 14 overlapping patterns of the mermaid rectangle "rcm" and the obstacle rectangle "rco". In the clash judging process, when a relation between the mermaid rectangle "rcm" and the obstacle rectangle "rco" corresponds to one of the overlapping patterns, the CPU 201 determines that the mermaid 112 clashes the obstacle object "P" or the obstacle image "Q".

The mermaid 112 and all obstacle objects "P" and all obstacle images "Q" being displayed are applied this process.

[Power Gauge Control Process]

The CPU 201 controls the power gauge 131. This will be explained with reference to drawings.

Figure 28A:
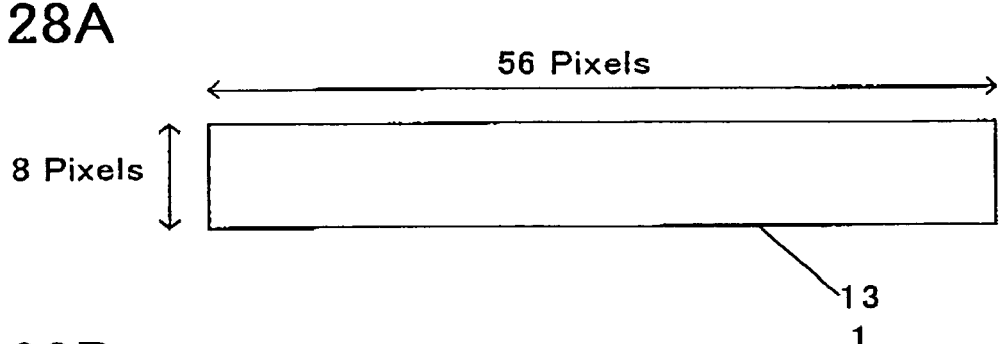
FIG. 28A is a view showing an example of a frame part of the power gauge shown in FIG. 11 to FIG. 13.
Figure 28B:
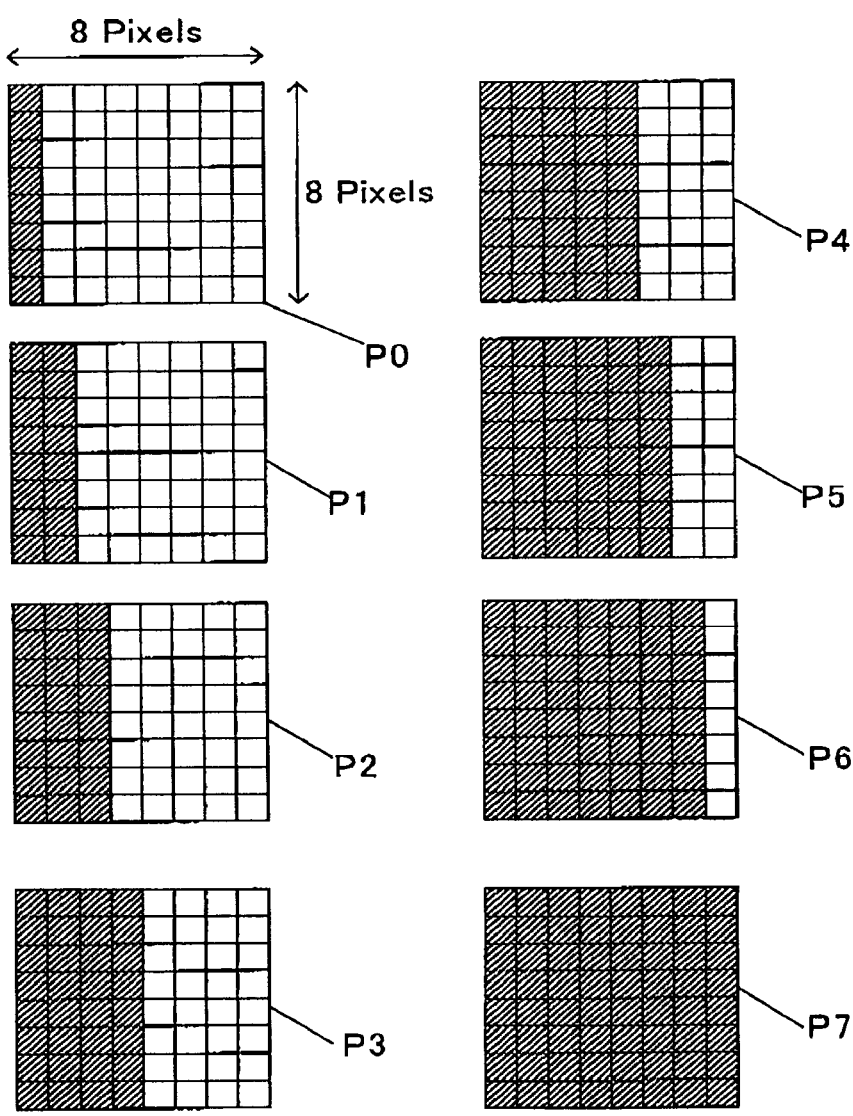
FIG. 28B is a view showing an example of elements constructing the bar of the power gauge.

FIG. 28A is a view showing an example of a frame part of the power gauge 131 shown in FIG. 11 to FIG. 13. FIG. 28B is a view showing an example of elements constructing the bar 103 of the power gauge 131. As illustrated in FIG. 28A, a size of the frame part is 8 pixels×56 pixels. Also, the frame part consists of 7 sprites each of which consists of 8×8 pixels.

As illustrated in FIG. 28B, sprites P0 to P7 each of which consists of 8×8 pixels are provided in order to display the bar 103. In FIG. 28B, for example, the shaded area is red, and the other area is white. The CPU 201 selects a single sprite or several sprites out of sprites P0 to P7 in order to shorten the bar 103 at predetermined speed and display the selected sprite(s) within the frame part of the power gauge 131.

For example, the CPU 201 displays 7 sprites P7 within the frame part to make the bar 103 longest at the beginning of the game. Then, after a predetermined period "t" from the start of the game, the CPU 201 displays the sprite P6 instead of the rightmost sprite P7. Furthermore, after further predetermined period "t", the CPU 201 displays the sprite P5 instead of the right most sprite P6. In this way, the CPU 201 makes the red bar 103 shorten as the predetermined period "t" passes. In other words, the bar 103 becomes shorter by 1 pixel for every predetermined period "t".

In addition, when the clash flag is on, i.e. the mermaid 112 clashes the obstacle object "P" or the obstacle image "Q", the CPU 201 selects sprites from the sprites P0 to P7 so as to make the red bar 103 shorter for a predetermined length (for example, 4 pixels). For example, when the clash flag is on while the sprites from the first to the sixth are all sprites P7 and the seventh sprite (or the rightmost sprite) is sprite P0 in the power gauge 131, the CPU 201 takes off the seventh sprite P0 and replaces the sixth sprite P7 by the sprite P4. In this way, the bar 103 becomes 4 pixels shorter.

[Image Display Process]

The CPU 201 sends necessary information for display to the graphic processor 202 during a vertical blanking period on the basis of information registered by the background control processing, the automatic object control processing, the cursor control processing, the following object control processing, and the power gauge control processing. Then, the graphic processor 202 generates the video signal in accordance with the information sent from the CPU 201, and outputs the video signal to the video signal output terminal 47. In this way, the game screen including the mermaid 112 and so on is displayed on the screen 91 of the television monitor 90. This will be explained in detail.

The CPU 201 calculates a display coordinate of each sprite constructing the obstacle object "P" in accordance with the coordinate information registered by the automatic object control process and the animation table for the obstacle object "P". Then, the CPU 201 sends information of each sprite constructing the obstacle object "P" including the display coordinate information, the color palette information, the depth value, the size information, and the storage location information of the pixel pattern data to the graphic processor 202 with reference to the animation table for the obstacle object "P".

In addition, the CPU 201 calculates a display coordinate of each sprite constructing the cursor 111 in accordance with the animation table for the cursor 111 and the coordinate information (the coordinate information of the target point of the operation article 150) registered by the cursor control process. Then, the CPU 201 sends information of each sprite constructing the cursor 111 including the display coordinate information, the color palette information, the depth value, the size information, and the storage location information of the pixel pattern data to the graphic processor 202 with reference to the animation table for the cursor 111.

Moreover, the CPU 201 refers to the animation table in accordance with the storage location information thereof registered by the following object control process, and obtains size information of the mermaid 112 (or the object) and size information of each sprite constructing the mermaid 112. Then, the CPU 201 calculates a display coordinate of each sprite constructing the mermaid 112 on the basis of the obtained information and the coordinate (xm[M], ym[M]) registered by the following object control process. In addition, the CPU 201 calculates storage location information of pixel pattern data of each sprite constructing the mermaid 112 on the basis of the number of the segment including the mermaid 112 to be displayed, the size information of the mermaid 112, the size information of the sprite constructing the mermaid 112, and the storage location information of the animation image data.

Furthermore, the CPU 201 sends information of each sprite constructing the mermaid 112 including the color palette information, the depth value, and the size information to the graphic processor 202 with reference to the animation table, together with the storage location information of pixel pattern data of each sprite and the display coordinate information. In this case, the CPU 201 sends the above-mentioned information to the graphic processor 202 in accordance with the duration information and the next segment information of the animation table.

The CPU 201 sends information of each sprite constructing the frame part of the power gauge 131 including the color palette information, the depth value, the size information, the storage location information of pixel pattern data, and the display coordinate information to the graphic processor 202. Furthermore, the CPU 201 sends information of each sprite constructing the bar 103 registered by the power gauge control process including the color palette information, the depth value, the size information, the storage location information of pixel pattern data, and the display coordinate information to the graphic processor 202.

Moreover, the CPU 201 sends the coordinate of the center of the background screen 140 registered by the background control process and start addresses of the array PA[0] to PA[1023] and the array CA[0] to CA[1023] set by the background control process to the graphic processor 202. The graphic processor 202 reads information stored in the array PA[0] to PA[1023] according to the sent start address, and then according to the read information, the graphic processor 202 reads storage location information of pixel pattern data for displaying each of the block[0] to block[1023]. In addition, the graphic processor 202 reads information stored in the array CA[0] to CA[1023] according to the sent start address. The graphic processor 202 generates the video signal to display the obstacle objects "P", the cursor 111, the mermaid 112, the power gauge 131, and the background 120 on the basis of the information sent from the CPU 201 and the read information, and outputs it to the video signal output terminal 47.

[Audio Playback]

The audio playback is performed by interrupt processing. The CPU 201 reads and interprets commands from the musical score data 305 while incrementing a musical data pointer. The musical data pointer indicates a location to start reading information contained in the musical score data 305.

Then, when the command included in the read musical score data 305 is note on, the CPU 201 sends a start address storing the wave data 306 corresponding to a pitch (the frequency of sound vibration) designated by a note number and an musical instrument (tone quality) designated by instrument designation information contained in the musical score data 305 to the sound processor 203. In addition, when the command included in the read musical score data 305 is note on, the CPU 201 sends a start address storing necessary envelope data to the sound processor 203. Furthermore, when the command included in the read musical score data 305 is note on, the CPU 201 sends pitch control information corresponding to the pitch designated by the note number and volume information contained in the musical score data 305 to the sound processor 306.

In what follows, the pitch control information will be explained. The pitch control information is used for pitch controlling performed by changing a cycle of reading the wave data 306 (the sound source data). More specifically, the sound processor 203 periodically reads the pitch control information at certain interval, and accumulates the information. The sound processor 203 processes the result of the accumulation, and makes use of the result of the processing as an address pointer for the wave data 306. Accordingly, if a large value is set to the pitch control information, the address pointer is quickly incremented to increase the frequency of the wave data 306. Conversely, if a small value is set to the pitch control information, the address pointer is slowly incremented to decrease the frequency of the wave data 306. In this way, the sound processor 203 performs the pitch control of wave data 306.

The sound processor 203 reads from the ROM 51 the wave data 306, which is stored in tho area pointed by the provided start address while incrementing the address pointer on the basis of the pitch control information. Then, the sound processor 203 generates an audio signal by multiplying the wave data 306, as sequentially read, by the envelope data and the volume information item. In this way, the audio signal indicative of the tone quality of the musical instrument, the pitch and the sound volume designated by the musical score data 305 is produced and output to the audio signal output terminal 49 by the sound processor 203.

On the other hand, the CPU 201 manages a gate time contained in the musical score data 305 as read. Accordingly, when a gate time elapses, the CPU 201 instructs the sound processor 203 to stop outputting the sound corresponding to the gate time. In response to this, the sound processor 203 terminates the sound output as instructed.

As has been discussed above, music is produced on the basis of the musical score data 305, and output from the speaker (not shown) of the television monitor 90.

Next, an example of the process flow of the game machine 1 will be explained with reference to several flow charts.

Figure 29:
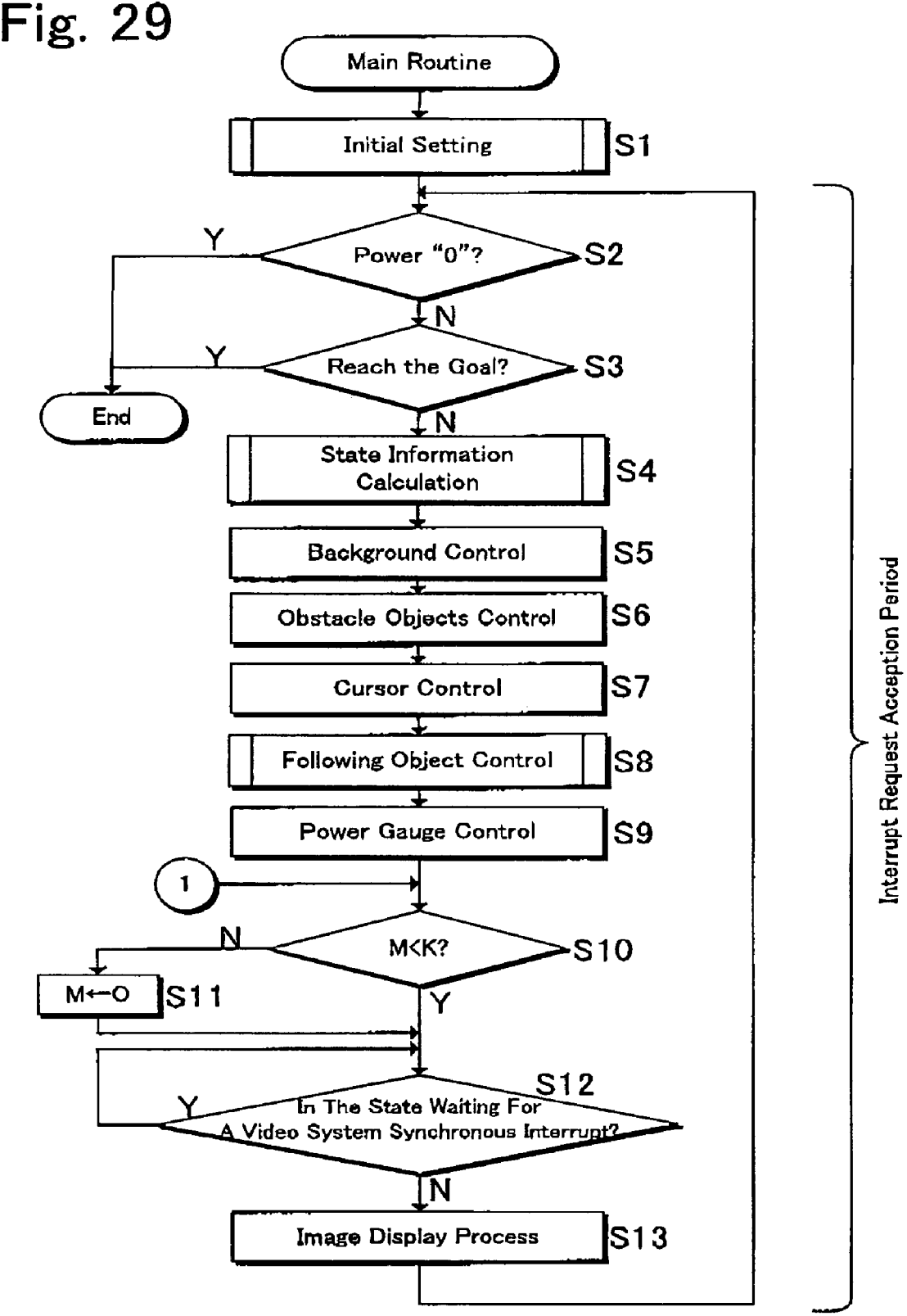
FIG. 29 is a flowchart showing the overall process flow of the game machine.

FIG. 29 is a flowchart showing the overall process flow of the game apparatus 1. As illustrated in FIG. 29, the CPU 201 performs the initial setup of the system in step S1.

In step S2, the CPU 201 checks the remaining power of the mermaid 112. When the power is "0" (the length of the bar 103 within the power gauge 131 is "0"), the CPU 201 displays a predetermined failure screen and then ends the game, otherwise proceeds to step S3. In step S3, the CPU 201 determines whether or not the mermaid 112 reaches a goal. When the mermaid 112 reaches the goal, the CPU 201 displays a predetermined success screen and ends the game, otherwise proceeds to step S4.

In step S4, the CPU 201 calculates state information of the operation article 150.

The state information could be, for example, any one of speed information, movement direction information, movement distance information, velocity vector information, acceleration information, motion path information, area information and positional information, or a combination thereof. In step S5, the CPU 201 performs display control of the background 120. In step S6, the CPU 201 performs display control of the obstacle object "P". In step S7, the CPU 201 performs display control of the cursor 111 on the basis of the state information of the operation article 150.

In step S8, the CPU 201 performs display control of the mermaid 112 on the basis of coordinate information of the cursor 111 (refer to the formula (3) to formula (12)). In step S9, the CPU 201 performs display control of the power gauge 131.

In step S10, the CPU 201 determines whether or not "M" is smaller than a predetermined value "K". If "M" is equal to or more than the predetermined value "K", the CPU 201 proceeds to step S11, and assigns "O" to "M", and then proceeds to step S12. On the other hand, if the variable "M" is smaller than the predetermined value "K", the CPU 201 proceeds from step S10 to step S12. The above mentioned variable "M" will be explained later.

In step S12, the CPU 201 determines whether or not the CPU 201 waits for the video system synchronous interrupt. The CPU 201 supplies the graphics processor 202 with the image information for refreshing the display screen of the television monitor 90 after the vertical blanking period starts. Accordingly, after completing the arithmetic operations for refreshing the display screen, the CPU 201 refrains from proceeding its operation until the next video system synchronous interrupt is issued. Namely, while it is "YES" in step S12, i.e., while the CPU 201 waits for the video system synchronous interrupt (i.e., there is no interrupt signal responsive to the video system synchronous signal), the process repeats the same step S12. On the other hand, if it is "NO" in step S12, i.e., if the CPU 201 gets out of the state of waiting for the video system synchronous interrupt (i.e., the CPU 201 is given the video system synchronous interrupt), the process proceeds to step S13.

In step S13, the CPU 201 sends necessary image information to generate a game screen (refer to FIG. 11 to FIG. 13) to the graphics processor 202 on the basis of the results of step S5 to S9 (the image displaying process).

Figure 30:
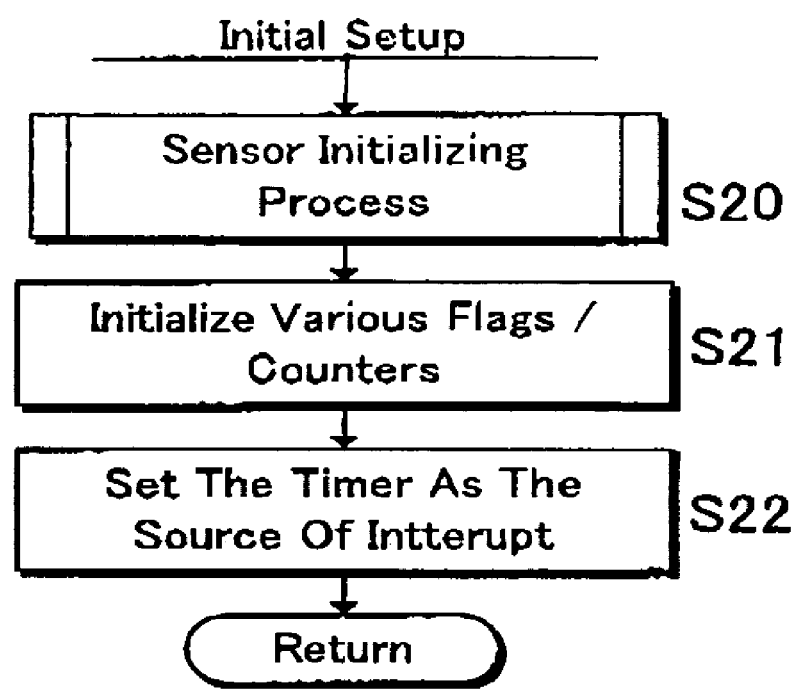
FIG. 30 is a flowchart showing the process flow of the initial setting process of step S1 of FIG. 29.

FIG. 30 is a flowchart showing the process flow of the initial setting process of step S1 of FIG. 29. As illustrated in FIG. 30, the CPU 201 initializes the image sensor 43. In step S21, the CPU 201 initializes various flags and counters. In step S22, the CPU 201 sets the timer circuit 210 as a source of generating an interrupt request signal for generating sound. By this interrupting process, the sound processor 203 performs processing, and sound is output from the speakers of the television monitor 90.

Figure 31:
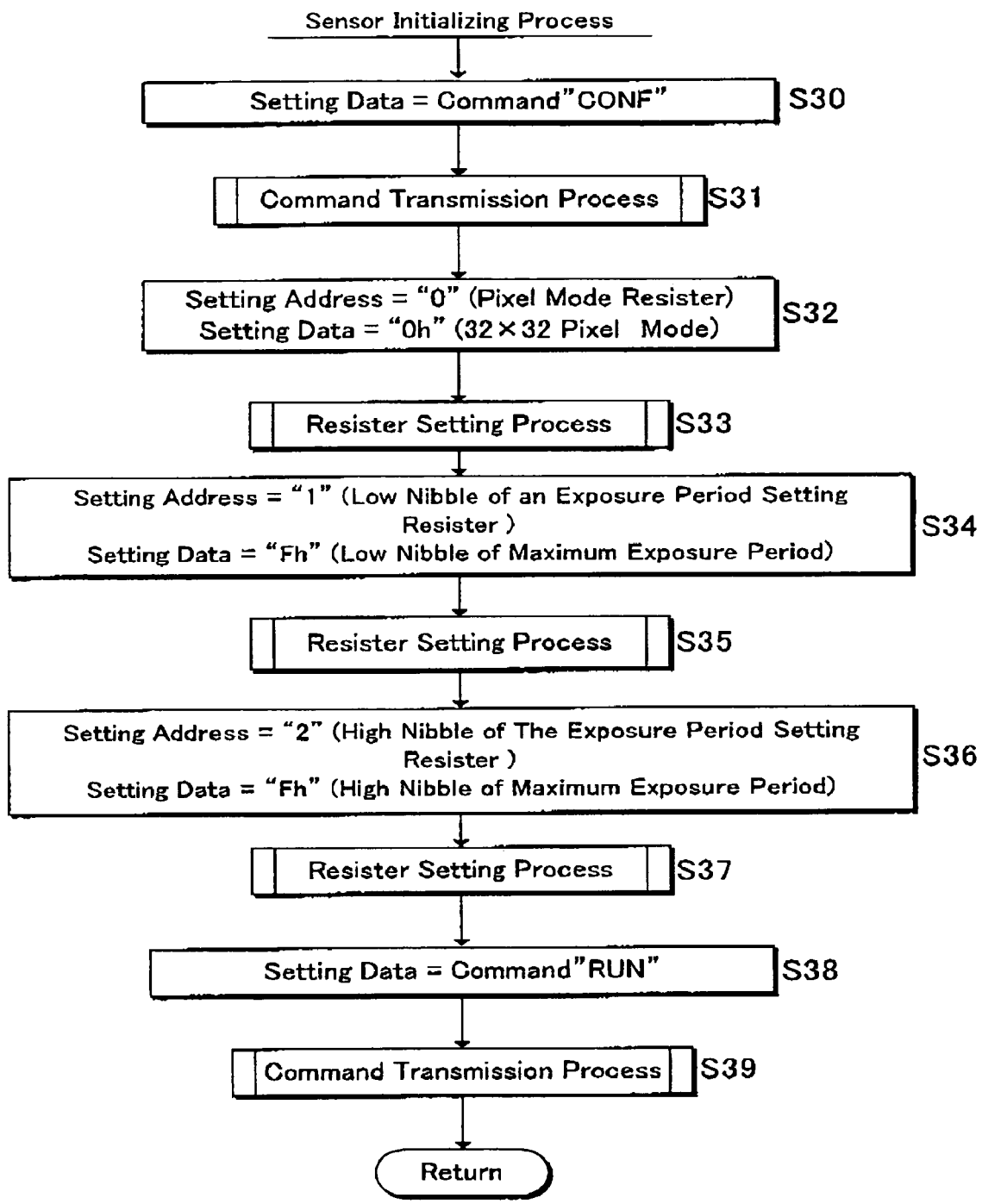
FIG. 31 is a flowchart showing the process flow of the sensor initial setting process of step S20 of FIG. 30.

FIG. 31 is a flowchart showing the process flow of the sensor initialization of step S20 of FIG. 30. As illustrated in FIG. 31, in step S30, the high speed processor 200 sets a command "CONF" as a setting data. This command "CONF" is a command which instructs the image sensor 43 to enter setting mode to send a command from the high speed processor 200. In step S31, the high speed processor 200 performs the command transmitting process.

Figure 32:
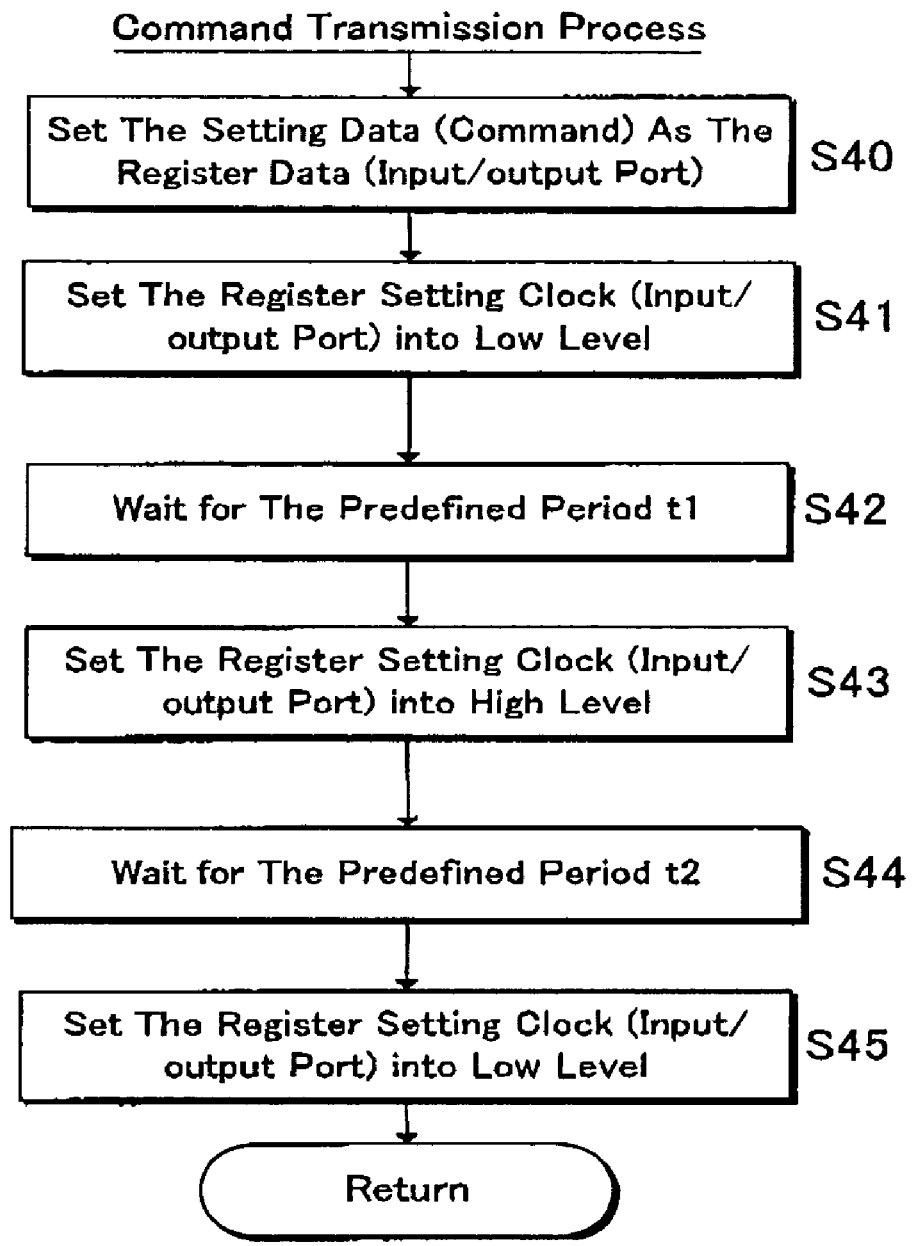
FIG. 32 is a flowchart showing the process flow of the command transmitting process of step S31 of FIG. 31.

FIG. 32 is a flowchart showing the process flow of the command transmitting process of step S31 of FIG. 31. As illustrated in FIG. 32, in step S40, the high speed processor 200 sets setting data (in case of step S31, the command "CONF") as register data (I/O port). In step S41, the high speed processor 200 sets register setting clock CLK (I/O port) to low level. After waiting for a predetermined period "t1" in step S42, in the next step S43, the high speed processor 200 sets the register setting clock CLK to high level. Then, after waiting for a predetermined period "t2" in step S44, in the next step S45, the high speed processor 200 sets the register setting clock CLK to low level.

Figure 33:
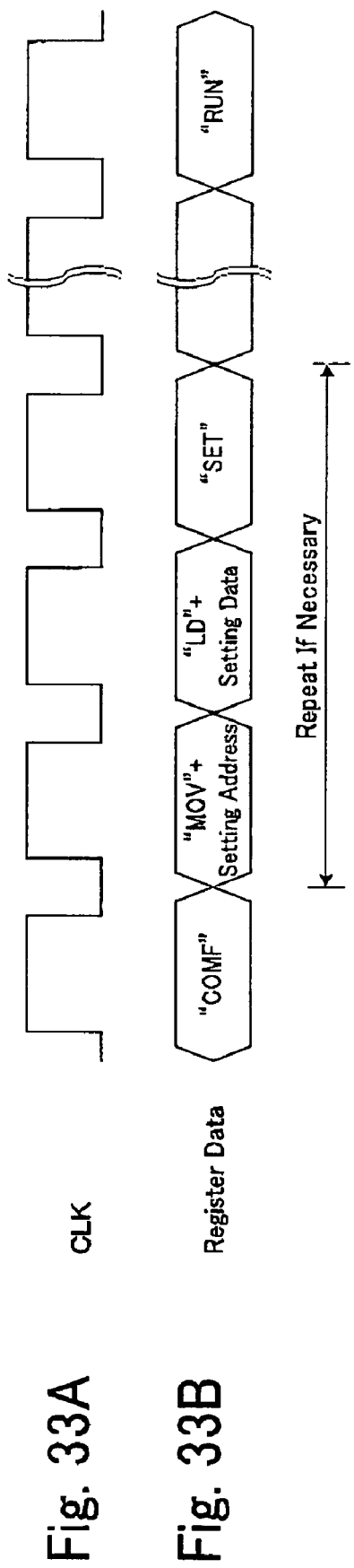
FIG. 33A is a timing chart of the register setting clock "CLK" of FIG. 8.
FIG. 33B is a timing chart of the register Data of FIG. 8.

In this way, as illustrated in FIG. 33A and FIG. 33B, the high speed processor 200 performs the command (command or command+data) transmitting process by periodically changing the register setting clock CLK into low level, high level, and low level while waiting for the predetermined periods "t1" and "t2".

Returning to FIG. 31, in step S32, the high speed processor 200 sets a pixel mode and also sets an exposure period. In this embodiment, since the image sensor 43 is the CMOS image sensor which consists of 32 pixels×32 pixels as mentioned above, the high speed processor 200 sets "0h" which indicates it consists of 32 pixels×32 pixels, to a pixel mode register whose setting address is "O". In step S33, the high speed processor 200 performs a register setting process.

Figure 34:
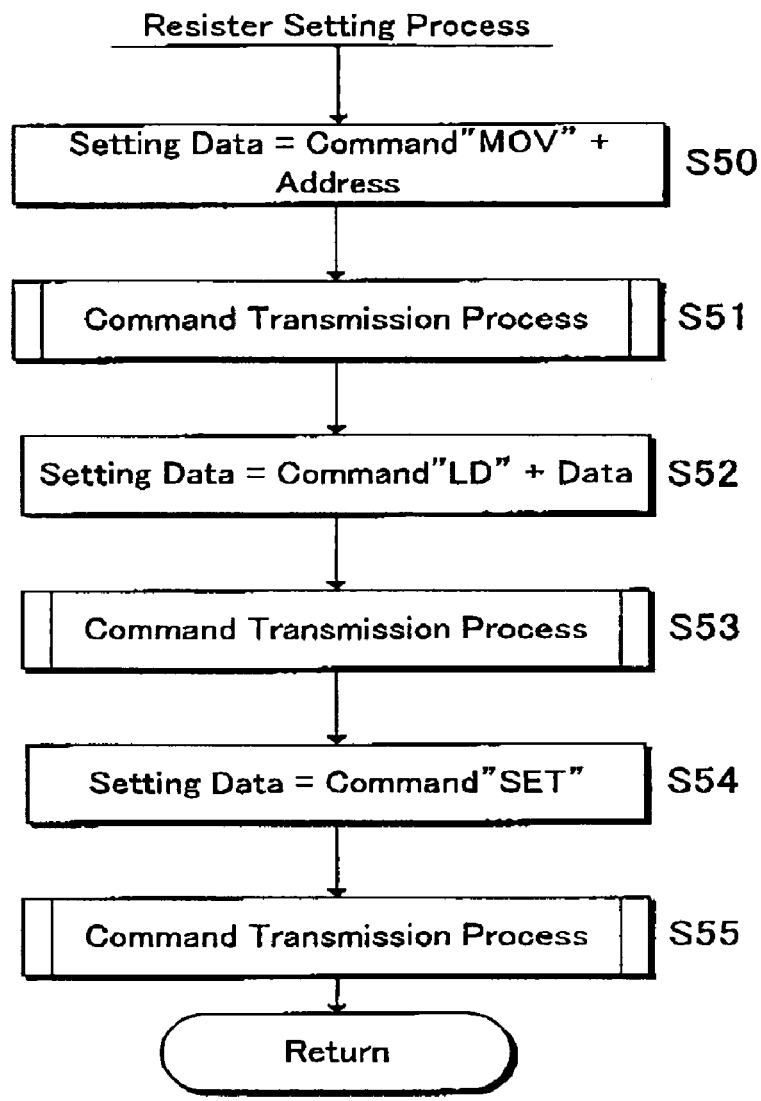
FIG. 34 is a flowchart showing the process flow of the register setting process of step S33 of FIG. 31.

FIG. 34 is a flowchart showing the process flow of the register setting process of step S33 of FIG. 31. As illustrated in FIG. 34, in the first step S50, the high speed processor 200 sets a command "MOV"+"address" as a setting data. Then, in step S51, the high speed processor 200 transmits the command to the image sensor 43 by executing the command transmitting process as explained hereinbefore (refer to FIG. 32). In step S52, the high speed processor 200 sets a command "LD"+"data" as a setting data. Then, in step S53, the high speed processor 200 transmits the command to the image sensor 43 by executing the command transmitting process as explained hereinbefore (refer to FIG. 32). Then, in step S54, the high speed processor 200 sets a command "SET" as a setting data. Then, in step S55, the high speed processor 200 transmits the command to the image sensor 43 by executing the command transmitting process as explained hereinbefore (refer to FIG. 32). The command "MOV" indicates to transmit an address of the control register. The command "LD" indicates to transmit data. The command "SET" indicates to set data to the address. Incidentally, if there are several control registers to set, the register setting process is repeatedly executed.

Returning to FIG. 31, in step S34, the high speed processor 200 sets "1" (indicating an address of low nibble of an exposure period setting register) as a setting address, and also sets low nibble data "Fh" of "FFh" indicating the maximum exposure period. Then, in step S35, the high speed processor 200 executes the register setting process of FIG. 34. In a similar way, in step S36, the high speed processor 200 sets "2" (indicating an address of high nibble of the exposure period setting register) as a setting address, and also sets high nibble data "Fh" of "FFh" indicating the maximum exposure period. Then, in step S37, the CPU 201 executes the register setting process of FIG. 34.

In step S38, the high speed processor 200 sets a command "RUN" which indicates an end of setting and also makes the image sensor 43 start outputting data. Then, in step S39, the high speed processor 200 transmits it. In this way, the sensor setting process of step S20 of FIG. 30 is performed. However, the example from FIG. 31 to FIG. 34 may be changed depending on the specification of the image sensor 43.

Figure 35:
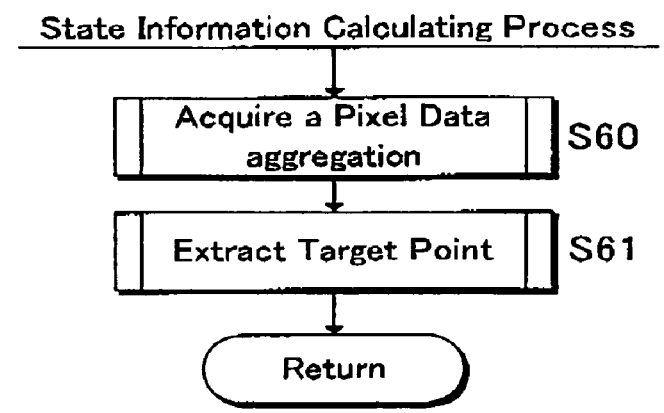
FIG. 35 is a flowchart showing the process flow of the state information calculating process of step S4 of FIG. 29.

FIG. 35 is a flowchart showing the process flow of the state information calculating process of step S4 of FIG. 29. As illustrated in FIG. 35, in step S60, the CPU 201 obtains the digital pixel data from ADC 208. This digital pixel data is obtained by converting the analog pixel data as output from the image sensor 43.

In step S61, the target point extracting process is executed. More specifically, the CPU 201 obtains the differential data between the pixel data with and without light emitted from the infrared-emitting diodes 15. Then, the CPU 201 retrieves the maximum value of the differential data and compares it with the predetermined threshold "Th". In addition, when the maximum value of the differential data exceeds the predetermined threshold value "Th", the CPU 201 calculates a coordinate of the pixel which has the maximum value of the differential data. Furthermore, the CPU 201 calculates the moving average of thus calculated coordinates. Then, the CPU 201 converts it to the coordinate on the screen 91 of the television monitor 90, and makes use of it as the coordinate (Ax[M], Ay[M]) of the target point of the operation article 150.

Figure 36:
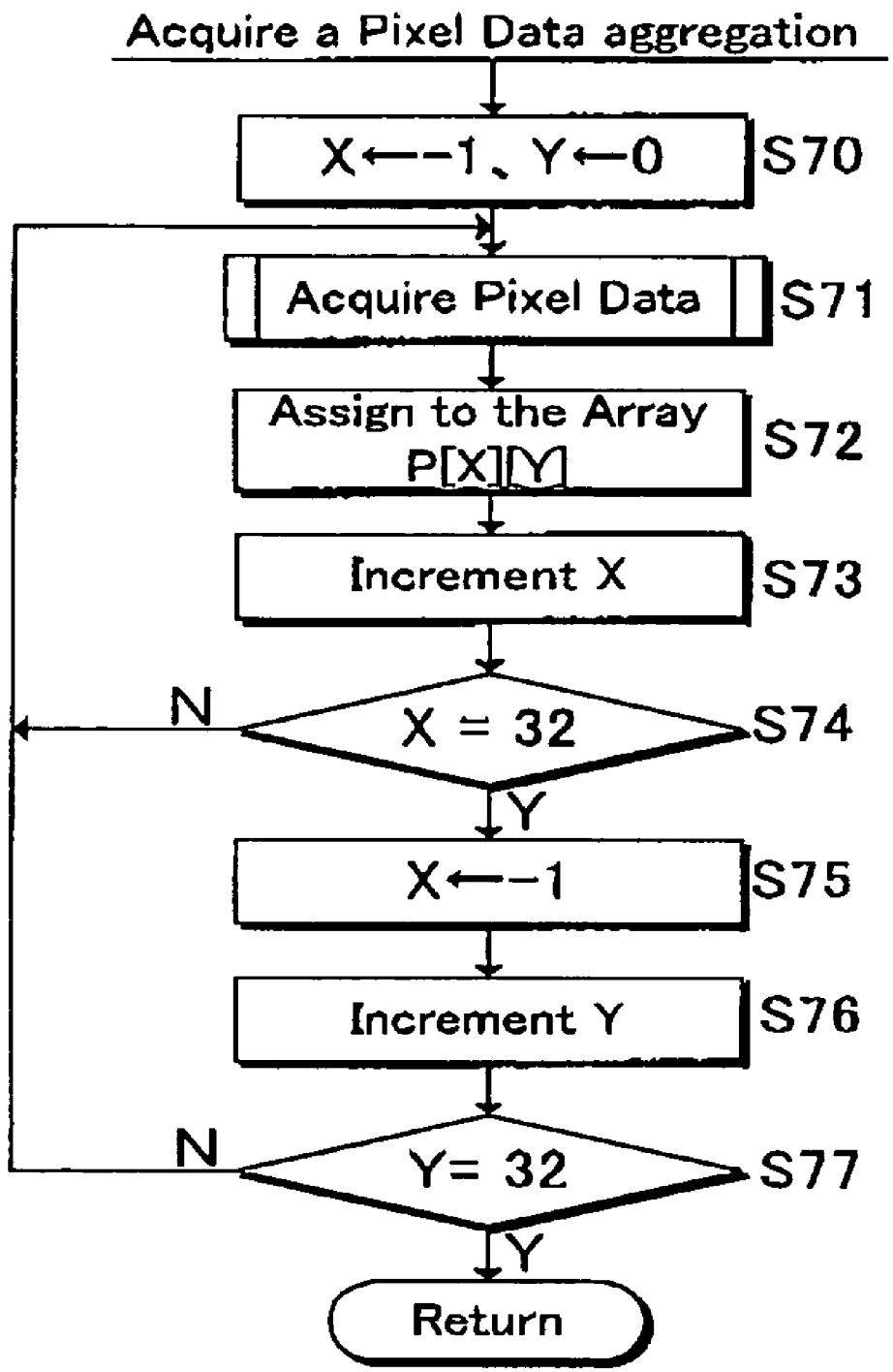
FIG. 36 is a flowchart showing the process flow of the pixel data aggregation acquiring process of step S60 of FIG. 35.

FIG. 36 is a flowchart showing the process flow of the pixel data aggregation acquiring process of step S60 of FIG. 35. As illustrated in FIG. 36, in the first step S70, the CPU 201 sets "−1" to "X" and "0" to "Y" as an element number of a pixel data array. In this embodiment, the pixel data array is a two-dimensional array such as X=0 to 31 and Y=0 to 31. However, since dummy data is output as first pixel data of each row as explained before, "−1" is set as an initial value of "X". In the following step S71, the CPU 201 executes a pixel data acquiring process.

Figure 37:
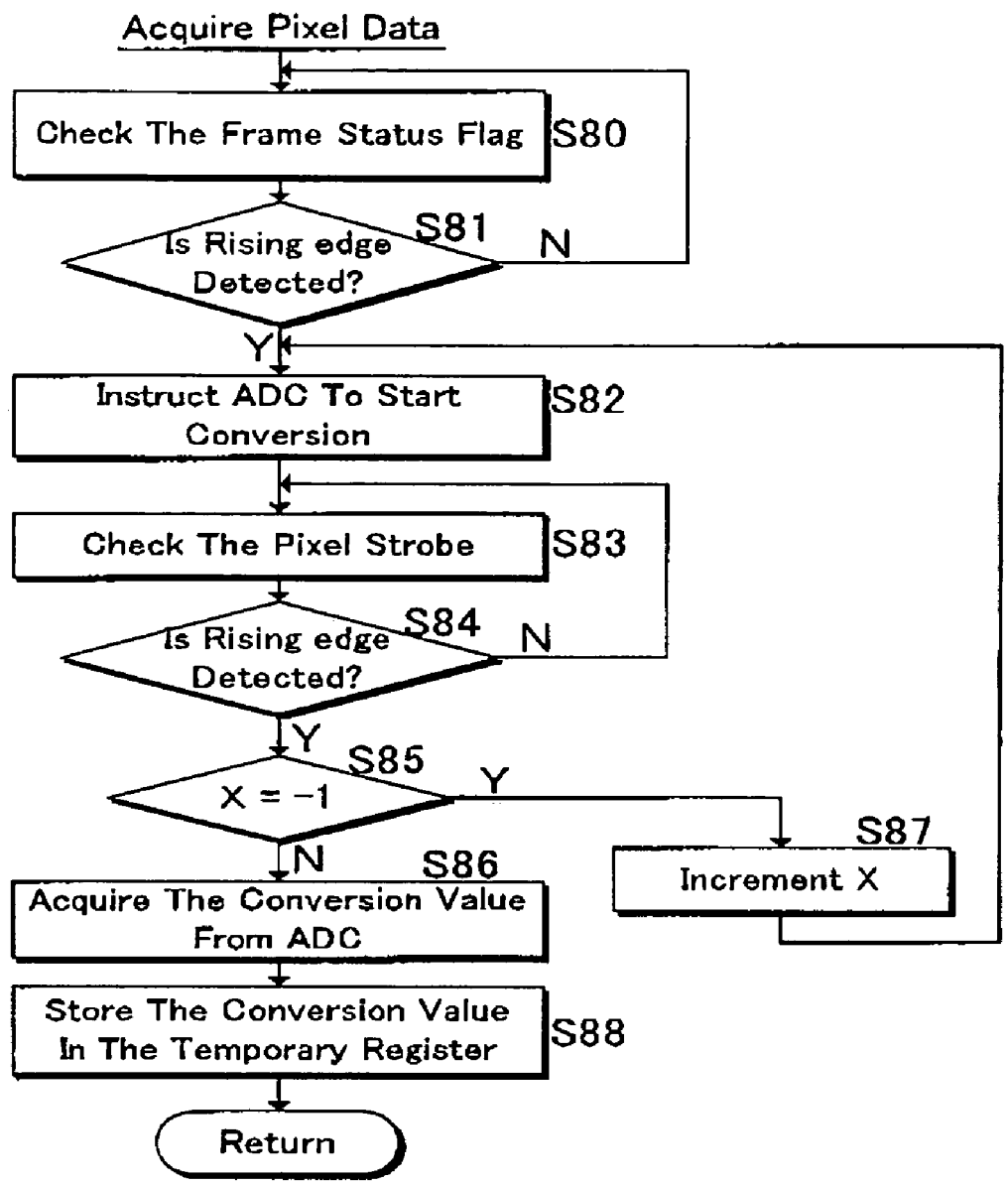
FIG. 37 is a flowchart showing the process flow of the pixel data acquiring process of step S71 of FIG. 36.

FIG. 37 is a flowchart showing the process flow of the pixel data acquiring process of step S71 of FIG. 36. As illustrated in FIG. 37, in the first step S80, the CPU 201 checks the frame status flag signal FSF as transmitted from the image sensor 43. Then, when CPU 201 detects the rising edge of the frame status flag signal FSF, the process proceeds to step S82, otherwise proceeds to step S80 (step S81). In step S82, the CPU 201 instructs the ADC 208 to start converting the analog pixel data into the digital data. After that, in step S83, the CPU 201 checks the pixel strobe PDS as transmitted from the image sensor 43. Then, when CPU 201 detects the rising edge of the pixel strobe PDS, the process proceeds to step S85, otherwise proceeds to step S83 (step S84).

In step S85, the CPU 201 determines whether or not X=−1, i.e., "X" is the first pixel. As explained before, since the first pixel of each row is set as the dummy pixel, if the CPU 201 determines "YES" in step S85, in the next step S87, the CPU 201 does not acquire the pixel data at the time but increments the element number "X".

If the CPU 201 determines "NO" in step S85, since the pixel data is pixel data after second in the row, in step S86 and S88, the CPU 201 acquires the pixel data at the time and stores it in temporary register (not shown). After that, the CPU 201 proceeds to step S72 of FIG. 36.

In step S72 of FIG. 36, the CPU 201 assigns the pixel data stored in the temporary register to the pixel data array P[X][Y].

In step 573, the CPU 201 increments "X". If X is smaller than "32", the process from step S71 to step S73 is repeatedly executed. If X=32, i.e., the acquisition of pixel data reaches the end of the row, the CPU 201 sets "−1" to "X" in step S75, and then increments "Y" in step S76. Then, CPU 201 repeats the pixel data acquiring process from head of the next row.

In step S77, if Y=32, i.e., the acquisition of pixel data reaches the end of the pixel data array P[X][Y], the CPU 201 proceeds to step S61 of FIG. 35.

Figure 38:
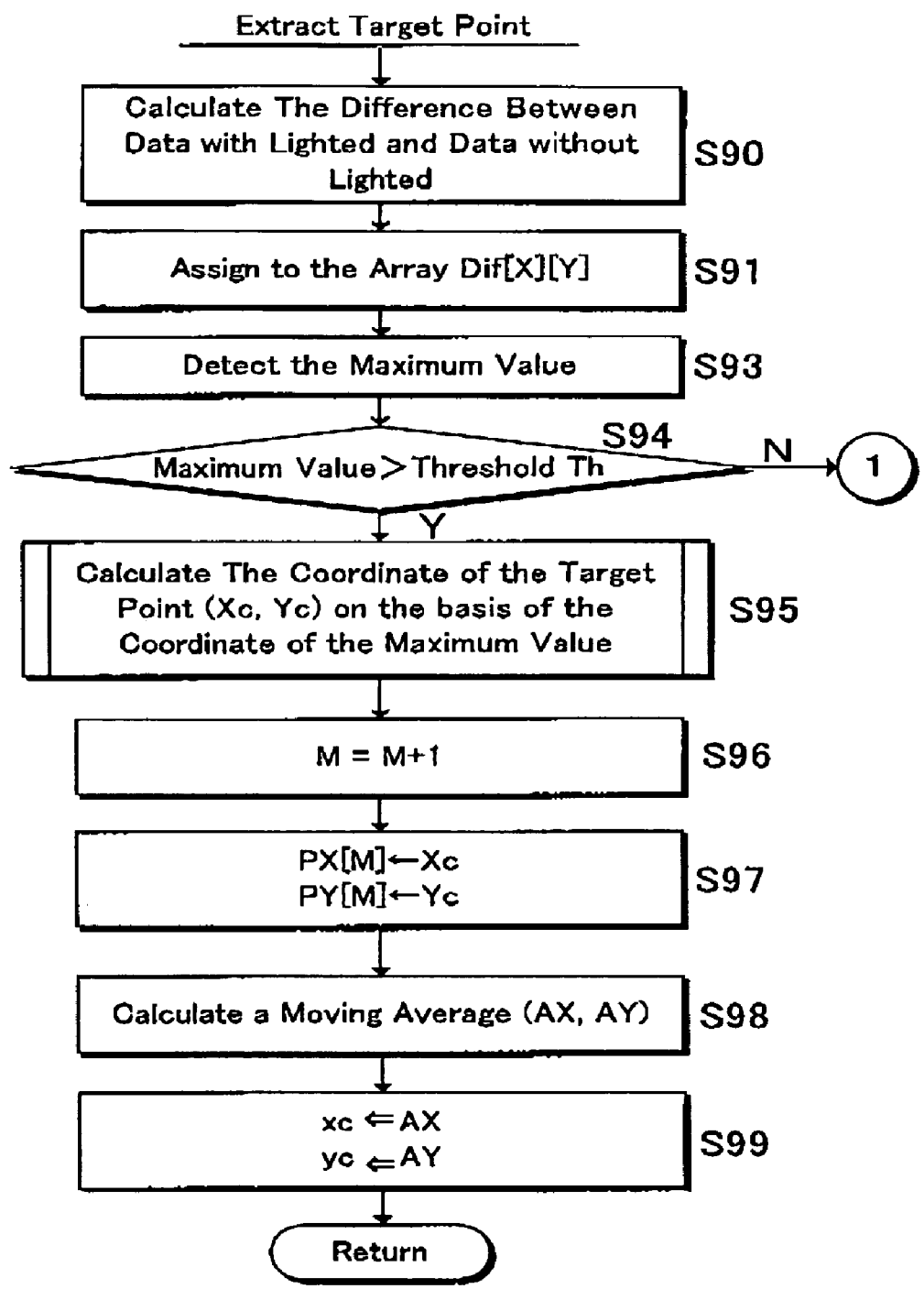
FIG. 38 is a flowchart showing the process flow of the target point extracting process of step S61 of FIG. 35.

FIG. 38 is a flowchart showing the process flow of the target point extracting process of step S61 of FIG. 35. As illustrated in FIG. 38, in step S90, the CPU 201 calculates the difference between the pixel data with and without light emitted from the infrared-emitting diodes 15 to obtain differential data. In step S91, the CPU 201 assigns the differential data to the array Dif[X][Y]. In this embodiment, since the 32 pixel×32 pixel image sensor 43 is used, X=0 to 31 and Y=0 to 31.

In step S93, the CPU 201 scans all elements of the array Dif[X][Y] to detect the maximum value from all elements of the array Dif[X][Y]. In step S94, if the maximum value is larger than the predetermined threshold value "Th", the CPU 201 proceeds to step S95. If the maximum value is smaller than the predetermined threshold value "Th", the CPU 201 proceeds to step S10 of FIG. 29.

In step S95, the CPU 201 calculates the coordinate (Xc, Yc) of the target point of the operation article 150 on the basis of the coordinate of the maximum value. In step S96, the CPU 201 increments a value of the variable "M" by one (M=M+1).

In step S97, the CPU 201 assigns the coordinates xc and Yc to the array PX[M] and PY[M]. Then, in step S98, the CPU 201 calculates the moving average (AX[M], AX[M] of the target point (Xc, Yc) of the operation article 150. In step S99, the CPU 201 converts the average coordinate (AX[M], AY[M]) of the target point on the image sensor 43 into the coordinate (xc,yc) on the screen 91 of the television monitor 90.

Figure 39:
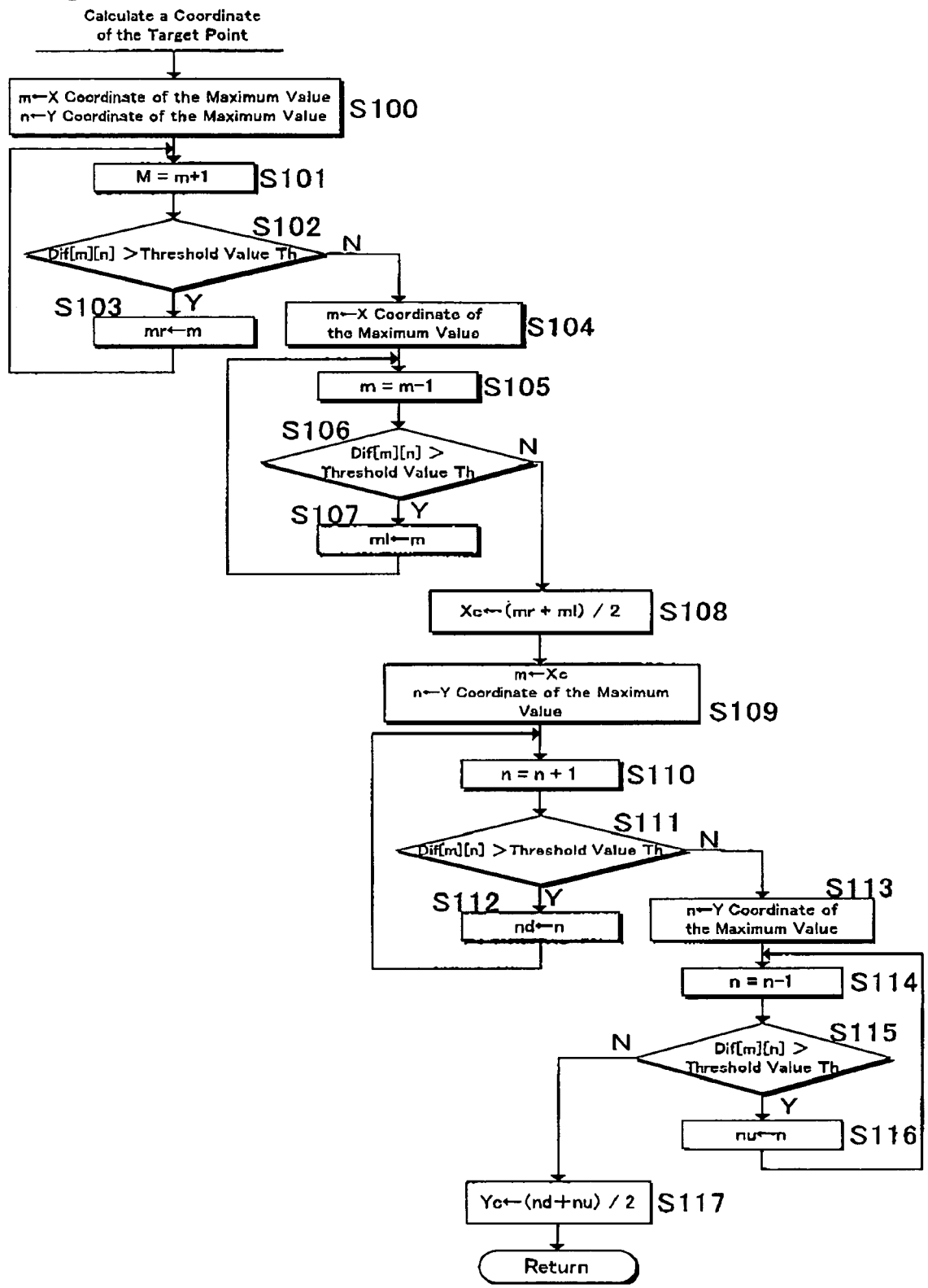
FIG. 39 is a flowchart showing the process flow of the target point coordinate calculating process of step S95 of FIG. 38.

FIG. 39 is a flowchart showing the process flow of the target point coordinate calculating process of step S95 of FIG. 38. As illustrated in FIG. 39, in step S100, the CPU 201 assigns the X coordinate and Y coordinate of the maximum value calculated in step S93 to "m" and "n". In step S100, the CPU 201 increments "m" by one (m=m+1).

If the differential data Dif[m][n] is larger than the predetermined threshold value "Th", the CPU 201 proceeds to step S103, otherwise proceeds to step S104 (step S102). In step S103, the CPU 201 assigns "m" at the time to "mr". In this way, the CPU 201 scans from the coordinate of the pixel having the maximum value in positive direction of X-axis while repeatedly executing the process from step S101 to S103 and obtains the X-coordinate of the endmost differential data exceeding the threshold value "Th".

In step S104, the CPU 201 assigns the X-coordinate of the maximum value calculated in step S93 to "m". In step S105, the CPU 201 decrements "m" by one. If the differential data Dif[m ][n] is larger than the predetermined threshold value "Th", the CPU 201 proceeds to step S107, otherwise the CPU 201 proceeds to step S108 (step S106). In step S107, the CPU 201 assigns "m" at the time to "ml". In this way, the CPU 201 scans from the coordinate of the pixel having the maximum value in negative direction of X-axis while repeatedly executing the process from step S105 to S107 and obtains an X-coordinate of the endmost differential data exceeding the threshold value "Th".

In step S108, the CPU 201 calculates the center coordinate between X-coordinate "mr" and X-coordinate "ml", and makes use of it as the X-coordinate (Xc) of the target point. In step S109, the CPU 201 assigns the "Xc" calculated in step S108 and the Y-coordinate of the pixel having the maximum value calculated in step 593 to "m" and "n". In step S110, the CPU 201 increments "n" by one (n=n+1). If the differential data Dif[m][n] is larger than the predetermined threshold value "Th", the CPU 201 proceeds to step S112, otherwise proceeds to step S113 (step S111). In step S112, the CPU 201 assigns "n" at the time to "nd". In this way, the CPU 201 scans from the coordinate of the pixel having the maximum value in positive direction of Y-axis while repeatedly executing the process from step S110 to S112 and obtains the Y-coordinate of the endmost differential data exceeding the threshold value "Th".

In step S113, the CPU 201 assigns the Y-coordinate of the pixel having the maximum value calculated in step S93 to "n". In step S114, the CPU 201 decrements "n" by one. If the differential data Dif[m][n] is larger than the predetermined threshold value "Th", the CPU 201 proceeds to step S116, otherwise proceeds to step S117 (step S115). In step S116, the CPU 201 assigns "n" at the time to "nu". In this way, the CPU 201 scans from the coordinate of the pixel having the maximum value in negative direction of Y-axis while repeatedly executing the process from step S114 to S116 and obtains the Y-coordinate of the endmost differential data exceeding the threshold value "Th".

In step 5117, the CPU 201 calculates a center coordinate between the Y-coordinate "nd" and the Y-coordinate "nu", and makes use of it as the Y-coordinate (Yc) of the target point. In this way, the coordinate (Xc, Yc) of the target point of the operation article 150 is calculated.

Figure 40:
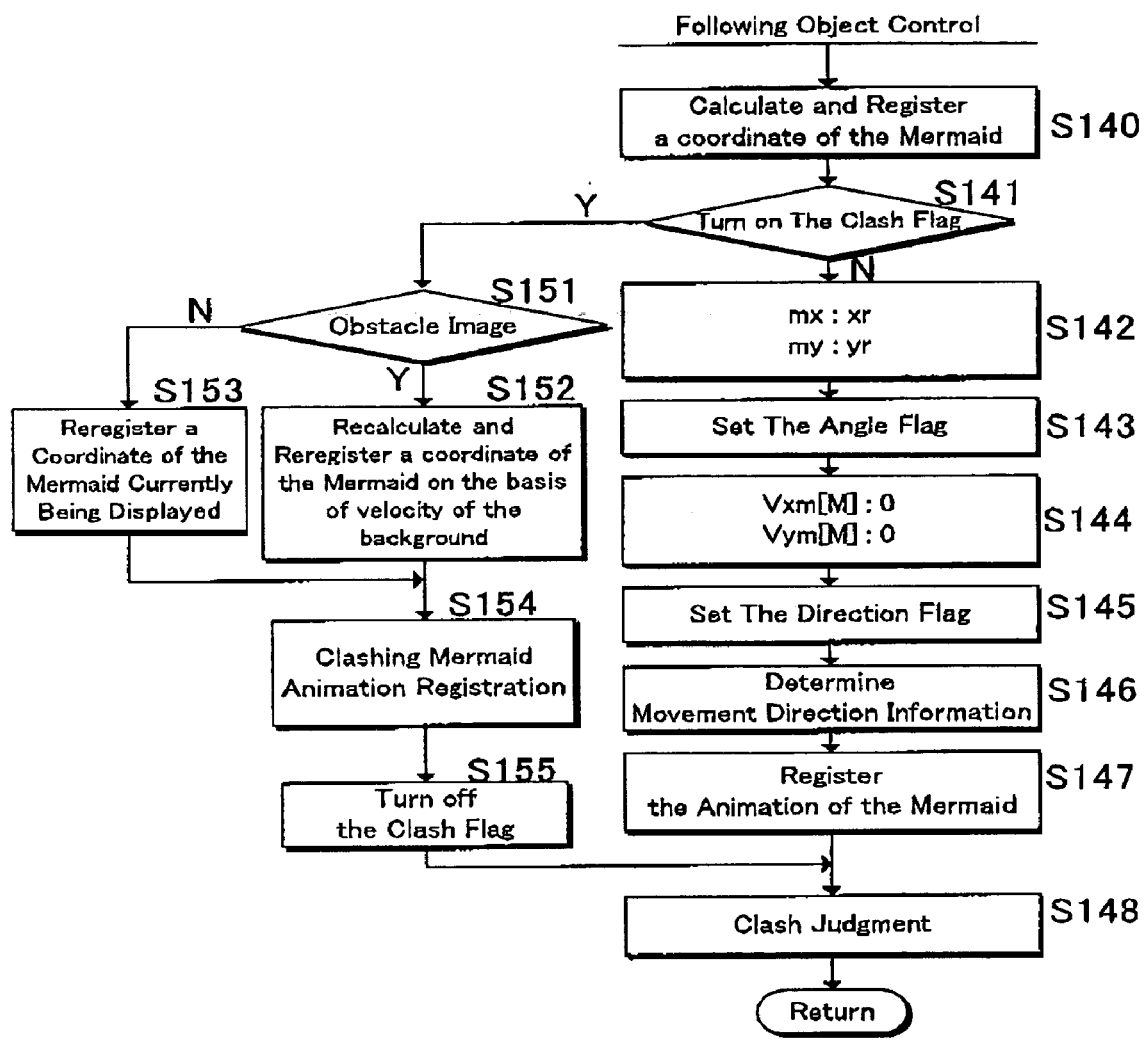
FIG. 40 is a flowchart showing the process flow of the following object control process of step S8 of FIG. 29.

FIG. 40 is a flowchart showing the process flow of the following object control process of step S8 of FIG. 29. As illustrated in FIG. 40, in step S140, the CPU 201 calculates the display coordinate (xm[M], ym[M]) of the mermaid 112 using the formula (3) and formula (4), and registers it.

In step S141, the CPU 201 determines whether or not the mermaid 112 clashes the obstacle image "Q" or the obstacle object "P" on the frame being displayed with reference to the clash flag. As a result, if the clash flag is on, the CPU 201 proceeds to step S151, otherwise proceeds to step S142 (step S141).

In step S142, the CPU 201 compares the x-direction movement distance "mx" of the mermaid 112 with the predetermined value "xr". In addition, the CPU 201 compares the y-direction movement distance "my" of the mermaid 112 with the predetermined value "yr". In step S143, the CPU 201 sets the angle flag on the basis of the result of the comparison of step S142 (refer to FIG. 22A).

In step S144, the CPU 201 refers to the sign of the velocity vector (Vxm[M], Vym[M]) of the mermaid 112. In step S145, the CPU 201 sets the direction flag on the basis of the sign of the velocity vector (refer to FIG. 22B).

In step S146, the CPU 201 determines the movement direction information in accordance with the angle flag and the direction flag (refer to FIG. 22C). In step S147, the CPU 201 registers storage location information of the animation table in accordance with the movement direction information.

On the other hand, in step S151, the CPU 201 determines whether or not the obstacle which the mermaid 112 clashed is the obstacle image "Q". As a result, if the obstacle is the obstacle image "Q", the CPU 201 proceeds to step S152. If it is not, i.e., the obstacle is the obstacle object "P", the CPU 201 proceeds to step S153.

In step S152, the CPU 201 calculates a display coordinate of the mermaid 112 on the basis of scroll velocity of the background 120 again and re-registers it. More specifically, the CPU 201 adds the x-element of the scroll velocity to the x-coordinate of the mermaid 112 and makes use of it as the new x-coordinate of the mermaid 112. The y-coordinate of the mermaid is same as the previous y-coordinate. On the other hand, in step S153, the CPU 201 re-registers the coordinate of the mermaid 112 being displayed.

In step S154, the CPU 201 registers the storage location information of the animation table which is used when the mermaid 112 clashes. In step S155, the CPU 201 turns the clash flag off.

Next, in step S148, the CPU 201 determines whether or not the mermaid 112 clashes the obstacle image "Q" or the obstacle object "P" on the basis of the coordinate of the mermaid 112 calculated in step S140. Then, if the CPU 201 determines the mermaid 112 clashes, it turns the clash flag on.

In this embodiment, since the cursor 111 (the coupled object) moves in conjunction with the motion of the operation article 150, it is possible to operate the cursor 111 intuitively and make it easier to play the game with easy operation.

In addition, since the cursor 111 represents location of the operation article 150 on the screen 91, the motion of the cursor 111 should be synchronized or almost synchronized with the motion of the operation article 150. Therefore, the motion of the cursor 111 is restrained by the motion of the operation article 150. On the other hand, since the mermaid 112 (the following object) follows the motion of the cursor 111, it is possible to decide arbitrarily how the mermaid 112 follows the cursor 111. Therefore, it is possible to give variety to the movement of the mermaid 112 and give the player impressive optical effects. In this embodiment, the mermaid 112 moves as if it were swimming in the water by adding acceleration determined by positional relation between the cursor 111 and the mermaid 112, and resistance corresponding to its velocity to the movement of the mermaid 112 (refer to the formula (3) and formula (4)).

Moreover, in this embodiment, the CPU 201 manages the power gauge 131 (an indicator showing remaining power of the mermaid 112) and ends the game with reference to the power gauge 131. In other words, in this embodiment, when the length of the bar 103 of the power gauge reaches "0", the game is over. In this way, the player 94 can not play the game without any restriction. Therefore, since the player 94 has to play the game carefully with a sense of tension, the game becomes more exciting.

Furthermore, in this embodiment, the power gauge 131 is changed according not to the first rule (a general rule) but to the second rule (an exceptional rule which is disadvantageous for the player 94) when the mermaid 112 touches or enters the area which contains a restrictive image (the obstacle object "P" or the obstacle image "Q"). More specifically, in this case, the bar 103 of the power gauge 131 becomes drastically shorter (the second rule). Accordingly, since the player 94 needs to operate the mermaid 112 through the cursor 111 to avoid the restrictive image, the game becomes more exciting.

In addition, in this embodiment, the power gauge 131 is changed according not to the first rule (the general rule) but to the third rule (an exceptional rule which is advantageous for the player 94) when the mermaid 112 touches or enters the area where the item 110 or 126 is displayed. More specifically, in this case, the bar 103 of the power gauge 131 becomes a certain length longer (the third rule). Accordingly, since the player 94 needs to operate the mermaid 112 through the cursor 111 trying to obtain the item 110 and 126, the game becomes more exciting.

Moreover, in this embodiment, because the background 120 contains the obstacle image "Q", controlling the background scroll and controlling the obstacle image "Q" are similar in the meaning. Therefore, it becomes easier to perform the display control of the obstacle image "Q".

Furthermore, in this embodiment, since the obstacle object "P" is constructed by a single or several sprite(s), it is possible to perform more detailed display control of the obstacle object "P" so that the flexibility of designing game contents is improved.

Moreover, in this embodiment, it is possible to use any one of state information of the operation article 150 such as the speed information, the movement direction information, the movement distance information, the velocity vector information, the acceleration information, the motion path information, the area information and the positional information, or a combination thereof. Accordingly, since it is possible to control the cursor 111 and the mermaid 112 by using various information of the operation article 150, the flexibility of designing game contents is improved.

Additionally, in this embodiment, the game apparatus 1 images the operation article 150 by intermittently emitting light to the operation article 150 to derive the state information of the operation article 150. Accordingly, it is not necessary to provide the operation article 150 with a power supply circuit and electric circuits. Therefore, it is possible to improve operationality and reliability of the operation article 150 and also reduce the cost.

Figure 41:
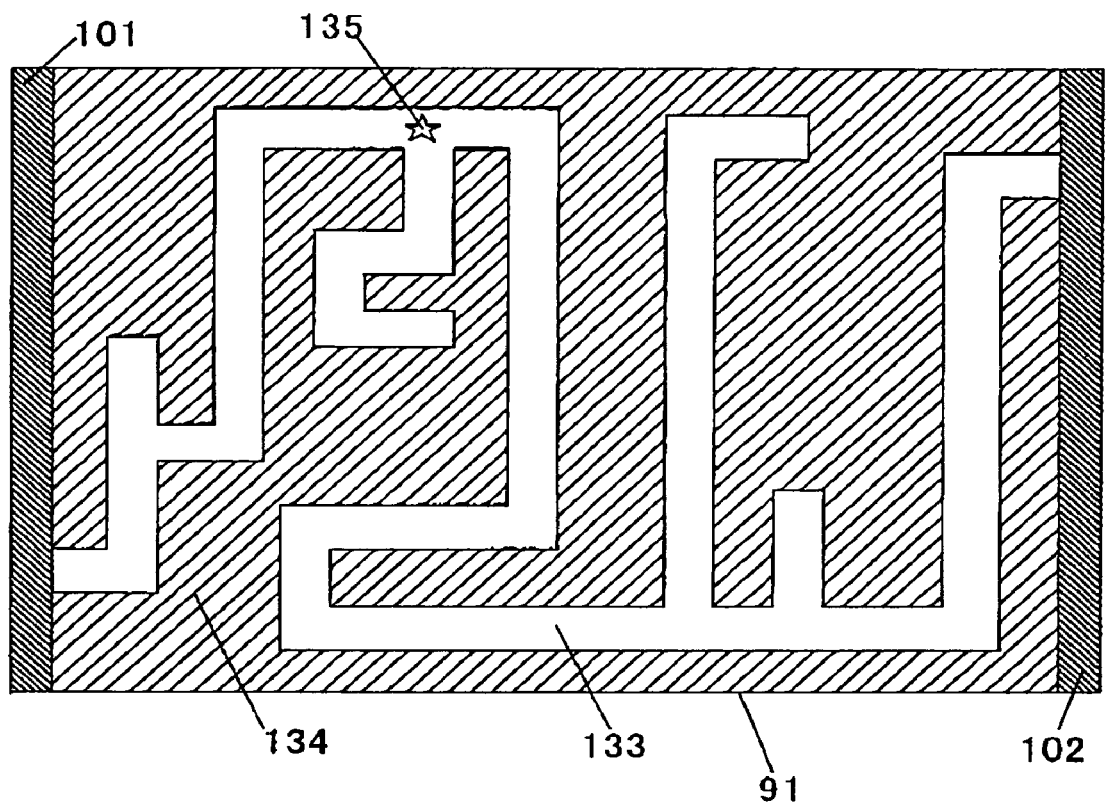
FIG. 41 is a view showing an example of game screen in another embodiment.

Next, a modification of this embodiment will be explained. FIG. 41 is a view showing an example of the game screen in the modification of this embodiment. As illustrated in FIG. 41, a maze comprising a pathway 133 and a wall 134 is displayed on the screen 91 of the television monitor 90. The player 94 operates the operation article 150 to operate a cursor 135 on the screen 91. This cursor 135 is similar to the cursor 111 shown in FIG. 11 to FIG. 13, and the cursor 135 moves in conjunction with the operation article 150. Meanwhile, controlling the cursor 135 is similar to controlling the cursor 111.

The player 94 operates the cursor 135 by means of the operation article 150 to proceed the pathway 133. When the cursor 135 reaches the right edge or left edge of the screen 91, the game screen is scrolled. Meanwhile, the scroll control is similar to the scroll control performed in the above embodiment. Therefore, the game screen is formed as the background screen 140 (refer to FIG. 15).

Figure 42:
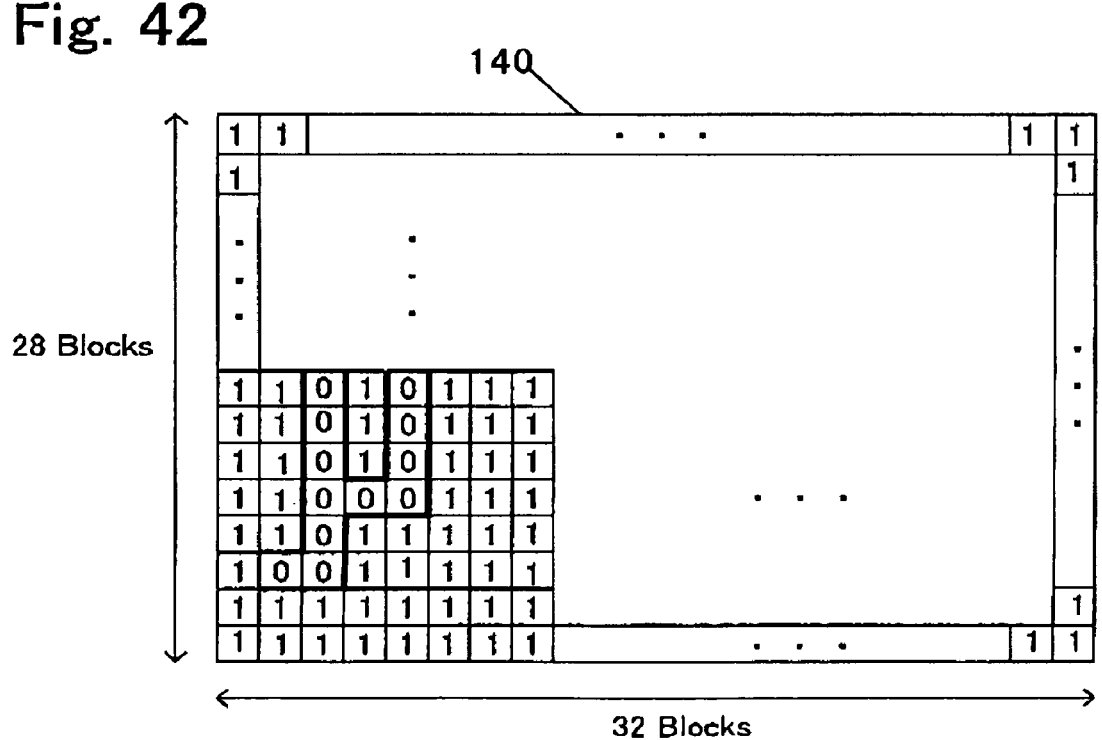
FIG. 42 is a view for explaining a clash judgment on the game screen of FIG. 41.

FIG. 42 is a view for explaining a clash judgment on the game screen of FIG. 41. As illustrated in FIG. 42, the range (28×32 blocks) displayed on the screen 91 within the background screen 140 is taken into consideration. Then, the array JA[0] to JA[895] corresponding to 28×32 blocks is provided. Meanwhile, the array JA[0] to JA[895] may be collectively called the array JA. Then, "0" is assigned to the array JA corresponding to the block constructing the pathway 133, and "1" is assigned to the array JA corresponding to the block constructing the wall 134.

The CPU 201 checks an element of the array JA corresponding to the block located at the position of the target point of the operation article 150. Then, if the element of the array JA is "1", the CPU 201 makes the cursor 135 move to the wall 134 as bellow. More specifically, the cursor 135 can not move through the wall 134.

Figure 43:
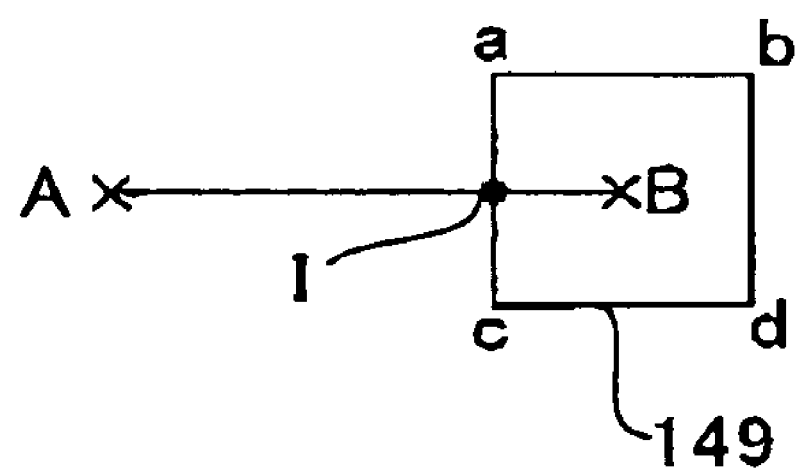
FIG. 43 is a view for explaining a coordinate calculation when the cursor of FIG. 41 clashes the wall.

FIG. 43 is a view for explaining the coordinate calculation when the cursor 135 of FIG. 41 clashes the wall 134. As illustrated in FIG. 43, for example, the block 149 corresponding to the array JA[10] assigned "1" as an element is taken into consideration. In addition, it is assumed that the previous position of the target point is at point A and the current position of the target point is at point B. In this case, the CPU 201 derives which straight line "ab", "bc", "cd", or "da" crosses the straight line AB. In other ward, if the cross product is "0", the intersecting point of the two vectors does not exist.

Next, the CPU 201 calculates the intersecting point "I" of the straight line AB and the straight line "ac" intersecting the straight line AB. Then, the CPU 201 makes use of the coordinate of the intersecting point "I" as a current display coordinate of the cursor 135. In this configuration, the cursor 135 does not thrust into the wall 134.

According to this modified example, since the cursor 135 moves in conjunction with the motion of the operation article 150, it is possible to operate the cursor 135 intuitively so that the player can play the maze game with easy operation.

Incidentally, it is possible to make an only certain area including the cursor 135 visible by making the rest of the area dark as though the area were spotlighted. In this way, even though the maze is easy, the player 94 feels more difficulty, and the game becomes more exciting.

In above mentioned example, the cursor 135 is operated by the operation article 150. However, as illustrated in FIG. 11, it is possible to use a following object in addition to the cursor 135, and operate the following object by operating the cursor 135. In this case, for example, the cursor control and the following object control are performed in similar way to the cursor 111 and the mermaid 112.

By the way, in above example, if the target point of the operation article 150 enters the block corresponding to the array JA assigned "1" as its element, the cursor 135 is moved to the border between the pathway 133 and the wall 134 so that the cursor 135 can move only within the pathway 133. However, it is possible to end the game if the target point of the operation article 150 exists in the block 149 corresponding to the array JA assigned "1" as its element. Therefore, in this case, the player 94 has to operate the cursor 135 trying to avoid clashing the wall 134. Incidentally, as illustrated in FIG. 11, it is possible to use a following object in addition to the cursor 135, and operate the following object by operating the cursor 135.

In this modified example, since the cursor 135 can be operated by moving the operation article 150 as well as the above mentioned embodiment, the player 94 can enjoy feeling as if the player 94 operated the operation article 150 to avoid obstacles existing in real space even though the wall 134 corresponding to an obstacle exists on the screen 91. In addition, it is possible to reduce the cost and necessary space to play the game as compared to game apparatus for dodging obstacles in real space.

Incidentally, the present invention is not limited to the above embodiment, and a variety of variations and modifications maybe be effected without departing from the spirit and scope thereof, as described in the following exemplary modifications.

(1) The mermaid 112 as the following object is made to follow the cursor 111 (the coupled object) in the case of this embodiment. However, it is possible to use the mermaid 112 instead of the cursor 111 without using the mermaid 112 as the following object. In this case, the player 94 operates the operation article 150 to move the mermaid 112 as the cursor 111. In this way, the player 94 directly operates the mermaid 112 by means of the operation article 150. Incidentally, in the above embodiment, the player 94 indirectly operates the mermaid 112 through the cursor 111 which is operated by the operation article 150.

(2) In the above embodiment, the operation article 150 which consists of the stick 152 and the reflecting ball 151 is used as an operation article. However, if the operation article is provided with a reflecting portion, it is not limited to the operation article 150.

(3) In the above embodiment, the coordinate of the target point of the operation article 150 is derived in the manner described in FIG. 20A to FIG. 20D. However, it is possible to define the coordinate of the pixel having the maximum luminance value exceeding the predetermined threshold value "Th" as a coordinate of the target point.

(4) While any appropriate processor can be used as the high speed processor 200 of FIG. 6, it is preferred to use the high speed processor in relation to which the applicant has been filed patent applications. The details of this high speed processor are disclosed, for example, in Jpn. unexamined patent publication No. 10-307790 and U. S. Pat. No. 6,070, 205 corresponding thereto.

The foregoing description of the embodiments has been presented for purposes of illustration and description. It is not intended to be exhaustive or to limit the invention to the precise form described, and obviously many modifications and variations are possible in light of the above teaching. The embodiment was chosen in order to explain most clearly the principles of the invention and its practical application thereby to enable others in the art to utilize most effectively the invention in various embodiments and with various modifications as are suited to the particular use contemplated.

What is claimed is:

1. A game apparatus comprising:
   a light emitting unit operable to direct light onto an operation article;
   an imaging device operable to image said operation article with and without light emitted from said light emitting unit, and generate an image signal;
   a state information calculating unit operable to calculate state information of said operation article on the basis of said image signal;
   a coupled object control unit operable to control display of a coupled object which moves as said operation article moves in accordance with said state information of said operation article; and
   a restrictive image control unit operable to control a restrictive image which limits movement of said coupled object.

2. A game apparatus as claimed in claim 1 wherein said restrictive image control unit comprises:
   a background image control unit operable to control background scroll;
   wherein a background includes said restrictive image.

3. A game apparatus as claimed in claim 1 wherein said restrictive image is an image constructing a maze.

4. A game apparatus as claimed in claim 1 wherein, when said coupled object touches or enters an area where said restrictive image is displayed, a game is over.

5. A game apparatus as claimed in claim 1 wherein said state information of said operation article derived by said state information calculating unit includes any one of speed information, movement direction information, movement distance information, velocity vector information, acceleration information, motion path information, area information and location information, or a combination thereof.

6. A game apparatus as claimed in claim 1 wherein said operation article comprises: comprising;
   a reflecting portion which reflects light.

7. A game apparatus as claimed in claim 6, wherein said reflecting portion retroreflects light.

8. A game apparatus as claimed in claim 1, wherein:
   said light emitting unit directs light onto said operation article at a predetermined interval;
   said imaging device is operable to image said operation article with and without light emitted from said light emitting unit, and generate the lighted image signal and a non-lighted image signal;
   said game apparatus further comprises a differential signal generating unit operable to generate a differential signal between said lighted image signal and said non-lighted image signal; and
   said state information calculating unit calculates the state information of said operation article on the basis of said differential signal.

9. A game program embodied in a computer readable medium which enables a computer to perform a process, said process comprising:
   a step of directing light onto an operation article;
   a step of imaging said operation article with light emitted, and generating an image signal;
   a step of calculating state information of said operation article on the basis of said image signal;
   a step of controlling display of a coupled object which moves as said operation article moves in accordance with said state information of said operation article; and
   a step of controlling a restrictive image which limits movement of said coupled object.

10. A game program as claimed in claim 9, wherein:
    said step of directing light directs light onto said operation article at predetermined intervals;
    said step of imaging images said operation article with and without light emitted, and generates a lighted and a non-lighted image signal;
    said process further comprises a step of generating a differential signal between said lighted image signal and said non-lighted image signal; and
    said step of calculating calculates said state information on the basis of the differential signal.

11. A game method comprising:
    a step of directing light onto an operation article;
    a step of imaging said operation article with light emitted and generating an image signal;
    a step of calculating state information of said operation article on the basis of said image signal;
    a step of controlling display of a coupled object which moves as said operation article moves in accordance with said state information of said operation article; and
    a step of controlling a restrictive image which limits movement of said coupled object.

12. A game method as claimed in claim 11, wherein:
    said step of directing light directs light onto said operation article at predetermined intervals;
    said step of imaging images said operation article with and without light emitted, and generates a lighted and a non-lighted image signal;
    said game method further comprises a step of generating a differential signal between said lighted image signal and said non-lighted image signal; and
    said step of calculating calculates said state information on the basis of the differential signal.

* * * * *